United States Patent
Tajima et al.

(10) Patent No.: US 7,630,828 B2
(45) Date of Patent: Dec. 8, 2009

(54) DESTINATION PREDICTION DEVICE AND DESTINATION PREDICTION METHOD

(75) Inventors: Takashi Tajima, Osaka (JP); Jun Ozawa, Nara (JP)

(73) Assignee: Panasonic Corporation, Osaka (JP)

( * ) Notice: Subject to any disclaimer, the term of this patent is extended or adjusted under 35 U.S.C. 154(b) by 9 days.

(21) Appl. No.: 12/159,693

(22) PCT Filed: Mar. 28, 2007

(86) PCT No.: PCT/JP2007/056627

§ 371 (c)(1),
(2), (4) Date: Jun. 30, 2008

(87) PCT Pub. No.: WO2007/119559

PCT Pub. Date: Oct. 25, 2007

(65) Prior Publication Data

US 2009/0105934 A1    Apr. 23, 2009

(30) Foreign Application Priority Data

Apr. 14, 2006    (JP)    ............... 2006-112721

(51) Int. Cl.
- G06F 19/00    (2006.01)
- G06G 7/70    (2006.01)
- G08G 1/00    (2006.01)
- G06G 7/76    (2006.01)

(52) U.S. Cl. ................. 701/118; 701/201; 701/205; 701/206; 701/207; 701/208; 701/209; 701/210; 701/211; 701/212; 701/213; 340/995.1; 340/995.13; 340/995.21; 340/995.23; 340/995.24

(58) Field of Classification Search ............ 701/118, 701/201, 205–213; 340/955, 995.1, 995.13, 340/995.21, 995.23, 995.24; 455/456.1
See application file for complete search history.

(56) References Cited

U.S. PATENT DOCUMENTS 6,941,222 B2    9/2005    Yano et al.

(Continued)

FOREIGN PATENT DOCUMENTS

EP    1 271 103 A2    1/2003

(Continued)

OTHER PUBLICATIONS

International Search Report issued Jun. 26, 2007 in International (PCT) Application No. PCT/JP2007/056627.

*Primary Examiner*—Khoi Tran
*Assistant Examiner*—Jaime Figueroa
(74) *Attorney, Agent, or Firm*—Wenderoth, Lind & Ponack, L.L.P.

(57) ABSTRACT

A destination prediction device having a map information accumulation unit that accumulates map information including at least positions of a plurality of points on a map and routes between the plurality of points; a start position acquisition unit that acquires a start position of the mobile body; a current position acquisition unit that acquires a current position of the mobile body; a destination candidate position acquisition unit that acquires positions of a plurality of destination candidates that may potentially become destinations of the mobile body; a circuitousness calculation unit that calculates a circuitousness which is a deviation of a route from the start position to the position of the destination candidate and a destination prediction unit that predicts, as a destination, a destination candidate whose calculated circuitousness is the smallest among the destination candidates.

16 Claims, 57 Drawing Sheets

U.S. PATENT DOCUMENTS

| | | | |
|---|---|---|---|
| 7,419,095 B2 * | 9/2008 | Yoshioka et al. | 235/384 |
| 2002/0161517 A1 * | 10/2002 | Yano et al. | 701/209 |
| 2004/0128066 A1 * | 7/2004 | Kudo et al. | 701/204 |
| 2004/0260457 A1 * | 12/2004 | Kawase et al. | 701/200 |
| 2005/0125148 A1 * | 6/2005 | Van Buer et al. | 701/209 |
| 2005/0251325 A1 * | 11/2005 | Kudo et al. | 701/200 |
| 2005/0267680 A1 * | 12/2005 | Watanabe et al. | 701/209 |
| 2009/0088962 A1 * | 4/2009 | Jones | 701/200 |

FOREIGN PATENT DOCUMENTS

| | | |
|---|---|---|
| EP | 1 551 195 A1 | 7/2005 |
| JP | 7-83678 | 3/1995 |
| JP | 2000-266562 | 9/2000 |
| JP | 2001-76289 | 3/2001 |
| JP | 2002-328035 | 11/2002 |
| JP | 2004-271231 | 9/2004 |
| JP | 2004-279237 | 10/2004 |
| JP | 2004-333136 | 11/2004 |
| JP | 2005-326364 | 11/2005 |
| JP | 2006-53132 | 2/2006 |
| WO | 2004/034725 | 4/2004 |

* cited by examiner

FIG. 3(a)

| Node ID | Node position (longitude) | Node position (latitude) | Connecting node ID |
|---|---|---|---|
| 001 | 134.3.0.9 | 34.6.3.6 | 002,003,004,005 |
| 002 | 134.3.0.9 | 34.5.30.0 | 001,005,006 |
| 003 | 134.3.0.9 | 34.6.36.0 | 001,007,008 |
| 004 | 134.4.10.9 | 34.6.3.6 | 001,006,009,010 |
| 005 | 134.2.20.9 | 34.6.3.6 | 001,011,012 |
| 006 | 134.4.10.9 | 34.5.30.0 | 002,004,013,014 |
| ... | ... | ... | ... |

FIG. 3(b)

| Link ID | Start point node ID | End point node ID | Link distance |
|---|---|---|---|
| 001 | 001 | 002 | 1km |
| 002 | 001 | 003 | 1km |
| 003 | 001 | 004 | 4km |
| 004 | 001 | 005 | 1km |
| 005 | 002 | 006 | 4km |
| ... | ... | ... | ... |

FIG. 7

| Destination candidate | Current position-to-start position route cost | Current position-to-candidate position route cost | Start position-to-candidate position route cost | Circuitousness calculation formula | Circuitousness |
|---|---|---|---|---|---|
| Store A | 1km | 5km | 6km | 1km+5km−6km | 0km |
| Store B | 1km | 3km | 4km | 1km+3km−4km | 0km |
| Store C | 1km | 8km | 4km | 1km+8km−4km | 5km |

FIG. 9

| Destination candidate | Current position-to-start position route cost | Current position-to-candidate position route cost | Start position-to-candidate position route cost | Circuitousness calculation formula | Circuitousness |
|---|---|---|---|---|---|
| Store A | 2km | 16km | 6km | 2km+16km−6km | 12km |
| Store B | 2km | 2km | 4km | 2km+2km−4km | 0km |
| Store C | 2km | 7km | 4km | 2km+7km−4km | 5km |

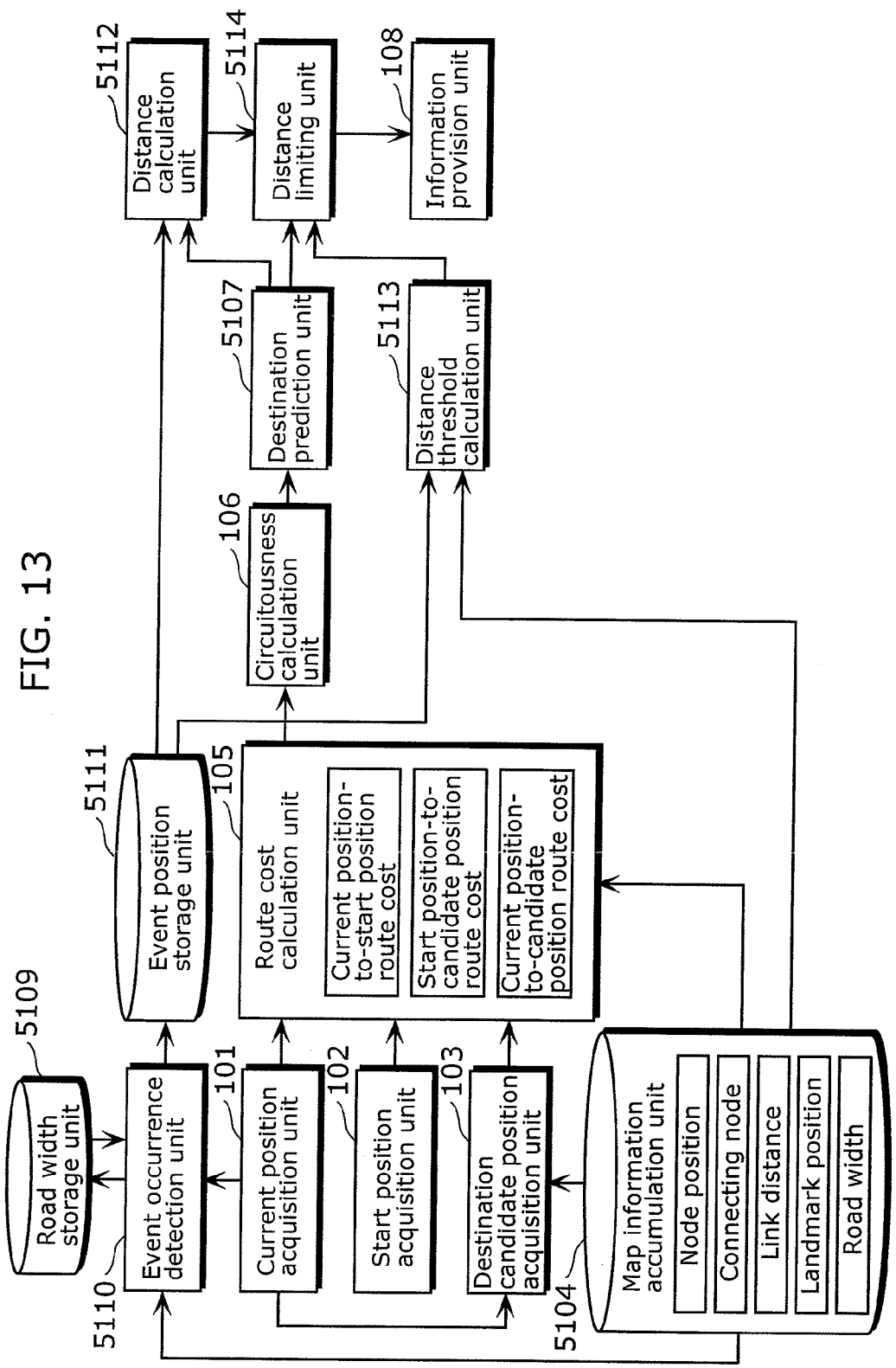

FIG. 14(a)

| Node ID | Node position (longitude) | Node position (latitude) | Connecting node ID |
|---|---|---|---|
| 001 | 134.3.0.9 | 34.6.3.6 | 002, 003, 004, 005 |
| 002 | 134.3.0.9 | 34.5.30.0 | 001, 005, 006 |
| 003 | 134.3.0.9 | 34.6.36.0 | 001, 007, 008 |
| 004 | 134.4.10.9 | 34.6.3.6 | 001, 006, 009, 010 |
| 005 | 134.2.20.9 | 34.6.3.6 | 001, 011, 012 |
| 006 | 134.4.10.9 | 34.5.30.0 | 002, 004, 013, 014 |
| ... | ... | ... | ... |

FIG. 14(b)

| Link ID | Start point node ID | End point node ID | Link distance | Road width |
|---|---|---|---|---|
| 001 | 001 | 002 | 1km | 5m |
| 002 | 001 | 003 | 1km | 5m |
| 003 | 001 | 004 | 4km | 5m |
| 004 | 001 | 005 | 1km | 5m |
| 005 | 006 | 006 | 4km | 12m |
| ... | ... | ... | ... | ... |

FIG. 16

| Destination candidate | Current position-to-start position route cost | Current position-to-candidate position route cost | Start position-to-candidate position route cost | Circuitousness calculation formula | Circuitousness |
|---|---|---|---|---|---|
| Store A | 2km | 4km | 6km | 2km+4km-6km | 0km |
| Store B | 2km | 4km | 4km | 2km+4km-4km | 2km |
| Store F | 2km | 10km | 12km | 2km+10km-12km | 0km |

FIG. 20
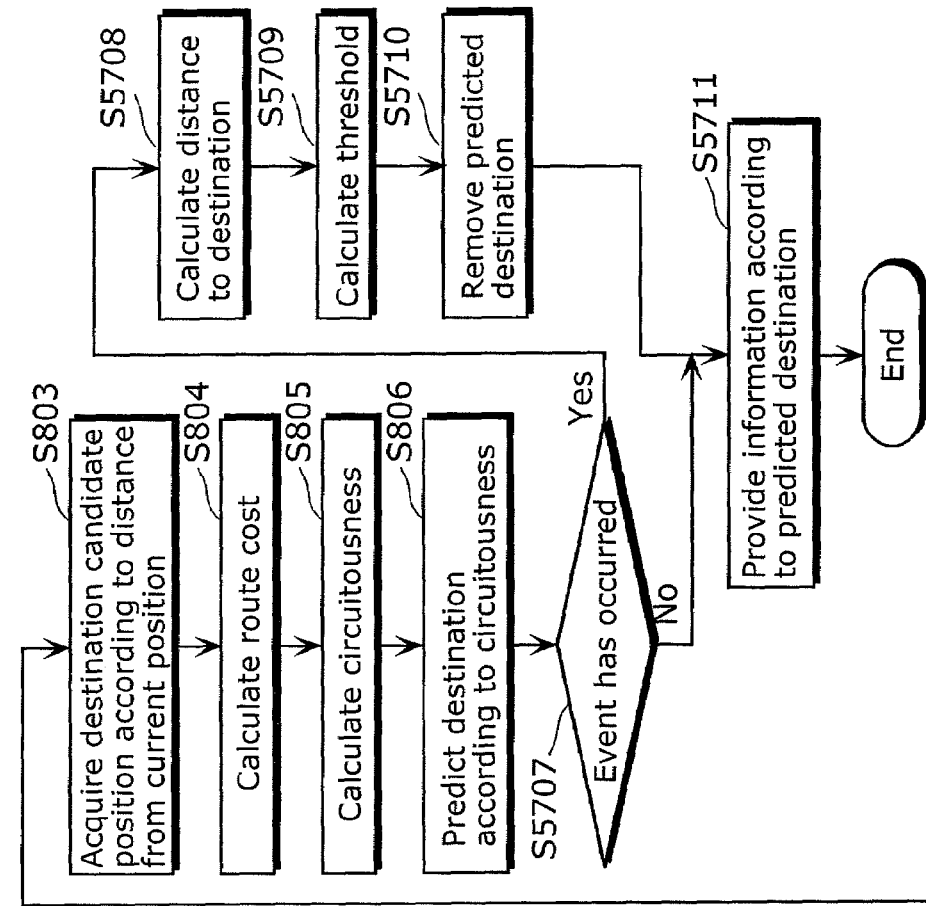
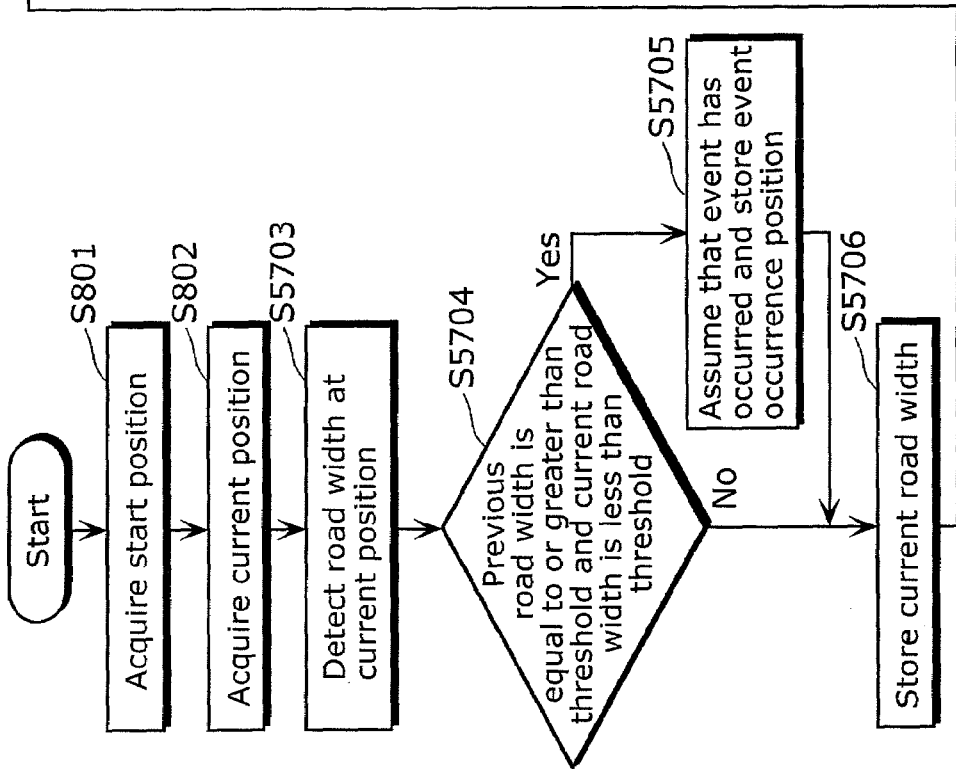

FIG. 22(a)

| ID | Position (longitude) | Position (latitude) | Direction of traffic volume (degrees) | Size of traffic volume (vehicles/hour) | Distance to current position (km) |
|---|---|---|---|---|---|
| 001 | 134.3.0.9 | 34.6.3.6 | 0 | 50 | 4.8 |
| 002 | 134.3.0.9 | 34.6.3.6 | 180 | 100 | 4.8 |
| 003 | 134.5.59.9 | 34.3.37.3 | 0 | 400 | 3.0 |
| 004 | 134.5.59.9 | 34.3.37.3 | 180 | 400 | 3.0 |
| 005 | 134.7.50.0 | 34.7.4.5 | 0 | 200 | 5.3 |
| 006 | 134.7.50.0 | 34.7.4.5 | 90 | 150 | 5.3 |
| 007 | 134.7.50.0 | 34.7.4.5 | 180 | 200 | 5.3 |
| 008 | 134.7.50.0 | 34.7.4.5 | 270 | 250 | 5.3 |
| 009 | 134.14.21.9 | 34.8.3.6 | 0 | 100 | 14 |
| 010 | 134.15.34.9 | 34.8.12.3 | 0 | 300 | 16 |
| ... | ... | ... | ... | ... | ... |

Current position
Longitude: 134.5.59.9, latitude: 34.5.15.6

FIG. 22(b)

| ID | Position (longitude) | Position (latitude) | Direction of traffic volume (degrees) | Size of traffic volume (vehicles/hour) |
|---|---|---|---|---|
| 001 | 134.3.0.9 | 34.6.3.6 | 0 | 50 |
| 002 | 134.3.0.9 | 34.6.3.6 | 180 | 100 |
| 003 | 134.5.59.9 | 34.3.37.3 | 0 | 400 |
| 004 | 134.5.59.9 | 34.3.37.3 | 180 | 400 |
| 005 | 134.7.50.0 | 34.7.4.5 | | |
| 006 | 134.7.50.0 | 34.7.4.5 | | |
| 007 | 134.7.50.0 | 34.7.4.5 | | |
| 008 | 134.7.50.0 | 34.7.4.5 | | |

Acquire those whose distance to current position is equal to or less than 10 km

FIG. 25

| Name | Minimum road distance between positions | Number of left/right turns | Route cost calculation formula | Route cost |
|---|---|---|---|---|
| Current position-to-start position route cost | 1km | 0 | 1km+0km | 1km |
| Start position-to-candidate position route cost | 6km | 3 | 6km+3km | 9km |
| Current position-to-candidate position route cost | 5km | 3 | 5km+3km | 8km |

FIG. 28

| Destination candidate | Current position-to-start position route cost (Road distance + number of left/right turns) | Current position-to-candidate position route cost (Road distance + number of left/right turns) | Start position-to-candidate position route cost (Road distance + number of left/right turns) | Circuitousness calculation formula | Circuitousness |
|---|---|---|---|---|---|
| 001 | 1km (1km+0) | 7km (5km+2) | 8km (6km+2) | 1km+7km-8km | 0km |
| 002 | 1km (1km+0) | 8km (5km+3) | 9km (6km+3) | 1km+8km-9km | 0km |
| 003 | 1km (1km+0) | 16km (12km+4) | 11km (8km+3) | 1km+16km-11km | 6km |
| 004 | 1km (1km+0) | 4km (3km+1) | 5km (4km+1) | 1km+4km-5km | 0km |
| 005 | 1km (1km+0) | 11km (8km+3) | 12km (9km+3) | 1km+11km-12km | 0km |
| 006 | 1km (1km+0) | 11km (8km+3) | 7km (4km+3) | 1km+11km-7km | 5km |
| 007 | 1km (1km+0) | 10km (8km+2) | 6km (4km+2) | 1km+10km-6km | 5km |
| 008 | 1km (1km+0) | 11km (8km+3) | 7km (4km+3) | 1km+11km-7km | 5km |

FIG. 32

| ID | Name | Position (longitude) | Position (latitude) |
|---|---|---|---|
| 001 | Store A | 134.5.28.9 | 34.5.15.7 |
| 002 | Store B | 134.5.59.9 | 34.6.4.6 |
| 003 | Store C | 134.6.20.0 | 34.6.4.5 |
| 004 | Building D | 134.6.35.0 | 34.6.14.5 |
| 005 | Center E | 134.7.26.9 | 34.4.49.2 |
| ... | | ... | ... |

FIG. 36

Assuming detour allowable distance is 3 km, via point is judged to exist since: Circuitousness with respect to set destination, store B, of 9 km > 3 km (detour allowable distance)

| Destination candidate | Current position-to-start position route cost | Current position-to-candidate position route cost | Start position-to-candidate position route cost | Circuitousness calculation formula | Circuitousness |
|---|---|---|---|---|---|
| Store B Set destination | 3km | 10km | 4km | 3km+10km−4km | 9km |
| Store A Destination candidate | 3km | 3km | 6km | 3km+3km−6km | 0km |
| Store C Destination candidate | 3km | 10km | 4km | 3km+10km−4km | 9km |
| Store D Destination candidate | 3km | 4km | 3km | 3km+4km−3km | 4km |

FIG. 41

| ID | Name | Position (longitude) | Position (latitude) | Arrival time and date |
|---|---|---|---|---|
| 001 | Home | 134.5.28.9 | 34.5.15.7 | 9/20 12:00 |
| 002 | Store B | 134.5.59.9 | 34.6.4.6 | 9/20 12:20 |
| 003 | Home | 134.5.28.9 | 34.5.15.7 | 9/20 13:30 |
| 004 | Restaurant D | 134.6.35.0 | 34.6.14.5 | 9/21 8:40 |
| 005 | Company E | 134.7.26.9 | 34.4.49.2 | 9/21 9:00 |
| 006 | Store F | 134.6.2.7 | 34.5.30.3 | 9/21 20:10 |
| 007 | Home | 134.5.28.9 | 34.5.15.7 | 9/21 21:00 |
| 008 | Store G | 134.6.17.5 | 34.4.50.3 | 9/22 8:40 |
| 009 | Company E | 134.7.26.9 | 34.4.49.2 | 9/22 8:55 |
| 010 | Home | 134.5.28.9 | 34.5.15.7 | 9/22 22:05 |

FIG. 42

| ID | Name | Position (longitude) | Position (latitude) | Arrival time and date | |
|---|---|---|---|---|---|
| 001 | Home | 134.5.28.9 | 34.5.15.7 | 9/20 12:00 | |
| 002 | Store B | 134.5.28.9 | 34.6.4.6 | 9/20 12:20 | |
| 003 | Home | 134.5.28.9 | 34.5.15.7 | 9/20 13:30 | |
| 004 | Restaurant D | 134.6.35.0 | 34.6.14.5 | 9/21 8:40 | Via point candidate |
| 005 | Company E | 134.7.26.9 | 34.4.49.2 | 9/21 9:00 | Destination |
| 006 | Store F | 134.6.2.7 | 34.5.30.3 | 9/21 20:10 | |
| 007 | Home | 134.5.28.9 | 34.5.15.7 | 9/21 21:00 | |
| 008 | Store F | 134.6.17.5 | 34.4.50.3 | 9/22 8:40 | Via point candidate |
| 009 | Company E | 134.7.26.9 | 34.4.49.2 | 9/22 8:55 | Destination |
| 010 | Home | 134.5.28.9 | 34.5.15.7 | 9/22 22:05 | |

Order of arrival time and date →

FIG. 48

| Set destination | Current position-to-start position route cost | Current position-to-destination position route cost | Start position-to-destination position route cost | Circuitousness calculation formula | Circuitousness |
|---|---|---|---|---|---|
| Store B | 3km | 10km | 4km | 3km+10km-4km | 9km |

Assuming that detour allowable distance is 3 km, judge that set destination is erroneous since:
Circuitousness with respect to set destination, store b, of 9 km >
3 km (detour allowable distance)

FIG. 52

| Rank | Provided information | Circuitousness |
|---|---|---|
| 1 | Recommended route guidance display<br>Route audio guidance<br>Road traffic information of route<br>Road traffic information of destination periphery<br>Destination information | Less than 2 km |
| 2 | Recommended route display<br>Road traffic information of route<br>Road traffic information of destination periphery<br>Destination information | Equal to or greater than 2 km and less than 4 km |
| 3 | Road traffic information of route<br>Road traffic information of destination periphery<br>Destination information | Equal to or greater than 4 km and less than 6 km |
| 4 | Road traffic information of destination periphery<br>Destination information | Equal to or greater than 6 km and less than 8 km |
| 5 | None | Equal to or greater than 8 km |

FIG. 56

| ID | Name | Name (furigana notation) | Telephone number | Map code | Position (longitude) | Position (latitude) |
|---|---|---|---|---|---|---|
| 001 | 守口市駅 (Moriguchishieki) | モリグチシエキ (Moriguchishieki) | 0600000000 | 0123456789 | 134.5.28.9 | 34.5.15.7 |
| 002 | 守口駅 (Moriguchieki) | モリグチエキ (Moriguchieki) | 0600000001 | 1234567890 | 134.5.59.9 | 34.6.4.6 |
| 003 | セブンイレブン守口店 (Sefenelefenmoriguchiten) | セブンイレブンモリグチテン (Sefenelefenmoriguchiten) | 0600000002 | 2345678901 | 134.6.20.0 | 34.6.4.5 |
| 004 | セブンイレブン 門真店 (Sefenelefenkadomaten) | セブンイレブンカドマテン (Sefenelefenkadomaten) | 0600000003 | 3456789012 | 134.6.35.0 | 34.6.14.5 |
| 005 | MT電器 (Emushitadenki) | エムシタデンキ (Emushitadenki) | 0669081121 | 4567890123 | 134.7.26.9 | 34.4.49.2 |
| ... | | | | | | ... |

DESTINATION PREDICTION DEVICE AND DESTINATION PREDICTION METHOD

TECHNICAL FIELD

The present invention relates to a destination prediction device that predicts a destination of a mobile body, and more particularly, to a technique for predicting a destination without depending on availability of destination history.

BACKGROUND ART

Currently, mobile terminals and the like such as car navigation devices and mobile phones allow changing of information to be provided in accordance with user status as well as changing of timings at which such information is to be provided. For example, only information on stores located close to a current position of a mobile body is filtered and provided from a large volume of existing store-related information. In addition, destination information of a mobile body such as a destination, a via point and a point of passage is important information that affects information provision. For example, based on a destination inputted in advance by a user, destination-related information such as a route to the destination or parking information of the vicinity of the destination, or information on stores on the route to the destination or traffic jam information is provided to the mobile body. However, having the user input a destination places a heavy load on the user. Furthermore, there may be cases where the input by the user is erroneous. Therefore, a method in which a device predicts a destination is conventionally implemented. Generally, as described in Patent Reference 1, destination prediction is performed using a history of actual movement of a mobile body.

There is also a method for predicting, during movement of a mobile body, a destination based on a movement direction from a start point to a current point. Patent Reference 2 predicts a destination also using a degree of coincidence between a movement direction and a direction to a predicted destination from a start position.

Patent Reference 1: Japanese Unexamined Patent Application Publication No. 07-083678

Patent Reference 2: Japanese Unexamined Patent Application Publication No. 2000-266562

DISCLOSURE OF INVENTION

Problems that Invention is to Solve

With respect to information provision by destination prediction of a mobile body, a destination prediction technique using a history such as that described in Patent Reference 1 is disadvantageous in that prediction cannot be performed until sufficient history is collected. In addition, a first-time destination cannot be predicted. Accordingly, a destination must be predicted from information other than history.

In consideration thereof, as described in Patent Reference 2, there is a method for predicting a destination based on a degree of coincidence between a movement direction of a mobile body and a movement direction from a start point to a current point. However, even when the destination is located to the north, assuming that a river lies to the north, the mobile body must head east or west in order to cross a bridge. In this manner, since there are many cases in which a mobile body is unable to proceed in the direction in which the destination lies due to road configuration, a problem exists in that the use of a movement direction is insufficient to predict a destination.

An object of the present invention is to predict a destination using movement information from a start point to a current point even when a destination history does not exist.

Means to Solve the Problems

In order to solve the aforementioned problem, the destination prediction device in the present invention is a destination prediction device that predicts a destination, and includes: a map information accumulation unit which accumulates map information including at least positions of a plurality of points on a map and routes between the plurality of positions; a start position acquisition unit which acquires a start position of a mobile body; a current position acquisition unit which acquires a current position of the mobile body; a destination candidate position acquisition unit which acquires, based on the acquired current position, positions of a plurality of destination candidates that may potentially become destinations of the mobile body from the map information accumulation unit; a circuitousness calculation unit which calculates a circuitousness of a route from the start position to the position of the destination candidate which includes the current position, the circuitousness being a deviation from a route with a minimum route cost from the start point to the position of the destination candidate; and a destination prediction unit which predicts, as the destination, a destination candidate whose calculated circuitousness is the smallest among the destination candidates.

EFFECTS OF THE INVENTION

A destination prediction device according to the present invention predicts a destination using circuitousness. The use of circuitousness enables prediction of a destination of a mobile body even when there is no history of the destination.

BRIEF DESCRIPTION OF DRAWINGS

FIGS. 3(a) and 3(b) are diagrams showing examples of road information accumulated in a map information accumulation unit.

FIG. 7 is a diagram showing an example in which a circuitousness calculation unit calculates circuitousnesses.

FIG. 9 is a diagram showing an example in which a circuitousness calculation unit calculates circuitousnesses.

FIG. 13 is a block diagram showing a configuration of a destination prediction device according to a first modification of the first embodiment of the present invention.

FIGS. 14(a) and 14(b) are diagrams showing examples of road information accumulated in a map information accumulation unit.

FIG. 16 is a diagram showing an example in which a circuitousness calculation unit calculates circuitousnesses.

FIG. 20 is a flowchart showing an example of operations of the destination prediction device according to the first modification of the first embodiment of the present invention.

FIGS. 22(a) and 22(b) are diagrams showing examples of destination candidates to be acquired by a traffic volume detection position acquisition unit.

FIG. 25 is a diagram showing an example in which the route cost calculation unit calculates route costs with respect to destination candidate ID "002".

FIG. 28 is a diagram showing an example in which the circuitousness calculation unit calculates circuitousnesses.

FIG. 32 is a diagram showing examples of destinations accumulated by a destination accumulation unit.

FIG. 36 is a diagram showing an example in which a circuitousness calculation unit calculates circuitousnesses.

FIG. 41 is a diagram showing examples of destinations to be accumulated by a destination accumulation unit.

FIG. 42 is a diagram showing examples of via point candidates.

FIG. 48 is a diagram showing an example in which a circuitousness calculation unit calculates circuitousnesses.

FIG. 52 is a diagram showing examples of circuitousness rankings.

FIG. 56 is a diagram showing examples of landmark information accumulated in a map information accumulation unit.

NUMERICAL REFERENCES

Figure 1:
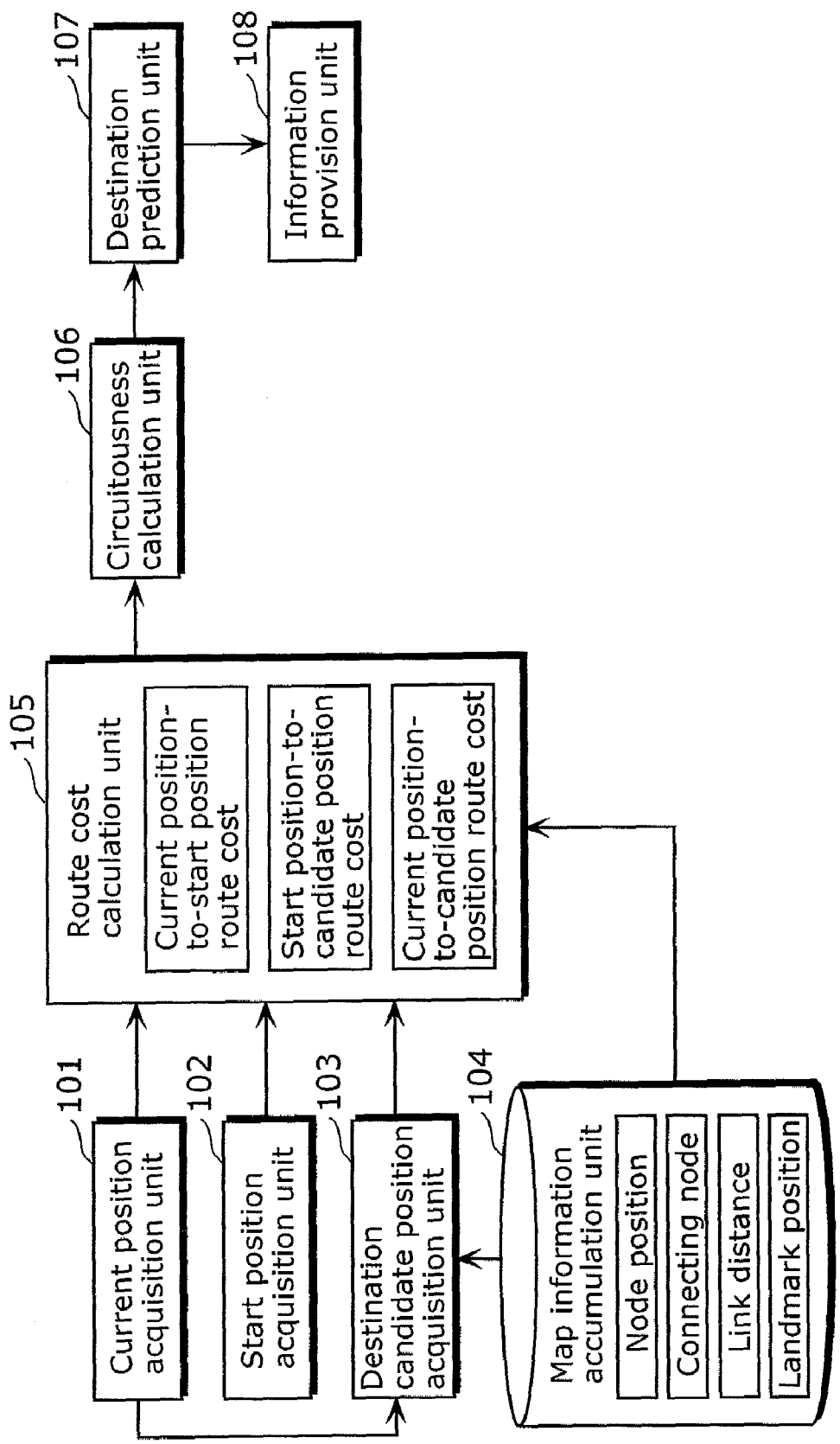
FIG. 1 is a block diagram showing a configuration of a destination prediction device according to a first embodiment of the present invention.

101 Current position acquisition unit
102 Start position acquisition unit
103 Destination candidate position acquisition unit
104 Map information accumulation unit
105 Route cost calculation unit 106 Circuitousness calculation unit
107 Destination prediction unit
108 Information provision unit
901 Current position acquisition unit
902 Start position acquisition unit
903 Traffic volume detection position acquisition unit
904 Map information accumulation unit
905 Route cost calculation unit
906 Circuitousness calculation unit
907 Destination prediction unit
908 Information provision unit
1603 Destination candidate position acquisition unit
1604 Destination history accumulation unit
1905 Route cost calculation unit
1906 Circuitousness calculation unit
1907 Via point judgment unit
1908 Information provision unit
1909 Destination acquisition unit
1910 Via point prediction unit
2403 Destination candidate position acquisition unit
2404 Destination history accumulation unit
2805 Route cost calculation unit
2806 Circuitousness calculation unit
2807 Destination erroneous setting detection unit
2808 Information provision unit
3302 Start position acquisition unit
3307 Information provision rule accumulation unit
3308 Information provision unit
3309 Destination acquisition unit
3310 Destination registration unit
3701 Current position acquisition unit
3702 Start position acquisition unit
3704 Map information accumulation unit
3705 Route cost calculation unit
3706 Circuitousness calculation unit
3710 Waiting time calculation unit
5104 Map information accumulation unit
5107 Destination prediction unit
5109 Road width storage unit
5110 Event occurrence detection unit
5111 Event position storage unit
5112 Distance calculation unit
5113 Distance threshold calculation unit
5114 Distance limiting unit
5805 Route cost calculation unit
5811 Junction prediction unit
5812 Branch calculation unit
5813 Traffic jam information acquisition unit
5814 Traffic jam avoidance judgment unit
6104 Map information accumulation unit
6105 Route cost calculation unit
6106 Circuitousness calculation unit
6108 Information provision unit
6110 Destination setting method acquisition unit
6111 Retrieval formula creation unit
6112 Similar position calculation unit
6113 Destination prediction unit
6410 Arrival judgment unit
6411 Circuitousness accumulation unit
6412 Threshold calculation unit

BEST MODE FOR CARRYING OUT THE INVENTION

First Embodiment

FIG. 1 shows a configuration of a destination prediction device according to the present embodiment. The destination prediction device shown in FIG. 1 includes: a current position acquisition unit 101; a start position acquisition unit 102; a destination candidate position acquisition unit 103; a map information accumulation unit 104; a route cost calculation unit 105; a circuitousness calculation unit 106; a destination prediction unit 107; and an information provision unit 108.

The destination prediction device in the first embodiment corresponds to a "destination prediction device that predicts a destination, and includes: a map information accumulation unit which accumulates map information including at least positions of a plurality of points on a map and routes between the plurality of positions; a start position acquisition unit which acquires a start position of a mobile body; a current position acquisition unit which acquires a current position of the mobile body; a destination candidate position acquisition unit which acquires, based on the acquired current position, positions of a plurality of destination candidates that may potentially become destinations of the mobile body from the map information accumulation unit; a circuitousness calculation unit which calculates a circuitousness of a route from the start position to the position of the destination candidate which includes the current position, the circuitousness being a deviation from a route with a minimum route cost from the start point to the position of the destination candidate; and a destination prediction unit which predicts, as the destination, a destination candidate whose calculated circuitousness is the smallest among the destination candidates". The map information accumulation unit 104 corresponds to the "map information accumulation unit"; the start position acquisition unit 102 corresponds to the "start position acquisition unit"; the current position acquisition unit 101 corresponds to the "current position acquisition unit", the destination candidate position acquisition unit 103 corresponds to the "destination candidate position acquisition unit"; the circuitousness calculation unit 106 corresponds to the "circuitousness calculation unit"; and the destination prediction unit 107 corresponds to the "destination prediction unit".

Furthermore, the destination prediction device corresponds to the "destination prediction device that further includes: a current position-to-candidate position route cost calculation unit which identifies a route between the current position and the position of the destination candidate by using the map information, and calculates a current position-to-candidate position route cost that is the route cost with respect to the identified route; a start position-to-current position route cost calculation unit which identifies a route between the start position and the current position by using the map information, and calculates a start position-to-current position route cost that is the route cost with respect to the identified route; and a start position-to-candidate position route cost calculation unit which identifies a route between the start position and the position of the destination candidate by using the map information, and calculates a start position-to-candidate position route cost that is the route cost with respect to the identified route, wherein the destination candidate position acquisition unit acquires a position of a destination candidate that lies within a predetermined range from the current position of the mobile body, the current position-to-candidate position route cost calculation unit, the start position-to-current position route cost calculation unit, and the start positionto-candidate position route cost calculation unit respectively calculate the current position-to-candidate position route cost, the start position-to-current position route cost, and the start position-to-candidate position route cost using any one of a distance of a route between a start point and an end point and an amount of time required for movement between the start point and the end point, and the circuitousness calculation unit calculates the circuitousness by subtracting the start position-to-candidate position route cost from the sum of the current position-to-candidate position route cost and the start position-to-current position route cost". The route cost calculation unit 105 corresponds to the "current position-to-candidate position route cost calculation unit", the "start position-to-current position route cost calculation unit", and the "start position-to-candidate position route cost calculation unit"; the destination candidate position acquisition unit 103 corresponds to the "destination candidate position acquisition unit"; and the circuitousness calculation unit 106 corresponds to the "circuitousness calculation unit".

Hereinafter, each component will be described first with reference to the drawings, followed by a description on operations of the present device.

The current position acquisition unit 101 detects a current point of a mobile body using a Global Positioning System (GPS) antenna or an Integrated Circuit (IC) tag, base station communication, image recognition and the like. Information on the longitude and latitude of a mobile body is detected, such as longitude "134.5.59.9" east and latitude "34.5.15.6" north.

The start position acquisition unit 102 acquires a start position at which the mobile body had started its movement. For example, among positions at which the mobile body had not moved for a given length of time or more, the position closest to the current time is to be used as a start position. As for positional information, information on the longitude and latitude of a start position is detected, such as longitude "134.5.59.9" east and latitude "34.5.15.6" north. The start position may alternatively be a building or a landmark in which the mobile body had last stayed. In addition, in the case where the mobile body is a vehicle, a position at which the engine was last started may be used. A position at which the number of passengers was last changed may also be used.

Figure 2:
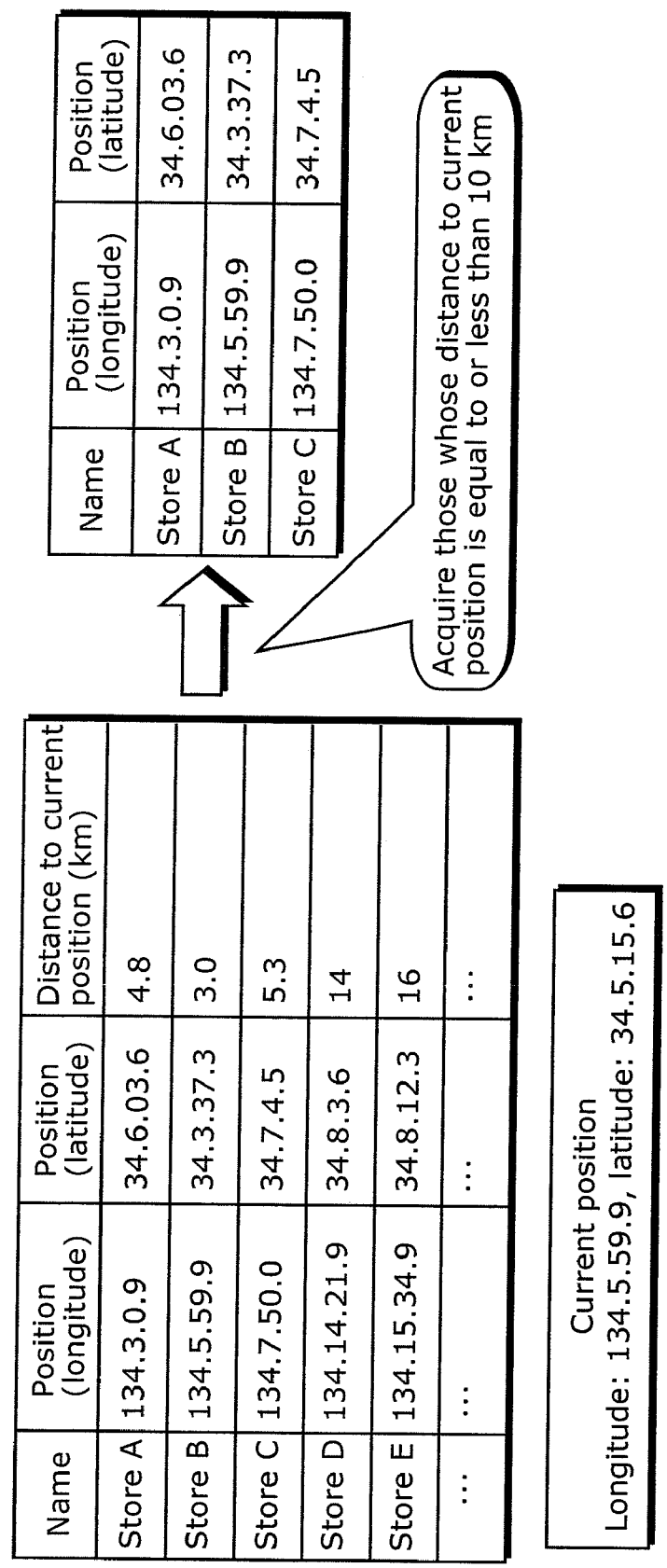
FIG. 2 is a diagram showing examples of destination candidates to be acquired by a destination candidate position acquisition unit.

The destination candidate position acquisition unit 103 acquires positions of destination candidates of the mobile body such as those shown in FIG. 2. For example, landmarks accumulated in the map information accumulation unit 104 which lie within a predetermined range from the current position of the mobile body are used as destination candidates. More specifically, distances between landmarks accumulated in the map information accumulation unit 104 and the current position are calculated, whereby only landmarks whose distances are equal to or less than a predetermined value, for example, 10 km, are extracted. In the case of FIG. 2, destination candidates "Store A" (4.8 km), "Store B" (3.0 km), and "Store C" (5.3 km) whose distances from the current position are equal to or less than 10 km are extracted.

The map information accumulation unit 104 accumulates road information such as positions and link distances. For example, as shown in FIG. 3, node positions, connecting nodes, and distances of links connecting the nodes are accumulated. Node ID "001" shown in FIG. 3 has a node position of longitude "134.3.0.9" and latitude "34.6.3.6", and is connected to node IDs "002", "003", "004", and "005". In addition, link ID "001" is a link connecting the start point node ID "001" and the end point node ID "002", and is shown to have a link distance of "1 km". Furthermore, positions of landmarks such as stores and places of interest are accumulated.

The route cost calculation unit 105 calculates a route cost using road information accumulated in the map information accumulation unit 104 such as node positions, connecting nodes, and link distances. Calculated are: a minimum route cost between a current position acquired by the current position acquisition unit 101 and a start position acquired by the start position acquisition unit 102; a minimum route cost between the current position acquired by the current position acquisition unit 101 and a destination candidate position acquired by the destination candidate position acquisition unit 103; and a minimum route cost between the start position acquired by the start position acquisition unit 102 and the destination candidate position acquired by the destination candidate position acquisition unit 103.

Figure 4:
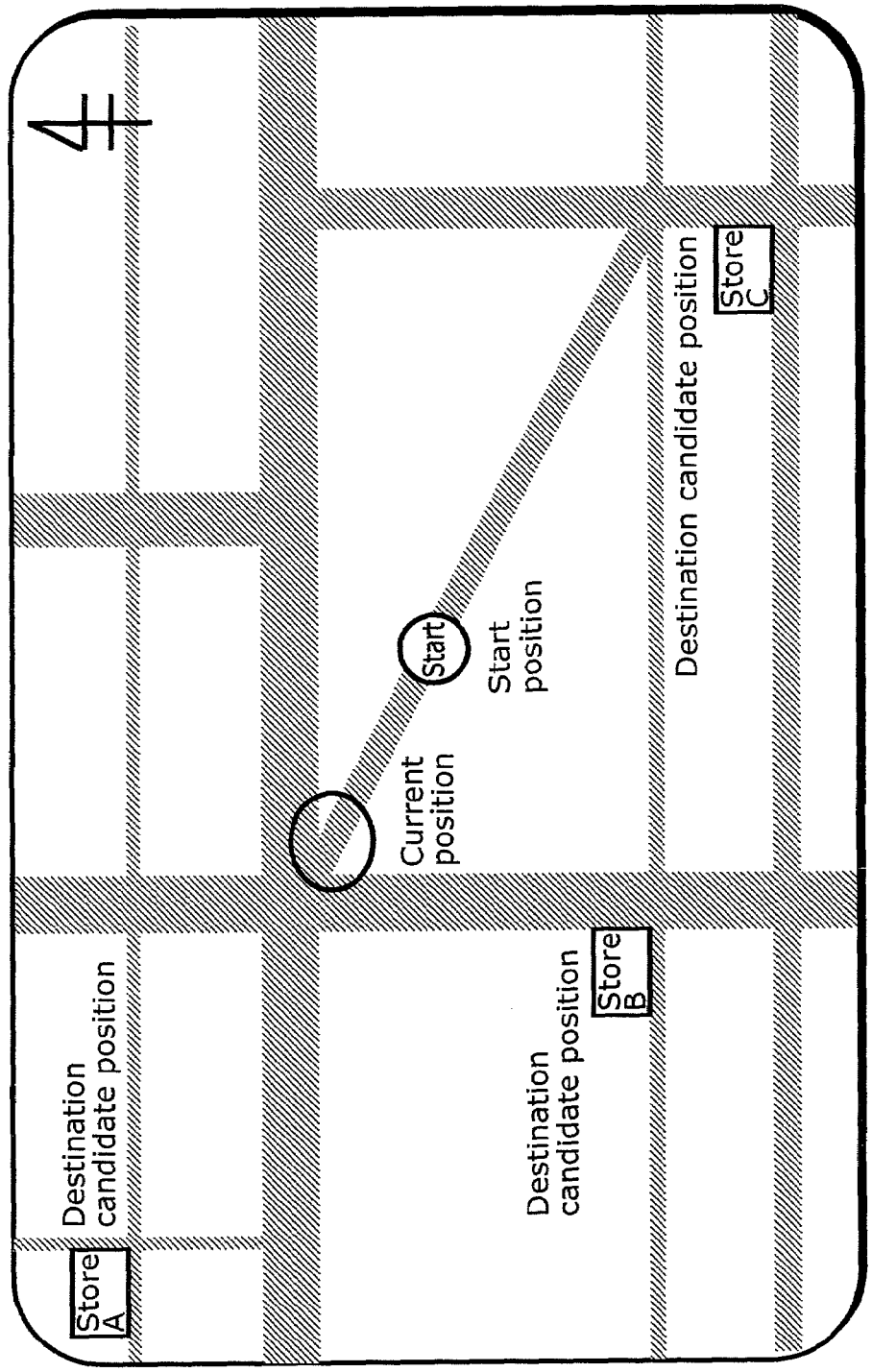
FIG. 4 is a diagram showing an example of a current position and destination candidate positions.
Figure 5:
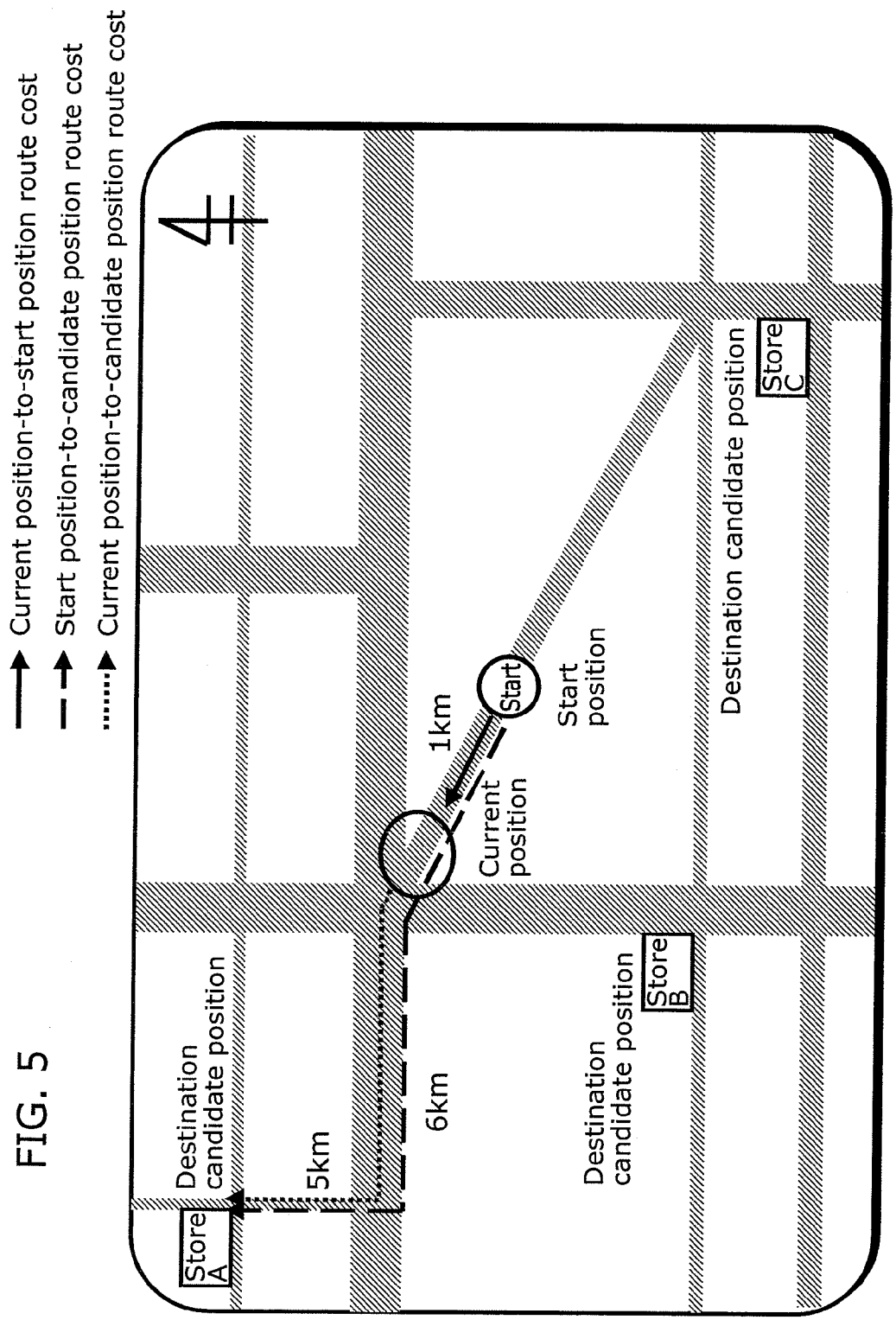
FIG. 5 is a diagram showing an example in which a route cost calculation unit calculates route costs with respect to destination candidate Store A.
Figure 6:
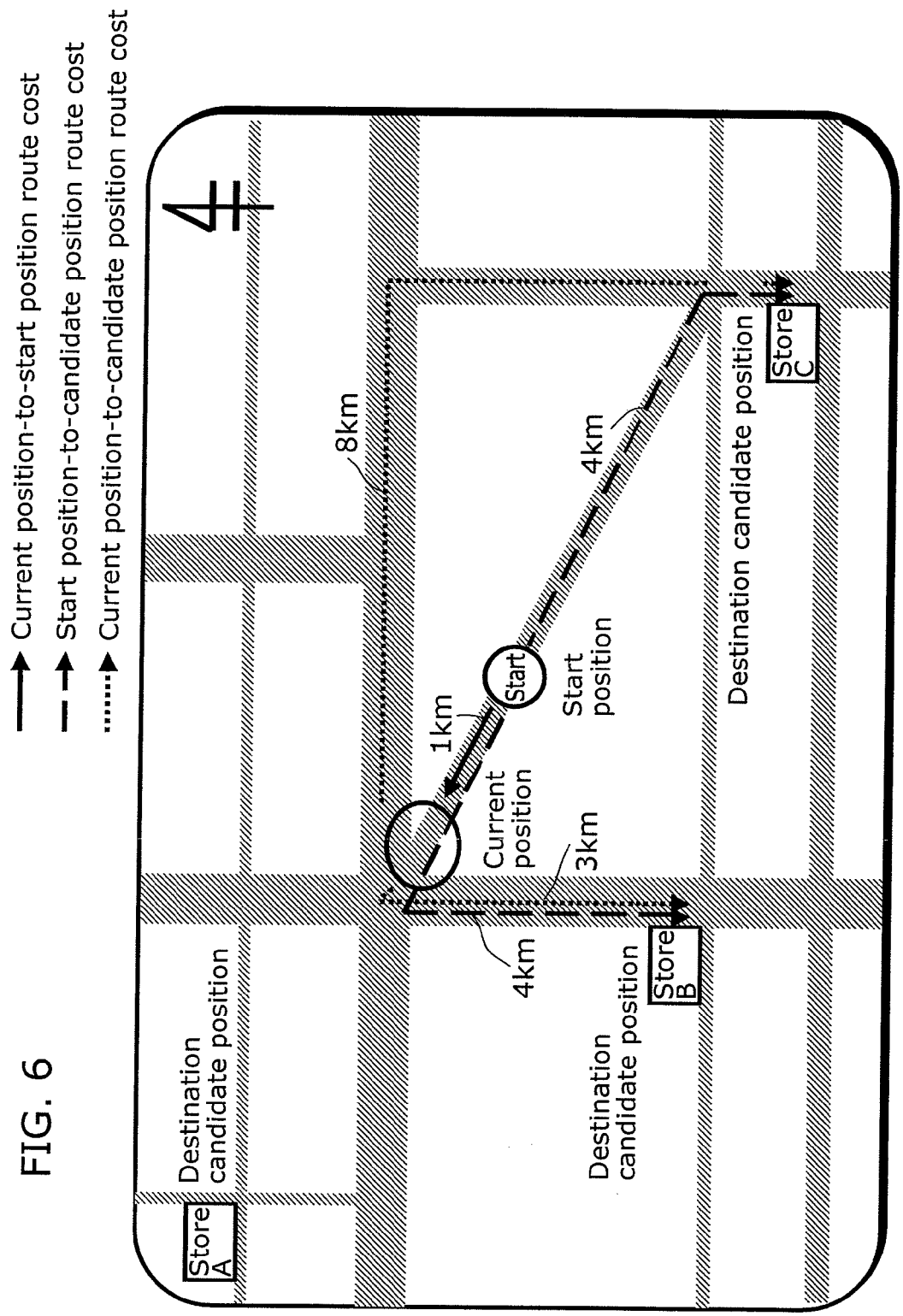
FIG. 6 is a diagram showing an example in which the route cost calculation unit calculates route costs with respect to destination candidates stores B and C.

A route cost refers to a degree of burden of a movement placed on a user when the user moves along a certain route. More specifically, a route cost is an amount of time required for movement, a movement distance, a psychological burden, and the like, and is calculated from distances of the route between positions such as a start position, a current position, and a destination candidate position, an amount of time required when traveling along the route, a road type, road regulation information, the number of right and left turns, or the like. For example, the sum of road distances traveled when moving between positions is to be used as a route cost. A minimum route cost used when calculating circuitousness is the smallest route cost among a plurality of conceivable routes for moving between positions. For example, as shown in FIG. 4, when a current position, a start position, a destination candidate position, and map information have been acquired, as shown in FIG. 5, the route cost between the current position and the start position is "1 km" and with respect to destination candidate "Store A", the route cost between the start position and the candidate position is "6 km" while the route cost between the current position and the candidate position is "5 km", and as shown in FIG. 6, with respect to destination candidate "Store B", the route cost between the start position and the candidate position is "4 km" while the route cost between the current position and the candidate position is "3 km", and with respect to a destination candidate "Store C", the route cost between the start position and the candidate position is "4 km" while the route cost between the current position and the candidate position is "8 km" because the route travels along the narrow dashed line.

The circuitousness calculation unit 106 calculates a circuitousness from route costs calculated by the route cost calculation unit 105. A circuitousness is an amount of deviation of a route between a start position and a destination candidate position including a current position from a route having a minimum route cost from the start position to the destination candidate position. In the present embodiment, a circuitousness is a difference between the cost of a movement route when a mobile body travels, without sidetracking, along the route currently traveled by the mobile body and arrives at the destination and the minimum route cost between the start position and the destination. More specifically, a circuitousness is a value obtained by subtracting the start position-to-candidate position route cost from the sum of the current position-to-start position route cost and the current position-to-candidate position route cost. For example, when route costs are calculated as shown in FIGS. 4, 5 and 6, as shown in FIG. 7, the circuitousness regarding destination candidate "Store A" is the difference "0 km" between the sum "6 km" of the current position-to-start position route cost "1 km" and the current position-to-candidate position route cost "5 km" and the start position-to-candidate position route cost "6 km". Similarly, the circuitousness regarding destination candidate "Store B" is "0 km" (1 km+3 km−4 km) and the circuitousness regarding destination candidate "Store C" is "5 km" (1 km+8 km−4 km).

Figure 8:
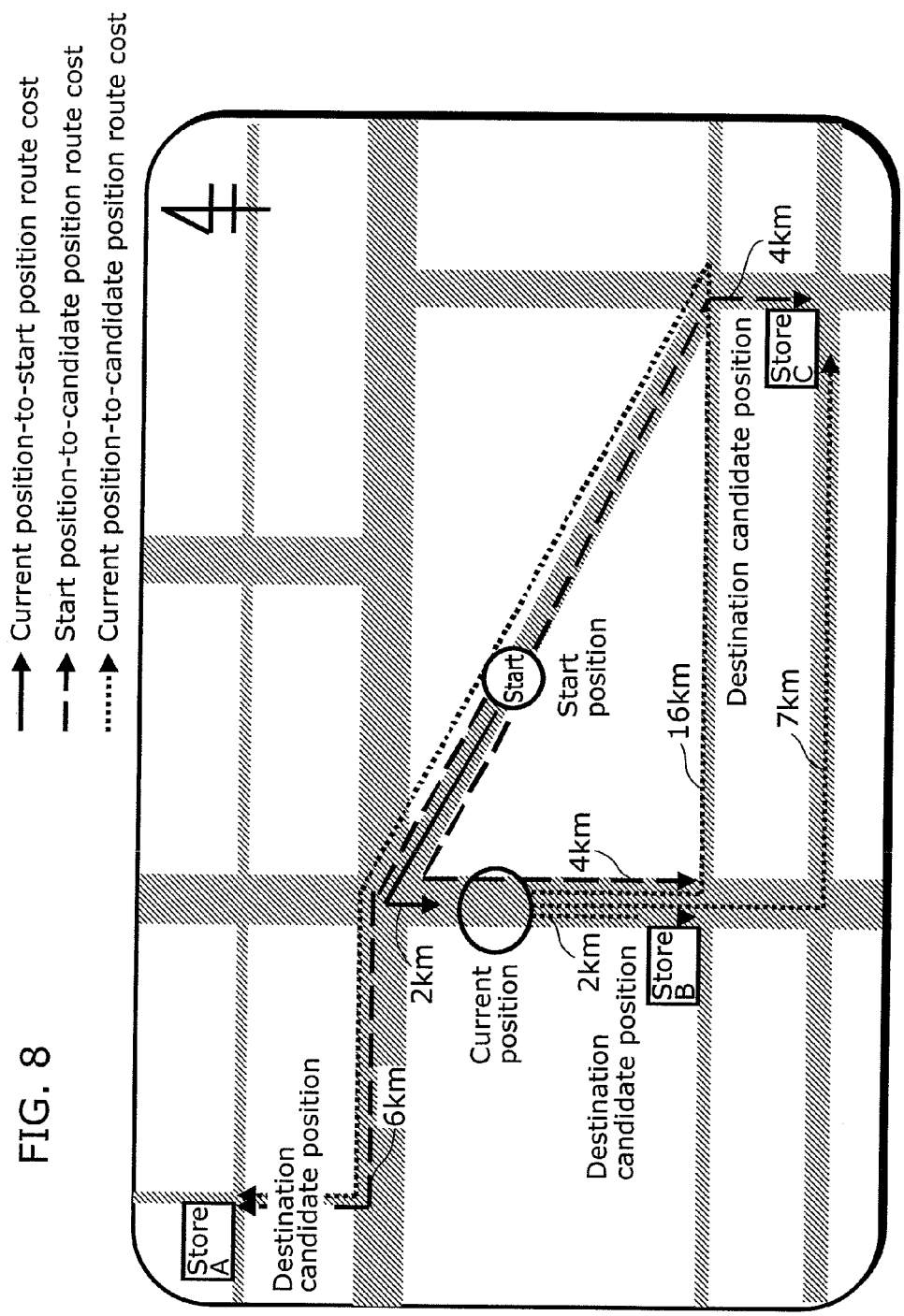
FIG. 8 is a diagram showing an example of a current position and destination candidate positions.

The destination prediction unit 107 predicts a destination of a mobile body from circuitousnesses calculated by the circuitousness calculation unit 106. When heading towards a destination, a mobile body tends to move so as to reduce the route cost required for movement. Therefore, the circuitousness that is a cost difference with respect to a minimum cost is also reduced. Accordingly, a destination whose circuitousness is smallest is to be used as the destination. For example, in the case of FIG. 4, "Store A" (circuitousness 0 km) or "Store B" (circuitousness 0 km) having minimum circuitousness is the destination. In addition, let us assume that the mobile body further moves to a state shown in FIG. 8. At this point, as shown in FIG. 9, the circuitousness regarding "Store A" is "12 km" (2 km+16 km−6 km), the circuitousness regarding "Store B" is "0 km" (2 km+2 km−4 km) and the circuitousness regarding "Store C" is "5 km" (2 km+7 km−4 km). The destination having minimum circuitousness is "Store B" (circuitousness 0 km) and, accordingly, may be narrowed down to one destination. In this manner, prediction becomes more accurate as movement distance increases.

Figure 10:
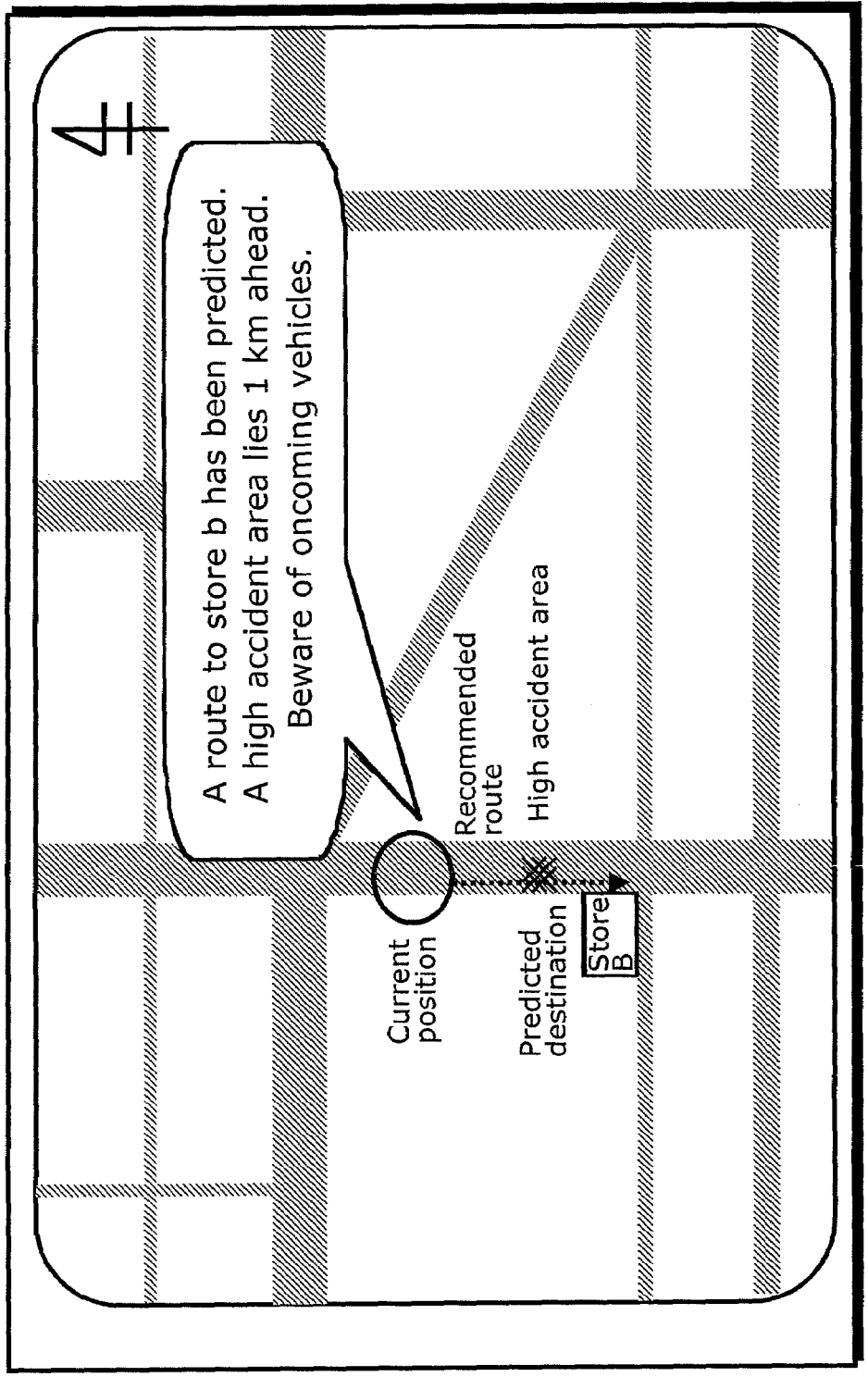
FIG. 10 is a diagram showing an example in which an information provision unit provides information related to a predicted destination.

The information provision unit 108 provides information to a user through a screen of the destination prediction device or through audio in accordance with a destination predicted by the destination prediction unit 107. For example, as shown in FIG. 10, when "Store B" is predicted as the destination of the mobile body, traffic information on routes to "Store B" or recommended routes, and sale information of "Store B" can be provided.

As described above, since a destination can be predicted using circuitousness, it is now possible to provide routes to the predicted destination, provide information on stores at the destination or on the routes, traffic information and traffic jam information, and filter information to be provided.

Figure 11:
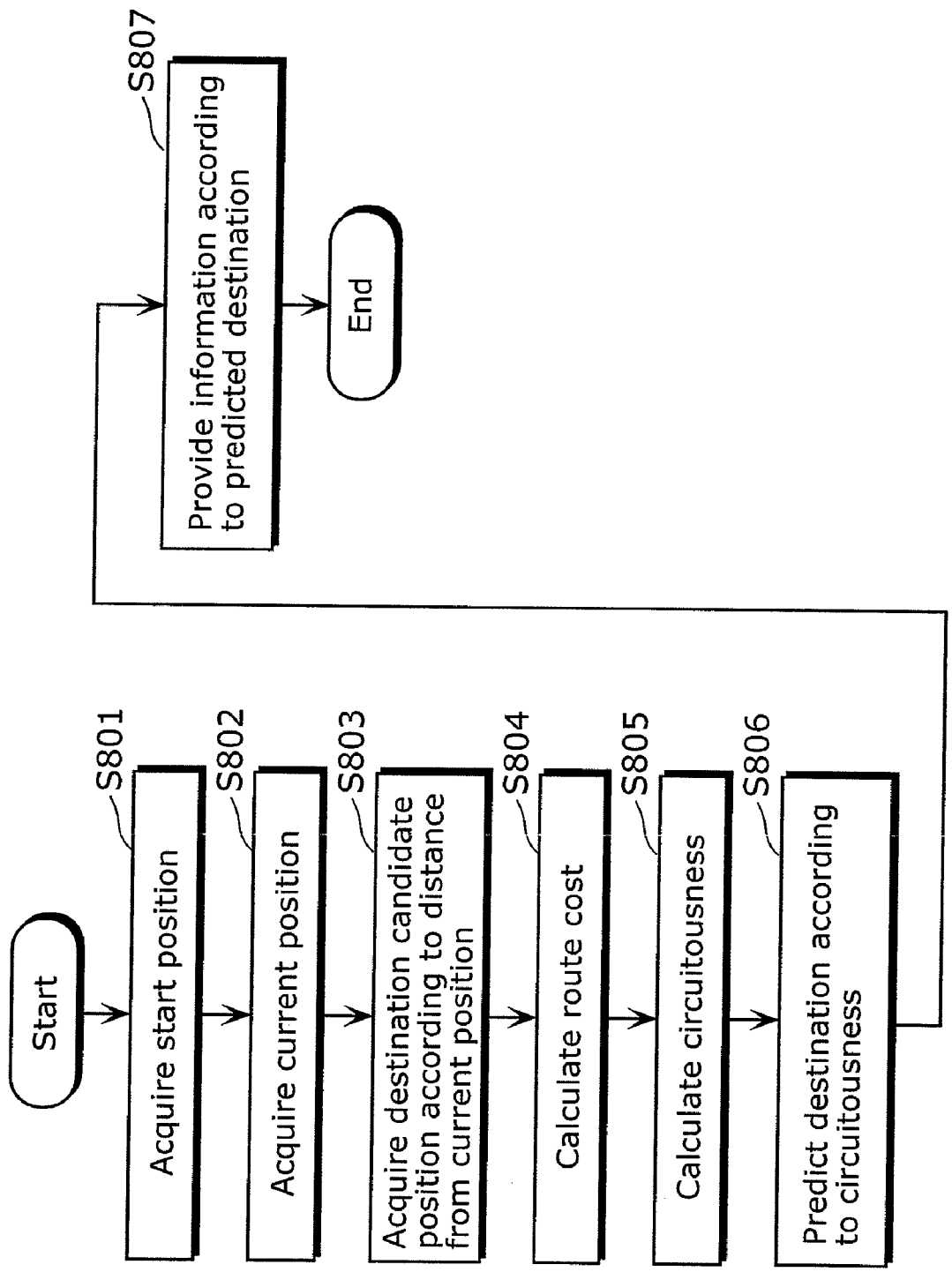
FIG. 11 is a flowchart showing an example of operations of the destination prediction device according to the first embodiment of the present invention.

A flowchart according to the first embodiment will now be described with reference to FIG. 11.

First, the start position acquisition unit 102 acquires a start position at which a mobile body had started its movement (step S801). The current position acquisition unit 101 acquires a current position by means of GPS or the like (step S802). The destination candidate position acquisition unit 103 acquires landmark positions within a predetermined range from the current position from the map information accumulation unit 104 (step S803). Using road information accumulated in the map information accumulation unit 104, the route cost calculation unit 105 calculates a route cost between the current position and the start position, a route cost between the current position and the destination candidate position, and a route cost between the start position and the destination candidate position (step S804). The circuitousness calculation unit 106 calculates circuitousnesses from route costs calculated by the route cost calculation unit 105 (step S805). The destination prediction unit 107 predicts a destination of the mobile body from circuitousnesses calculated by the circuitousness calculation unit 106 (step S806). The information provision unit 108 provides information to a user in accordance with the destination predicted by the destination prediction unit 107 (step S807).

Moreover, for the present embodiment, the calculation of circuitousness by the circuitousness calculation unit 106 was described as to be performed at regular timings. On the other hand, with terminals such as for a car navigation system and the like, a plurality of programs such as map scrolling associated with the movement of a vehicle, position detection by a GPS antenna, as well as acquisition of Vehicle Information and Communication System (VICS) (registered trademark) information are running simultaneously. Consequently, there may be cases where circuitousnesses cannot be constantly calculated due to computational limitations. In consideration thereof, timings at which circuitousness is to be calculated may be calculated in advance. For example, as is the case with the present embodiment, when there are two destination candidates "Store A" and "Store B", routes are accumulated for which a route cost from the current point to each candidate position has been calculated. Next, for the plurality of accumulated routes, intersections at which routes branch off are detected. As a vehicle passes through such intersections, it is possible to judge whether the vehicle is heading towards "Store A" or "Store B". As a result, it is now possible to estimate a destination by calculating circuitousness described in the present embodiment when the vehicle passes through such intersections.

Moreover, with the embodiment described above, while destination candidates are narrowed down to a destination candidate having minimum circuitousness, circuitousness need not necessarily be minimum. Instead, destination candidates may be narrowed down so that the circuitousness equals or falls below a predetermined threshold (first threshold). In other words, either in addition to a destination candidate having minimum circuitousness or in place of a destination candidate having minimum circuitousness, one or a plurality of destination candidates whose circuitousness equals or falls below a preset threshold (first threshold) may be predicted as destinations. In particular, when predicting a destination in order to provide road traffic information or commercial information, a user does not necessarily always desire information on only one destination. It is possible that the user is unsure as to which destination to head to among a plurality of destinations. In such a case, by providing information on a plurality of destination candidates whose circuitousness is equal to or falls under a predetermined threshold and are more likely to become destinations, the user is able to determine which destination to head to based on the information. In this case, the threshold may either be a fixed value or a user-settable value.

In addition, destination candidates may be selected in sequence starting from a destination candidate having minimum circuitousness so that a preset number of destination candidates (e.g., three) is obtained. In this case, the number of destinations to be predicted may be any of a fixed value, a user-settable value, and a value that automatically varies depending on the status of the user. Specifically, when a user is provided with road traffic information, the volume of information desired by the user differs according to the status of the user. For example, while a user is able to view a large volume of information when the vehicle is stationary, the user is only able to view a small volume of information when driving. Presenting a large volume of information to the user when the vehicle is moving may hinder driving. Therefore, according to the status of the user, the number of destinations to be predicted may be varied, whereby destinations are selected starting from a destination having minimum circuitousness until a predetermined number is obtained and information of the selected destination is provided. Accordingly, information provision depending on status becomes possible.

Moreover, a destination predicted based on circuitousness may be a tentative destination instead of a final destination. In other words, instead of determining a plurality of destination candidates selected according to circuitousness as final destinations and providing information on all final destinations, a plurality of destination candidates selected according to circuitousness may be deemed tentative destinations, whereby a final destination may be determined from among the tentative destinations using a different destination prediction method and information regarding the final destination may be provided. A different destination prediction method is, for example, as described in Patent Reference 1, a method in which a destination is predicted using past history. For example, among tentative destinations "Store A"', "Store B"' and "Store C"' selected according to circuitousnesses, a tentative destination having the highest number of previous visits by the user is determined to be the final destination. Accordingly, destination candidates that cannot become destinations from both perspectives of circuitousness and the different movement prediction method can be removed. Therefore, only information on locations having sufficient possibilities of becoming a destination can be provided to the user. Consequently, it is possible to prevent the hindering of user tasks such as driving caused by supplying the user with unnecessary information.

Furthermore, with the embodiment described above, circuitousness was defined as a value obtained by subtracting the start point-to-candidate point route cost from the sum of the start position-to-current position route cost and the current position-to-candidate position route cost regardless of the distance or the route cost to the destination candidate position. Although this calculation method is favorable in a case where the threshold of a distance range from the current position to the candidate position when the destination candidate position acquisition unit 103 selects destination candidates is small such as a case where a user seldom travels far, particularly in a case where the threshold of the distance range from the current position to the candidate position when the destination candidate position acquisition unit 103 selects destination candidates must be expanded such as a case where a user occasionally travels far, there is a problem in that only nearby predicted candidate positions end up being predicted as destinations because a large circuitousness is calculated for a faraway predicted candidate position even when the user travels a short distance along a road that differs from the minimum route cost. Accordingly, for a user who occasionally travels far, circuitousness may be normalized using a route cost from the start position to the destination candidate position. In other words, circuitousness is reduced as the distance or the route cost to a candidate position increases by inversely proportionating circuitousness to the distance or the route cost to the candidate position. More specifically, a value that is proportional to a value obtained by subtracting the start position-to-candidate position route cost from the sum of the current position-to-candidate position route cost and the start position-to-current position route cost and which is inversely proportional to the start position-to-candidate position route cost may be calculated as the circuitousness. Accordingly, a faraway destination can now be predicted even for a user who occasionally travels far. Moreover, instead of a route cost from the start point to a candidate position, a value divided by the distance from the start point to the candidate position or the amount of time required between the start point and the candidate position (a value inversely proportional to such a distance or an amount of time required) may be used as circuitousness.

First Modification of First Embodiment

Figure 12:
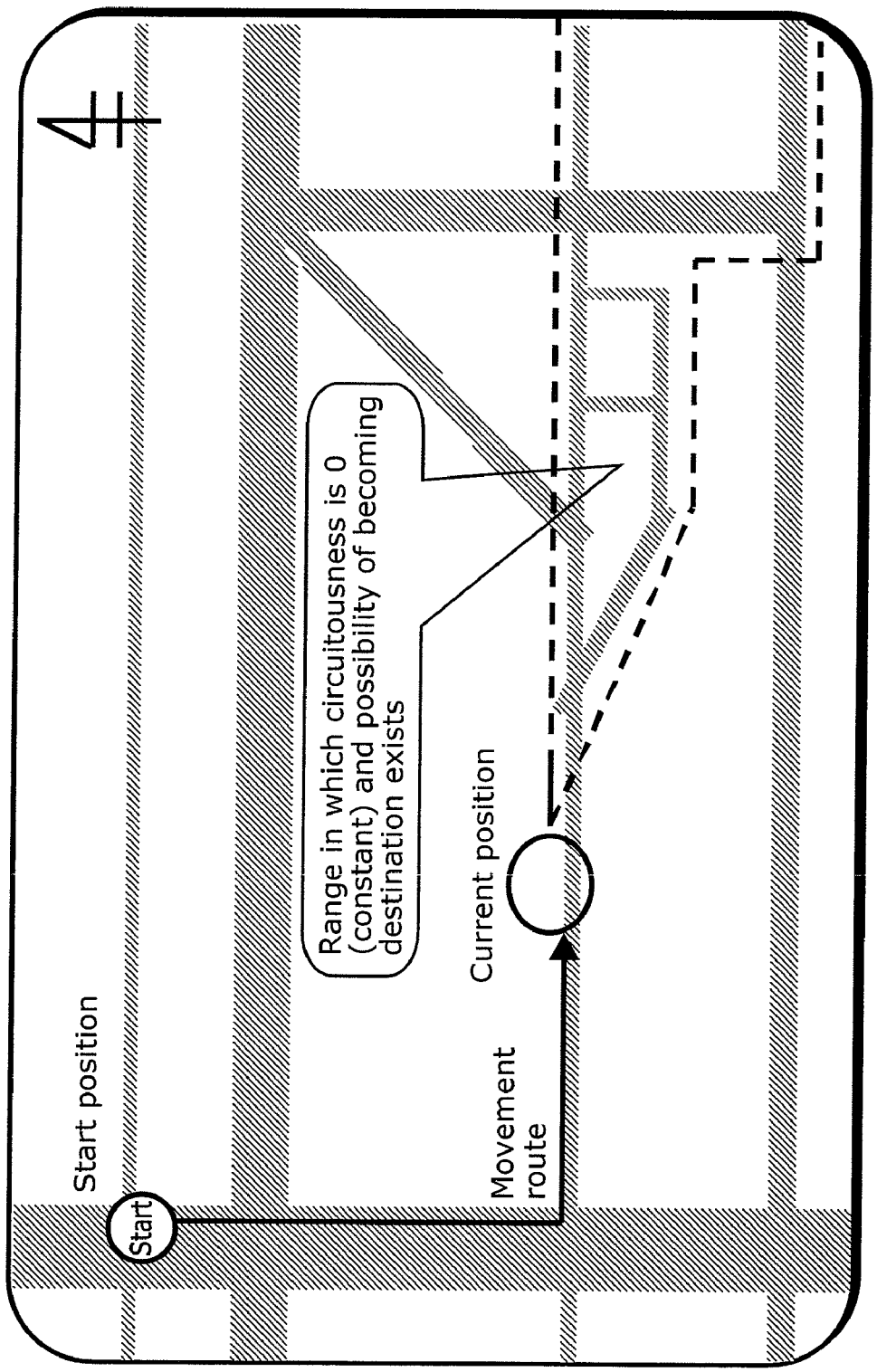
FIG. 12 is a diagram showing an example of a range in which exists destination candidates calculated from circuitousnesses to become destinations.

Moreover with the present first embodiment, a destination is predicted by calculating circuitousness from a start position, a current position and a destination candidate position. Using circuitousness makes it possible to limit a range in which a destination candidate may possibly become a destination, as shown in FIG. 12. However, when the circuitousness with respect to destination candidates is constant, a range is obtained in which the possibility of existence of a destination is the same regardless of the distance to a destination candidate. Therefore, as shown in FIG. 12, when a start point lies northwest and the current point was reached by moving south and then east, a destination candidate may become a destination candidate no matter how great its distance from the current point as long as the destination candidate lies to the east of the current point. However, by using a movement route from the start point to the current point, the range in which a destination candidate may become a destination can be further limited according to the distance to the destination candidate. Generally, when a mobile body is a vehicle, there is a tendency to travel as much as possible on roads with large road widths such as national roads. When traveling on a narrow road, a state often exists in which there is no option but to travel the narrow road because a wide road for moving to the destination does not exist. Therefore, generally, a tendency exists in which a vehicle first prefers taking a wide road after starting out, and after traveling on the wide road, when the destination faces a narrow road, the vehicle enters the narrow road immediately before arriving at the destination. Accordingly, a movement from a wide road to a narrow road presumably occurs immediately before the destination and the range in which the destination exists can be limited according to the distance to the destination. In consideration thereof, an existence and an occurrence position of an event in which a movement from a wide road to a narrow road is performed may be detected from the movement route from the start position to the current position, whereby a destination is predicted based on the distance from the event occurrence position to the destination candidate. Consequently, the range in which a destination candidate becomes a destination can be further limited by the movement route from the start position to the current position without using a past movement history in a similar manner as the case with circuitousness. For example, when a vehicle moves from a wide road to a narrow road, the range in which the destination exists can be limited using circuitousness and the distance from the event occurrence position and candidates of parking lots to become destinations of the mobile body can be presented.

A method of the present embodiment will now be described.

FIG. 13 is a configuration diagram of the destination prediction device according to the present embodiment. Components presented in the first embodiment described above are assigned like reference numerals and descriptions thereof will be omitted. Hereinafter, each component will be described first with reference to the drawings, followed by a description on operations of the present device.

This destination prediction device corresponds to the "destination prediction device that further includes: a road width acquisition unit which acquires a road width at the current position of the mobile body; an event occurrence detection unit which detects a position at which the road width has decreased compared to the acquired road width as an event occurrence position; and a distance limiting unit which removes, from destination candidates subsequent to the event occurrence position, a destination candidate that does not lie within an area which is surrounded by roads whose road widths are greater than the event occurrence position and which includes the event occurrence position, wherein the destination prediction unit predicts the destination from destination candidates that lie in the area surrounded by roads whose road widths are greater than the event occurrence position". An event occurrence detection unit 5110 corresponds to the "road width acquisition unit" and the "event occurrence detection unit"; a distance threshold calculation unit 5113 and a distance limiting unit 5114 correspond to the "distance limiting unit" and the "destination prediction unit".

The map information accumulation unit 5104 accumulates road information such as positions, widths, and link distances. For example, as shown in FIG. 14, node positions, connecting nodes, distances of links connecting the nodes, and road widths of links are accumulated. Node ID "001" shown in FIG. 14 has a node position of longitude "134.3.0.9" and latitude "34.6.3.6", and is connected to node IDs "002", "003", "004", and "005". In addition, link ID "001" is a link connecting the start point node ID "001" and the end point node ID "002", and is shown to have a road width of "5 m" and a link distance of "1 km". Furthermore, positions of landmarks such as stores and places of interest are accumulated.

A road width storage unit 5109 stores a road width calculated by the event occurrence detection unit.

Figure 15:
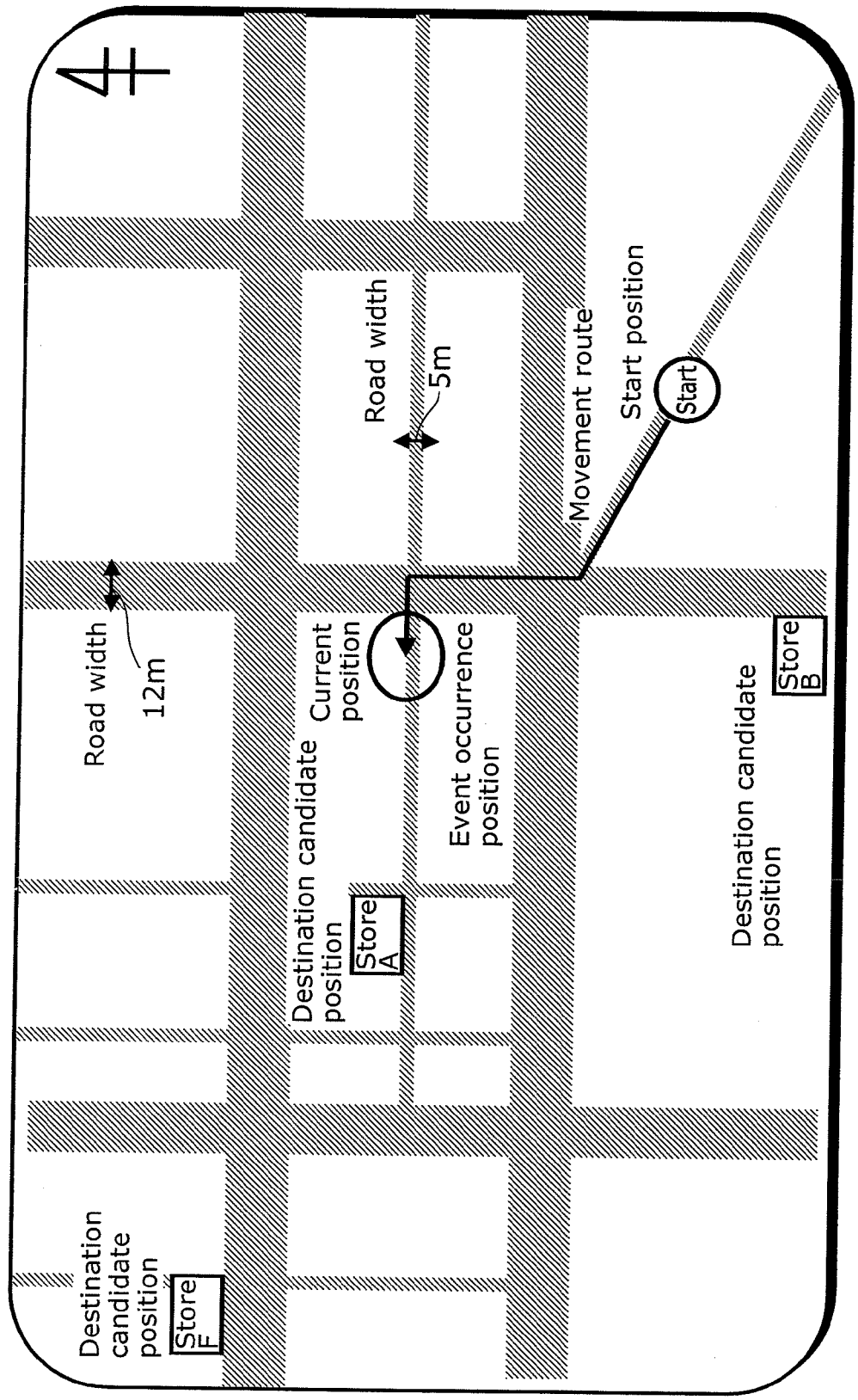
FIG. 15 is a diagram showing an example of a current position, destination candidate positions and an event occurrence position.

The event occurrence detection unit 5110 acquires a road width at the current position acquired, for example, once every second by the current position acquisition unit from the map information accumulation unit 5104. When the road width at the current point is below a predetermined value and the road width stored in the road width storage unit 5109 is equal to or greater than the predetermined value or, in other words, when entering a road with a small width from a road with a large width, an occurrence and an occurrence position of an event are detected and stored in an event position storage unit 5111. Next, the calculated most recent road width is stored in the event position storage unit 5111. A road width boundary value used for judging an occurrence of an entry event from a wide road to a narrow road is assumed to be 5.5 m that is the boundary between a single-lane road and a two-lane road. In other words, a current road width is calculated once every second, and when a change occurs from a road equal to or greater than 5.5 m to a road width less than 5.5 m, an occurrence of an event is detected and the current position at the time of occurrence is stored in the event point position storage unit 5111. For example, as shown in FIG. 15, an occurrence of an event is detected when the road width at the current position changes from 12 m to 5 m.

From the result of the event occurrence detection unit 5110, the event position storage unit 5111 stores an occurrence/non-occurrence and an occurrence position of an entry event from a road with a large width to a road with a small width between the start position and the current position.

The destination prediction unit 5107 predicts a destination of a mobile body from circuitousnesses calculated by the circuitousness calculation unit 106. When heading towards a destination, a mobile body tends to move so as to reduce the route cost required for movement. Therefore, the circuitousness that is a cost difference with respect to a minimum cost is also reduced. For this reason, all destinations whose circuitousness is less than a predetermined value, e.g., 1 km, are assumed to be destinations. For example, as shown in FIG. 15, when "Store A", "Store B", and "Store F" exist as destination candidates and circuitousnesses are detected as shown in FIG. 16, the destination is either "Store A" (circuitousness 0 km) or "Store F" (circuitousness 0 km) whose circuitousness is less than 1 km.

When an occurrence of an event is stored in the event position storage unit 5111, for a single or a plurality of destinations predicted by the destination prediction unit 5107, a distance calculation unit 5112 calculates the distance from the event occurrence position to the predicted destination.

Figure 17:
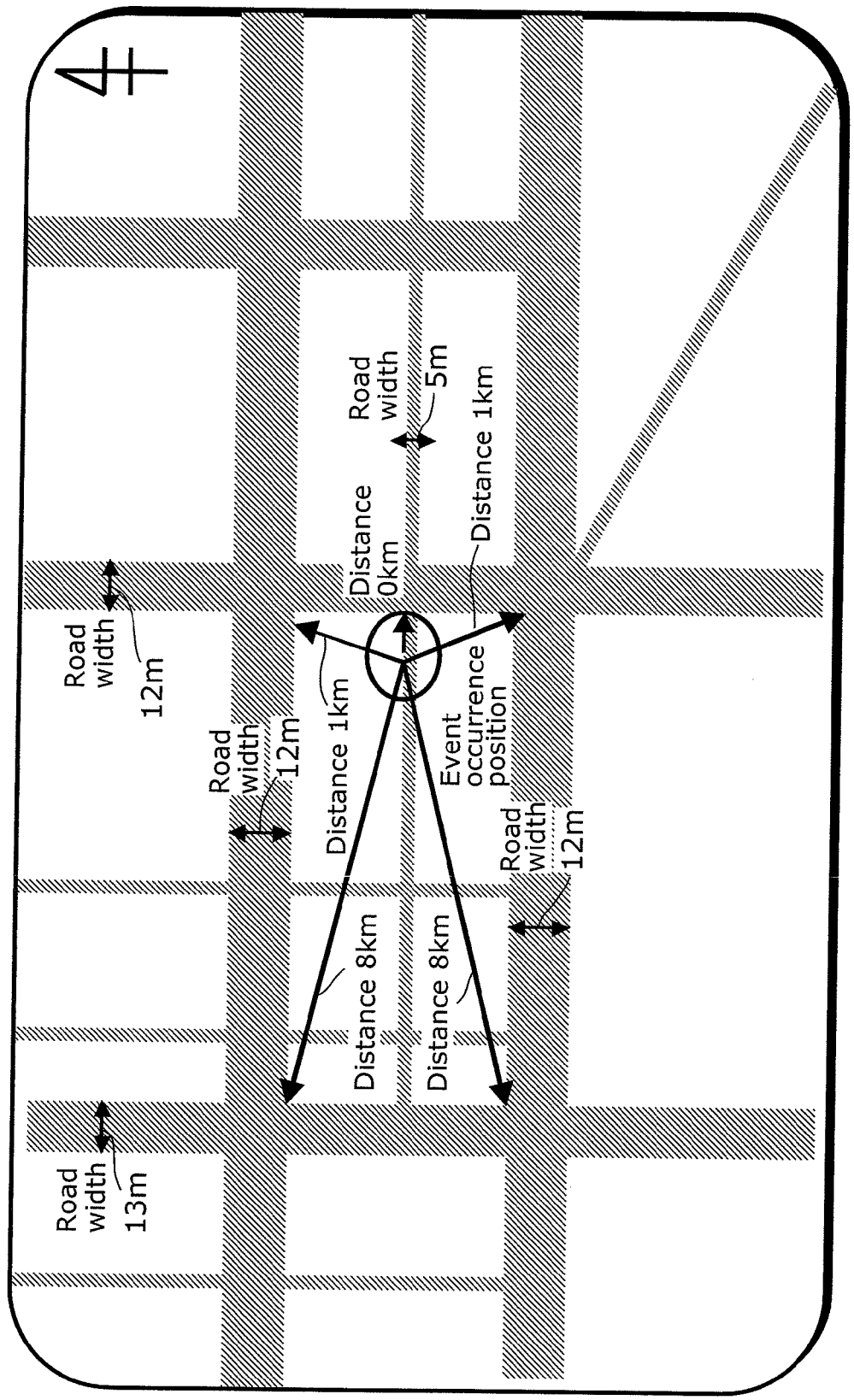
FIG. 17 is a diagram showing an example in which a distance threshold calculation unit calculates a distance threshold.

When an occurrence of an event is stored in the event position storage unit 5111, the distance threshold calculation unit 5113 calculates a distance threshold used by the distance limiting unit 5114 when removing a destination according to a distance to a predicted destination. A threshold is calculated using road information such as the event occurrence position stored in the event position storage unit 5111 and the "node position", "connecting node", "link distance", and "road width" stored in the map information accumulation unit 5104. More specifically, for all directions from the event occurrence position, a minimum distance is calculated to roads equal to or greater than a threshold "5.5 m" used for distinguishing between roads whose "road width" is large and roads whose "road width" is narrow, and among all directions of the calculated minimum distances, a value where the distance reaches maximum is used as the threshold. For example, when the relationships between an event occurrence position and roads are as shown in FIG. 17, a minimum distance to roads equal to or greater than "5.5" falls within a range equal to or greater than "0 km" and less than "8 km". Therefore, the maximum value "8 km" is to be used as the threshold.

When the distance to a destination is equal to greater than the maximum value of the distances from the event occurrence position to roads with large widths, even when a narrow road is not entered at the event occurrence position, a route to the destination exists which travels on a road with a large width to a position that is closer to the destination without increasing the number of left or right turns. Therefore, it is unnatural that a narrow road is entered at the event occurrence position. However, in the case where the distance to the destination is less than the maximum value of the distances from the event occurrence position to roads with large widths, the movement distance to the destination or the number of left or right turns may possibly increase unless a narrow road is entered at the event occurrence position. Therefore, when heading towards the destination, it is natural to enter a narrow road at the event occurrence position. As such, the maximum value of the distances from the event occurrence position to roads with large widths is used as the threshold.

Figure 18:
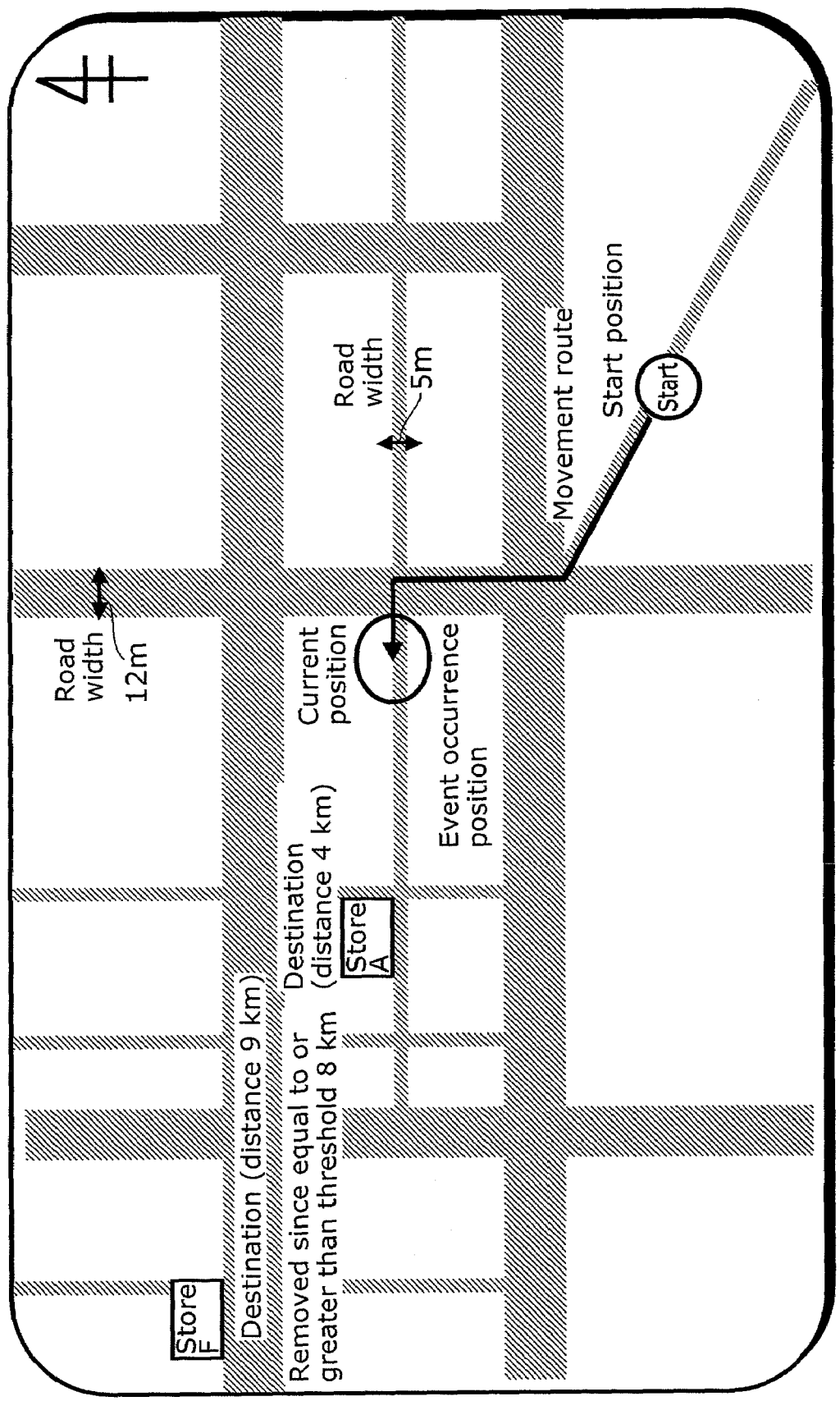
FIG. 18 is a diagram showing an example in which a distance limitation calculation unit removes a predicted destination based on a distance and a distance threshold.

When an occurrence of an event is stored in the event position storage unit 5111, with respect to a single or a plurality of destinations predicted by the destination prediction unit 5107, the distance limiting unit 5114 removes destinations whose distances from the event occurrence position calculated by the distance calculation unit 5112 is equal to or greater than the threshold calculated by the distance threshold calculation unit 5113 from the destinations, and outputs only destinations below the threshold as predicted destinations to the information provision unit 108. This is because the distance to the destination is limited when a movement from a road with a large width to a road with a small width occurs. For example, as shown in FIG. 18, when the destinations predicted by the destination prediction unit 5107 are "Store A" (whose distance calculated by the distance calculation unit 5112 is 4 km) and "Store F" (whose distance calculated by the distance calculation unit 5112 is 9 km) and the threshold calculated by the distance threshold calculation unit 5113 is 8 km, "Store F" is removed from the destinations since its distance is equal to or greater than 8 km, and "Store A" whose distance is less than 8 km is outputted as the destination.

A flowchart according to the first modification of the present first embodiment will now be described with reference to FIG. 20. Components presented in the first embodiment described above are assigned like reference numerals and descriptions thereof will be omitted.

After acquiring a start position and a current position in the same manner as in the first embodiment, the event occurrence detection unit 5110 detects a road width at the current position (step S5703). The event occurrence detection unit 5110 judges an occurrence of an event based on the road width (step S5704), and when a previous road width stored in the road width storage unit 5109 is equal to or greater than the threshold and the road width of the current position is less than the threshold (Yes in step S5705), the sequence proceeds to step S5705, and if not (No in step S5705), the sequence proceeds to step S5706. When the previous road width is equal to or greater than the threshold and the road width of the current position is less than the threshold, the event occurrence detection unit 5110 judges that an event has occurred, and stores the occurrence of the event and the event occurrence position to the event position storage unit 5111 (step S5705). The sequence then proceeds to step S5706. Subsequently, the road width storage unit 5109 stores the road width of the current position (step S5706). Thereafter, in the same manner as in the first embodiment, the destination candidate position acquisition unit 103 acquires landmark positions within a predetermined range from the current position from the map information accumulation unit 104 (step S803). Using road information accumulated in the map information accumulation unit 104, the route cost calculation unit 105 calculates a route cost between the current position and the start position, a route cost between the current position and the destination candidate position, and a route cost between the start position and the destination candidate position (step S804). The circuitousness calculation unit 106 calculates circuitousnesses from route costs calculated by the route cost calculation unit 105 (step S805). The destination prediction unit 107 predicts a destination of a mobile body from circuitousnesses calculated by the circuitousness calculation unit 106 (step S806). The distance calculation unit 5112 judges whether an existence of an event occurrence is stored in the event position storage unit 5111 (step S5707), and when an existence of an event occurrence is stored (Yes in step S5707), the sequence proceeds to step S5708. When an existence of an event occurrence is not stored (No in step S5707), the sequence proceeds to step S5711. When an existence of an event occurrence has been stored, the distance calculation unit 5112 calculates the distance from the event occurrence position stored by the event position storage unit 5111 to the destination predicted by the destination prediction unit 107 (step S5708). The distance threshold calculation unit 5113 calculates a threshold from the event occurrence position stored by the event position storage unit 5111 and the road information accumulated in the map information accumulation unit 5104 (step S5709). The distance limiting unit 5114 removes destinations whose distances calculated by the distance calculation unit 5112 is equal to or greater than the threshold calculated by the distance threshold calculation unit 5113 from the destinations predicted by the destination prediction unit 107 (step S5710). The information provision unit 108 provides information to a user in accordance with the destinations predicted by the destination prediction unit 107 with the exception of the destinations removed by the distance limiting unit 5114 (step S5711).

Figure 19:
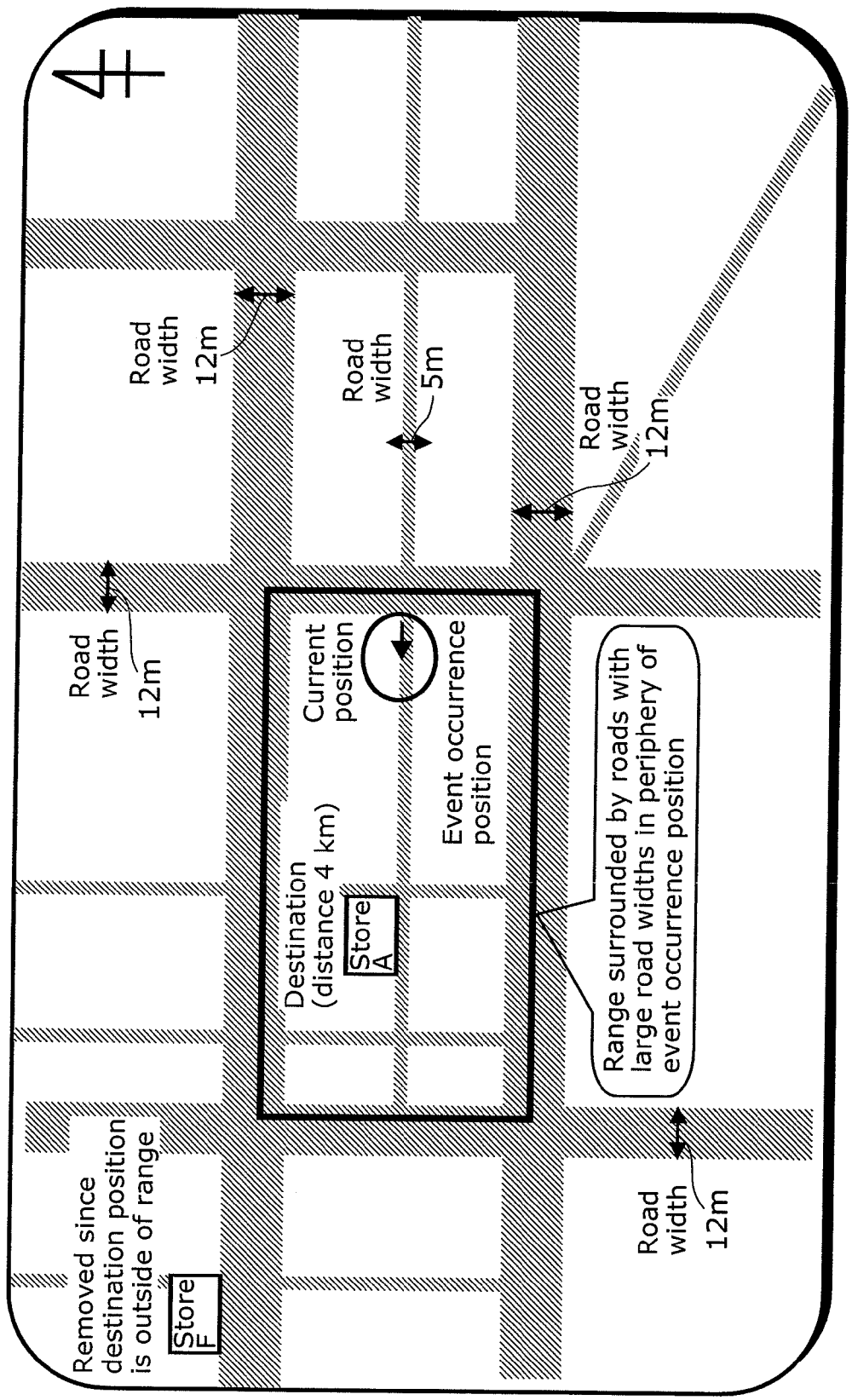
FIG. 19 is a diagram showing an example in which a predicted destination is removed based on a position of the predicted destination and a range surrounded by roads with large road widths.

Moreover, in the present embodiment, predicted destinations are removed based on the distance from the event occurrence position. However, a predicted destination may be removed when a road with a road width equal to or greater than the threshold exists between the event detection position and the predicted destination, whereby the predicted destination may be used as the destination when roads with road widths equal to or greater than the threshold do not exist. In other words, as shown in FIG. 19, when a position of a predicted destination does not exist in a range surrounded in roads with large road widths surrounding the event detection position, the predicted destination is removed. Accordingly, destinations which allow roads with larger road widths than a road with a small road width that is entered at the event occurrence position to be traveled on for a longer period of time can be removed more efficiently.

Moreover, with the present embodiment, a description was given to the effect that the distance to a destination can be limited when moving from a road with a large road width to a road with a small road width. However, there are cases where a road with a small road width is traveled intentionally in order to avoid traffic jams and to make a detour. In order to avoid this, when turning into a road with a small road width from a road with a large road width, by using the movement history of other vehicles, the distance to the destination may be limited only when the mobile body turns at an intersection at which other vehicles do not. In the case where a road with a small road width is a bypass for avoiding traffic jams, it is likely that other vehicles also travel on the bypass. Accordingly, the event occurrence detection unit 5110 detects an occurrence of an event only when entering, from a road with a large road width, a road with a small road width which is seldom entered by other vehicles from a road with a large road width.

Moreover, a description was given to the effect that the distance to a destination can be limited when moving from a road with a large road width to a road with a small road width. However, there are cases where a road with a small road width is traveled intentionally in order to avoid traffic jams and to make a detour. In order to avoid this, traffic jam information such as that of the VICS (Vehicle Information and Communication System) may be acquired, whereby the distance to the destination may be limited when turning into a road with a small road width from a road with a large road width and when there are no traffic jams in the current traveling direction of the mobile body. The event occurrence detection unit 5110 detects an occurrence of an event only when entering a road with a small road width from a road with a large road width and when there are no traffic jams in the current traveling direction of the mobile body.

Second Embodiment

In the first embodiment, destination candidates of a mobile body are acquired from landmarks accumulated in map information. However, a traffic volume detection position of a mobile body may be used as a destination candidate. A traffic volume detection position refers to, for example, a point in the vicinity of an exit of an intersection of a major arterial road or a point on an expressway at which a beacon is installed. A beacon is a device that communicates to a vehicle-mounted side VICS unit by means of infrared communication, quasi-microwave or Frequency Modulation (FM) multiplex broadcasting, senses a traffic volume, traveling directions, traffic lanes and the like of vehicles traveling directly underneath the beacon, and provides traffic information such as traffic jams, accidents, regulations, road construction, required amount of time to the destination and the like to the vehicle-mounted side VICS unit. The traffic volume detection position is a position where the mobile body generally travels frequently, and is likely to become destination. In addition, since the mobile body is likely to travel through locations having high traffic volumes, prediction may be performed more accurately using a detected traffic volume.

A method of the present embodiment will now be described.

Figure 21:
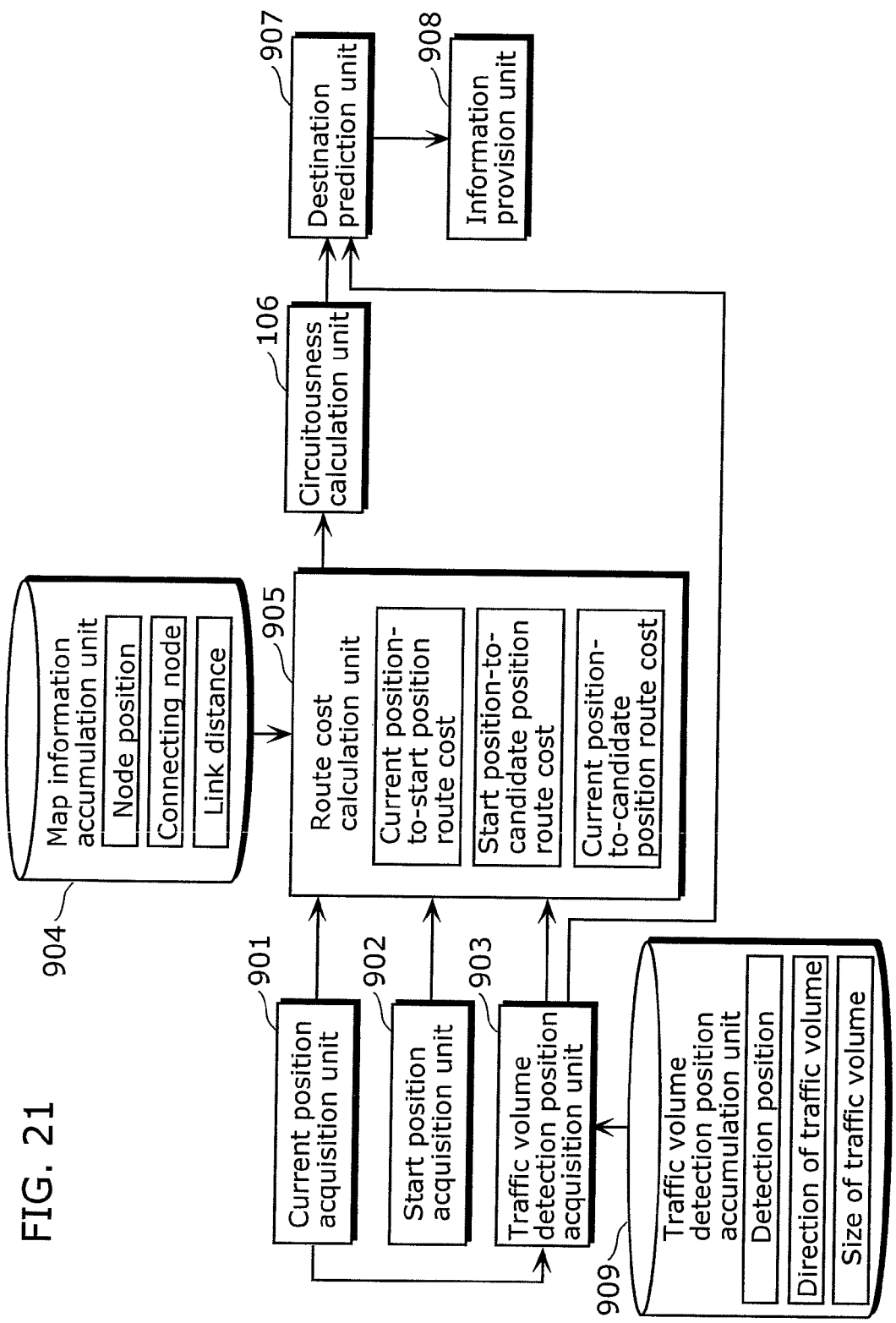
FIG. 21 is a block diagram showing a configuration of a destination prediction device according to a second embodiment of the present invention.

FIG. 21 is a configuration diagram of a destination prediction device according to the present embodiment. Components presented in the first embodiment described above are assigned like reference numerals and descriptions thereof will be omitted. Hereinafter, each component will be described first with reference to the drawings, followed by a description on operations of the present device.

The destination prediction device in the present embodiment corresponds to the "destination prediction device, wherein the destination candidate position acquisition unit acquires a position of the destination candidate by using a traffic volume detection point that is a point where a traffic information provider detects a traffic volume of mobile bodies as the destination candidate, the destination prediction device further includes: a traffic volume acquisition unit which acquires a traffic volume of each movement direction at each of the traffic volume detection points from the traffic information provider, the current position-to-candidate position route cost calculation unit calculates the current position-to-candidate position route cost according to the current movement direction of the mobile body for each direction in which the mobile body passes through each of the traffic volume detection points; the start position-to-candidate position route cost calculation unit calculates the start position-to-candidate position route cost for each direction in which the mobile body passes through each of the traffic volume detection points; and the destination prediction unit predicts, as the destination, the traffic volume detection point whose circuitousness is the smallest and for which the acquired traffic volume is the largest". Here, a traffic volume detection position acquisition unit 903 corresponds to the "destination candidate position acquisition unit" and the "traffic volume acquisition unit"; a route cost calculation unit 905 corresponds to the "current position-to-candidate position route cost calculation unit" and the "start position-to-candidate position route cost calculation unit"; and a destination prediction unit 907 corresponds to the "destination prediction unit".

The current position acquisition unit 901 detects a position and a direction of a current point of a mobile body using a GPS antenna or an IC tag, base station communication, image recognition and the like. Information on the longitude and latitude of a mobile body is detected such as longitude "134.5.59.9" east, latitude "34.5.15.6" north and direction "295 degrees". Direction is expressed as a direction angle with respect to true north in which the direction of true north is 0 degrees and clockwise from the direction of true north is positive.

The start position acquisition unit 902 acquires a start position and a direction at which the mobile body had started its movement. For example, in the case where the mobile body is a vehicle, the position is where the engine was last started. Information on the longitude and latitude of a mobile body is detected such as longitude "134.5.59.9" east, latitude "34.5.15.6" north and direction "295 degrees". Moreover, the start position and direction may be the position and direction of the mobile body at a location where the mobile body had been stationary for a predetermined amount of time or longer or the position and direction of the mobile body at a building or a landmark at which the mobile body was last inside.

A traffic volume detection position accumulation unit 909 accumulates a position at which a traffic volume can be detected as well as the size and direction of the detected traffic volume. For example, in the case of a traffic volume detection position ID "001" shown in FIG. 22, the position is longitude "134.3.0.9" east and latitude "34.6.3.6" north, and the size in the direction (direction angle) at the detection position of "0 degrees" is "50 vehicles/hour".

Moreover, for the traffic volume information of the traffic volume detection position, newest traffic volume information may be obtained via VICS wave or a network line.

The traffic volume detection position acquisition unit 903 acquires a position at which a traffic volume to become a destination candidate of the mobile body can be detected, as well as the size and the direction of the detected traffic volume. As shown in FIG. 7, traffic volume information of traffic volume detection positions within a predetermined range from the current position, for example, within 10 km, is acquired from the traffic volume detection position accumulation unit 909.

The map information accumulation unit 904 accumulates road information such as positions and link distances. For example, node positions, connecting nodes, and distances of links connecting the nodes are accumulated.

The route cost calculation unit 905 calculates a route cost using road information accumulated in the map information accumulation unit 904 such as node positions, connecting nodes and link distances. Calculated are: a minimum route cost between a current position acquired by the current position acquisition unit 901 and a start position acquired by the start position acquisition unit 902; a minimum route cost between the current position acquired by the current position acquisition unit 901 and a destination candidate position acquired by the traffic volume detection position acquisition unit 903; and a minimum route cost between the start position acquired by the start position acquisition unit 902 and the destination candidate position acquired by the traffic volume detection position acquisition unit 903.

Figure 23:
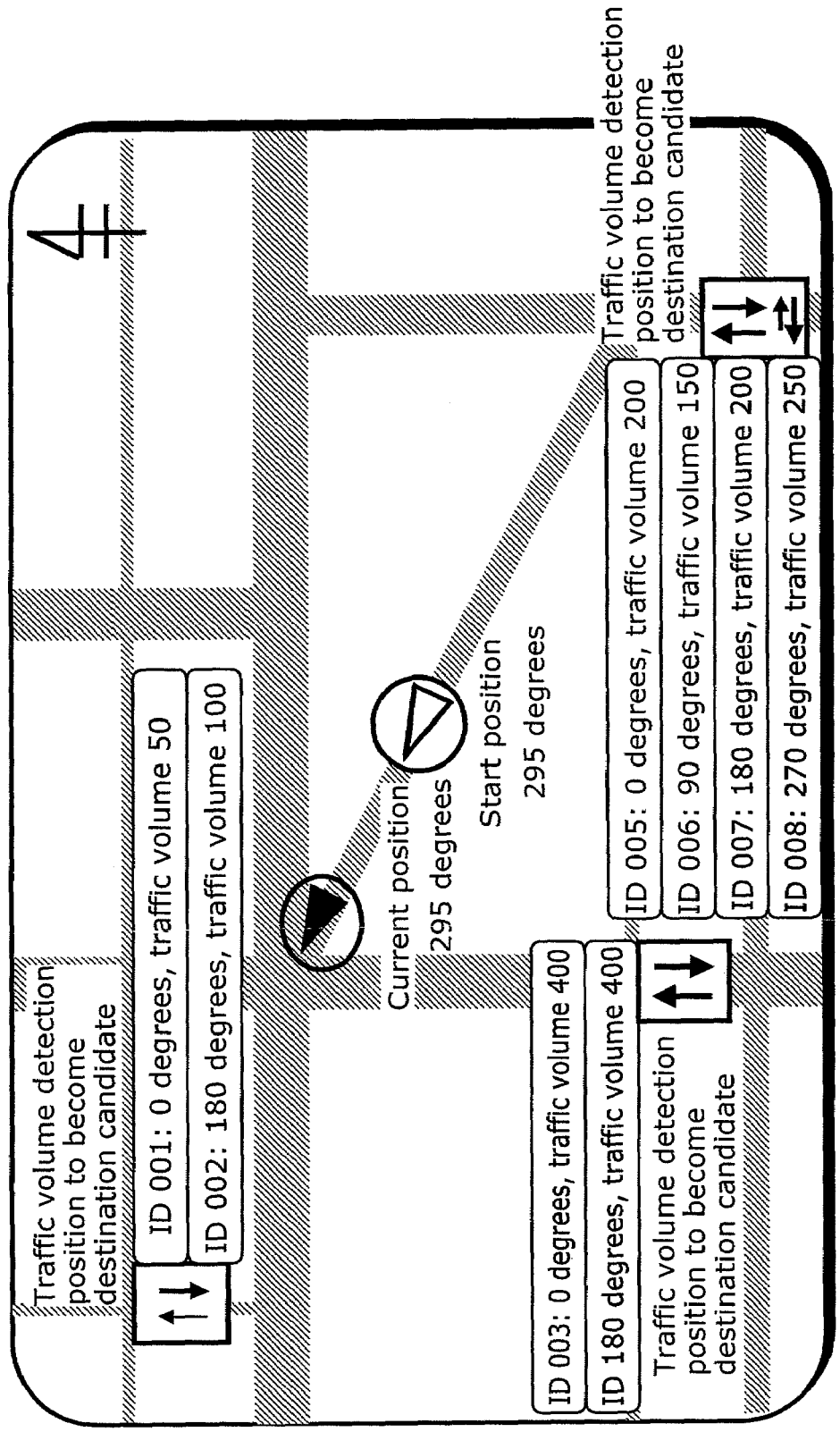
FIG. 23 is a diagram showing an example of a current position and traffic volume detection positions.
Figure 24:
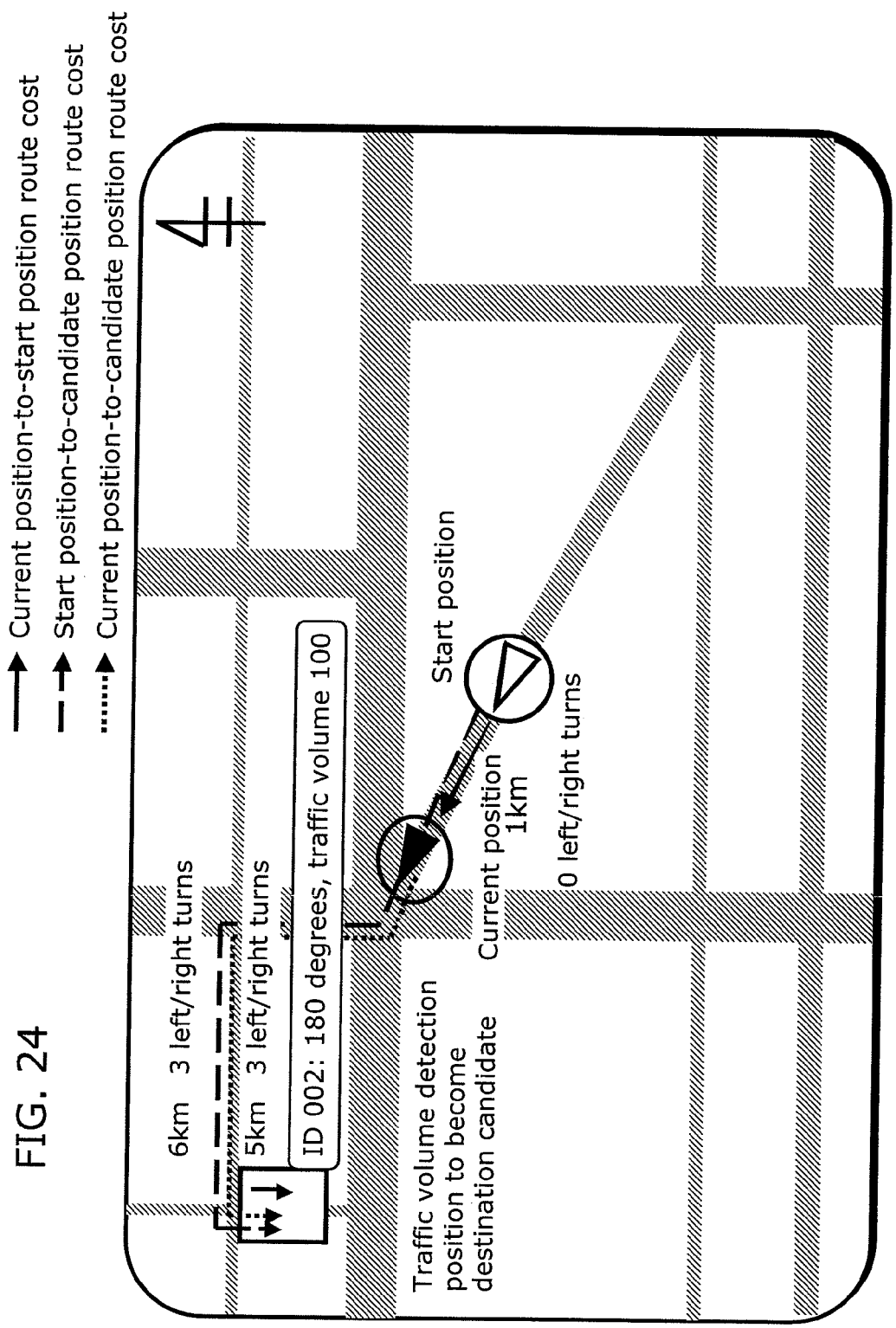
FIG. 24 is a diagram showing an example in which a route cost calculation unit calculates route costs with respect to destination candidate ID "002".

A route cost is calculated from distances of routes between positions such as a start position, a current position and a destination candidate position, a required amount of time when a route is traveled, a road type, road regulation information, and the number of left or right turns in consideration of the respective directions thereof. More specifically, the sum of the sum of road distances traveled when moving between positions and the number of left and right turns made during the movement is used as a route cost. For example, it is assumed that for each left or right turn, the route cost is increased by 1 km. As shown in FIG. 23, when a current position and a direction, a start position and a direction, a destination candidate position and a direction, and map information have been acquired, as shown in FIGS. 24 and 25, the current position-to-start position route cost is "1 km" (1 km+0 left and right turns), the start point-to-candidate point route cost with respect to destination candidate ID "002" is "9 km" (6 km+3 left and right turns), and the current point-to-candidate point route cost is "8 km" (5 km+3 left and right turns).

Figure 26:
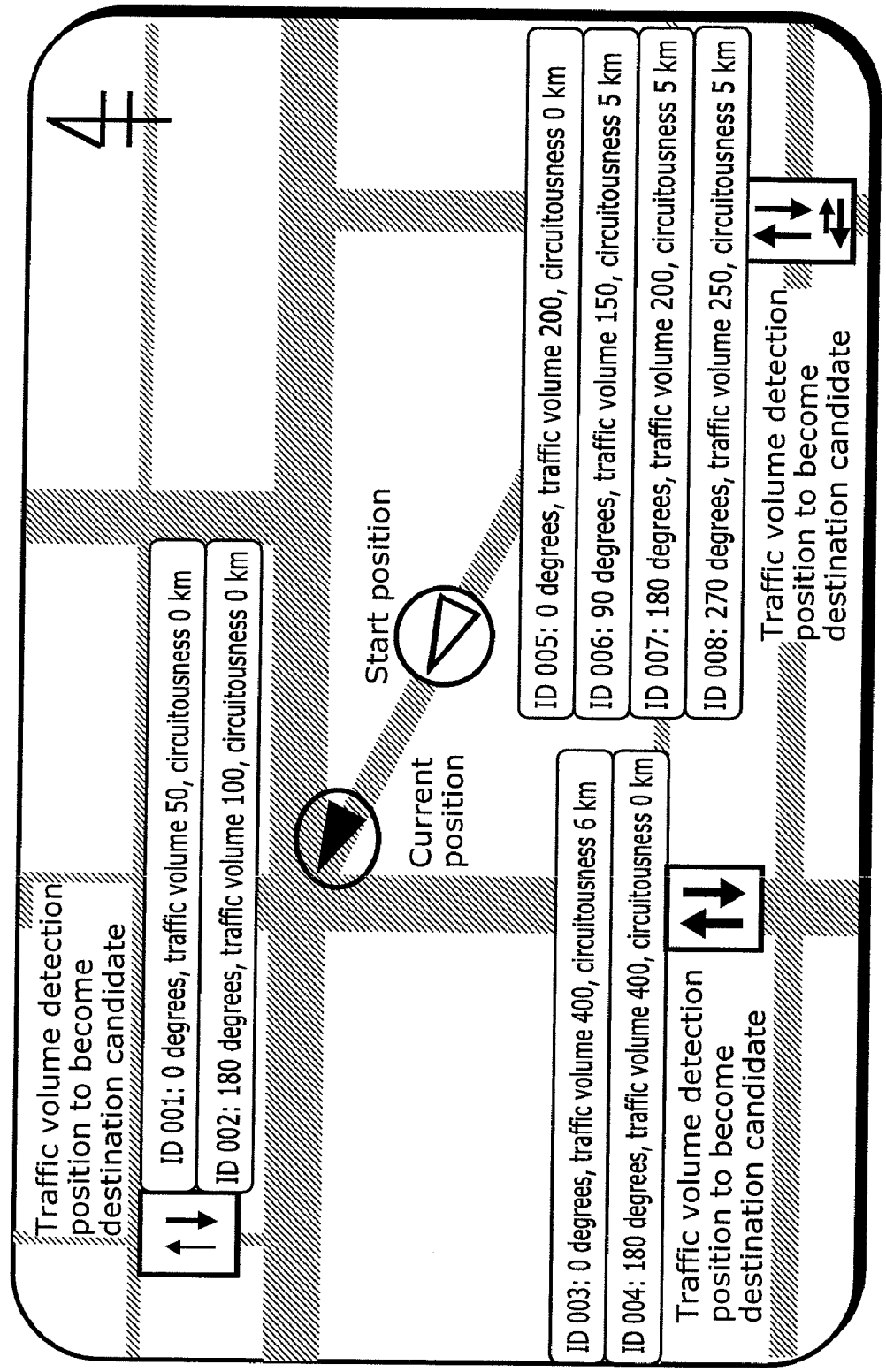
FIG. 26 is a diagram showing an example of circuitousnesses calculated by a circuitousness calculation unit.
Figure 27:
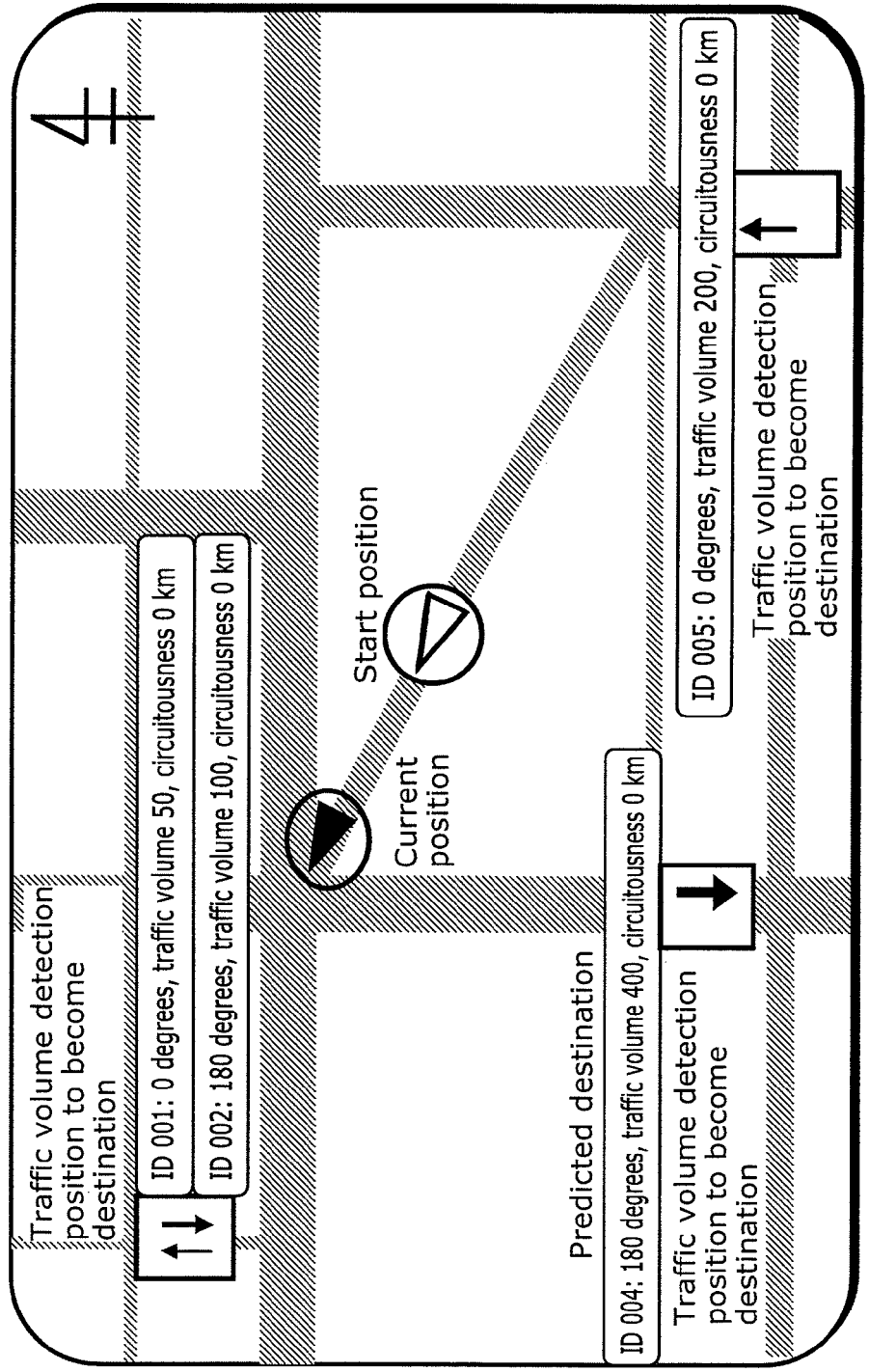
FIG. 27 is a diagram showing an example in which a destination prediction unit predicts a destination.

The destination prediction unit 907 predicts a destination of the mobile body from a circuitousness calculated by the circuitousness calculation unit 106 and the size of a traffic volume in a predetermined traffic volume direction of a traffic volume detection position acquired by the traffic volume detection position acquisition unit. More specifically, a destination candidate whose traffic volume is largest among destination candidates whose circuitousnesses equal or fall below a predetermined value (for example, a setting of a detour route admissible distance of a traffic jam: in the example, 1 km) is to be used as the destination. For example, in the case of FIG. 26, destination candidates whose circuitousnesses are equal to or less than the predetermined value of 1 km are, as shown in FIG. 27, ID "001" (circuitousness 0 km), ID "002" (circuitousness 0 km), ID "004" (circuitousness 0 km), and ID "005" (circuitousness 0 km). Among these, ID "004" whose traffic volume is the largest (traffic volume of 400 vehicles/hour) becomes the destination.

In the same manner as in the first embodiment, the circuitousness calculation unit 106 calculates a circuitousness from route costs calculated by the route cost calculation unit 105. The difference between the sum of the current position-to-start position route cost and the current point-to-candidate point route cost, and the start point-to-candidate point route cost becomes the circuitousness. For example, when destination candidates exist as shown in FIG. 23, circuitousness is calculated as shown in FIG. 28. For example, the circuitousness with respect to the destination candidate "002" is the difference "0 km" between the sum "9 km" of the current position-to-start position route cost "1 km" and the current point-to-candidate point route cost "8 km", and the start point-to-candidate point route cost "9 km".

Figure 29:
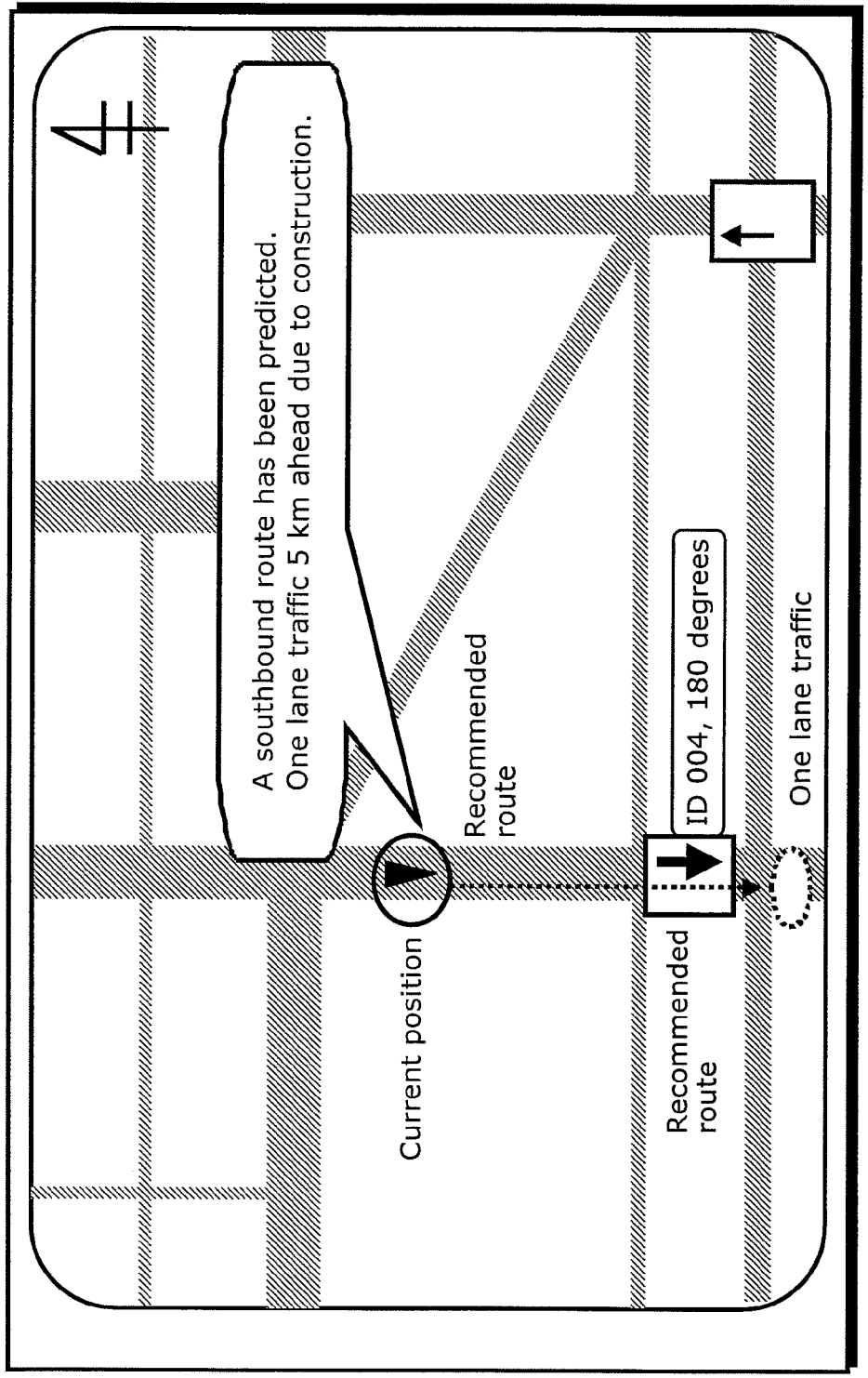
FIG. 29 is a diagram showing an example in which an information provision unit provides information related to a predicted destination.

The information provision unit 908 provides information to a user through a screen of the destination prediction device or through audio in accordance with a destination predicted by the destination prediction unit 907. For example, as shown in FIG. 29, when it is predicted that the mobile body is to pass through the traffic volume detection position ID "004" in a direction of "180 degrees", traffic information on routes up to passing ID "004" in a direction of "180 degrees" and routes in a predetermined range prior thereto, and recommended routes can be presented.

At the information provision unit 908, by calculating an extent of a traffic jam from traffic volumes at the respective positions, an extent of a traffic jam of a route on which a vehicle is likely to travel in the future can be presented to a user in advance. For example, information such as "the traffic jam at the intersection that you will be passing shortly extends for 500 m" can now be provided. However, in cases where the traffic jam distance is longer than a predetermined value, there may be cases where the vehicle of the user is already in the midst of the traffic jam. In consideration thereof, whether or not the vehicle of the user is already in the midst of the traffic jam may be calculated from an average traveling speed or the like of the vehicle, and when already in the midst of the traffic jam, the expression method of traffic jam information when providing the same may be changed, such as to "The traffic jam extends for 1 km from this point". More specifically, a traffic jam is assumed when the average speed is equal to or less than 10 km on ordinary roads and equal to or less than 20 km on expressways. Accordingly, in the case where the vehicle of the user is currently in the midst of a traffic jam, the extent of the traffic jam can be grasped intuitively even when the names of intersections and the like are unknown.

Figure 30:
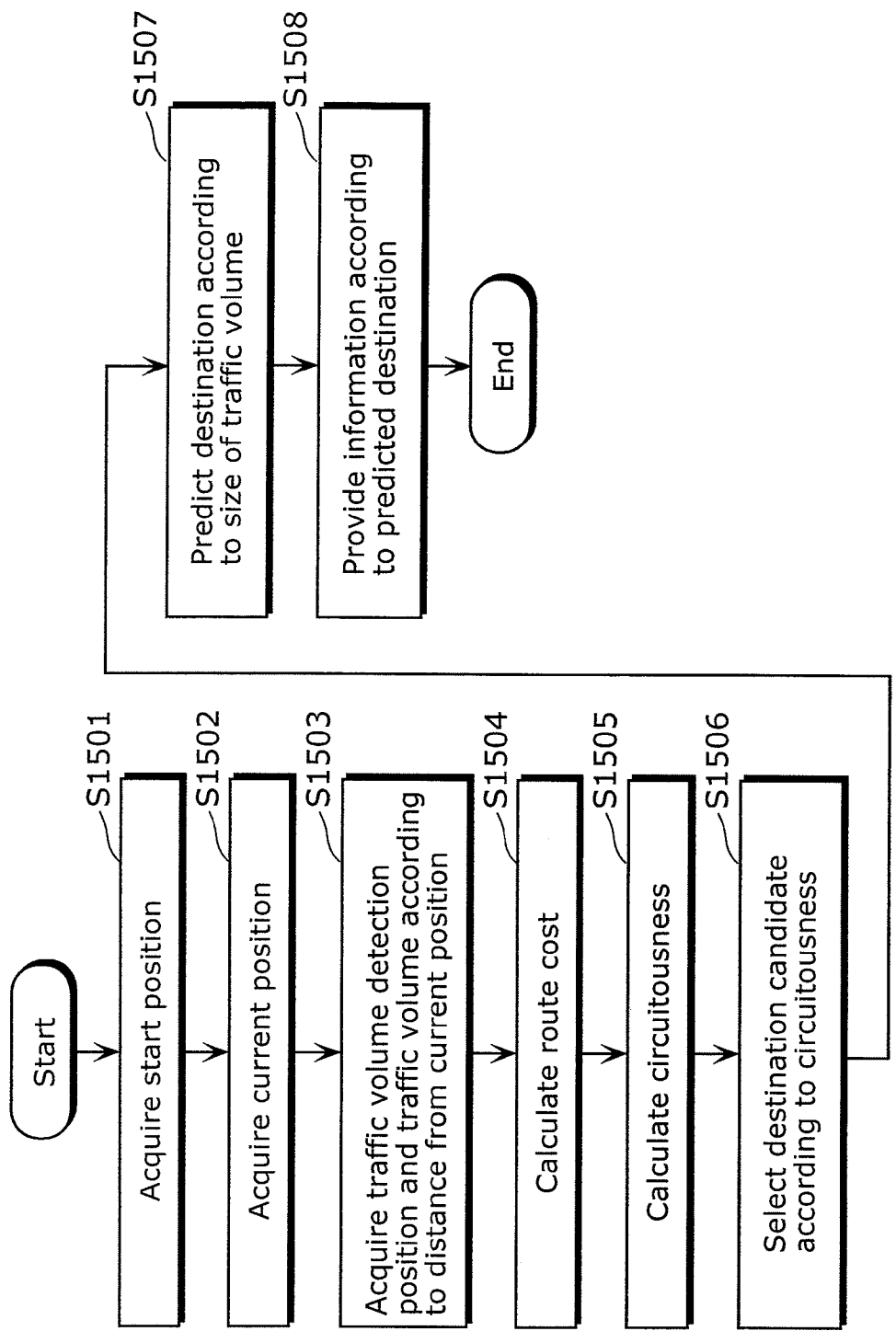
FIG. 30 is a flowchart showing an example of operations of the destination prediction device according to the second embodiment of the present invention.

A flowchart according to the present second embodiment will now be described with reference to FIG. 30.

First, the start position acquisition unit 902 acquires a start position and a direction at which a mobile body had started its movement (step S1501). The current position acquisition unit 901 acquires a current position and a direction by means of GPS or the like (step S1502). The traffic volume detection position acquisition unit 903 acquires a position at which a traffic volume can be detected and which is a destination candidate of the mobile body which lies within a predetermined range from the current position acquired by the current position acquisition unit 901, as well as size and a direction of a detected traffic volume from the traffic volume detection position accumulation unit 909 (step S1503). Using road information accumulated in the map information accumulation unit 904, the route cost calculation unit 905 calculates a route cost between the current position and the start position, a route cost between the current position and the destination candidate position, and a route cost between the start position and the destination candidate position by also taking into consideration the respective directions thereof (step S1504). The circuitousness calculation unit 106 calculates circuitousnesses from route costs calculated by the route cost calculation unit 905 (step S1505). The destination prediction unit 907 selects a destination candidate of the mobile body from circuitousnesses calculated by the circuitousness calculation unit 906 (step S1506). The destination prediction unit 907 predicts a destination from the sizes of the traffic volumes at the destination candidate positions (step S1507). The information provision unit 908 provides information to a user in accordance with the destination predicted by the destination prediction unit 907 (step S1508).

Third Embodiment

Moreover, in the present first embodiment, destination candidates of a mobile body are acquired from landmarks accumulated in map information without using movement history. However, although limited to cases where a sufficient amount of movement history has been accumulated, a previously-visited location often becomes the destination. Therefore, by accumulating history of destinations of the mobile body, when sufficient history has been accumulated, a destination candidate may be acquired from previous destinations.

A method of the present embodiment will now be described.

Figure 31:
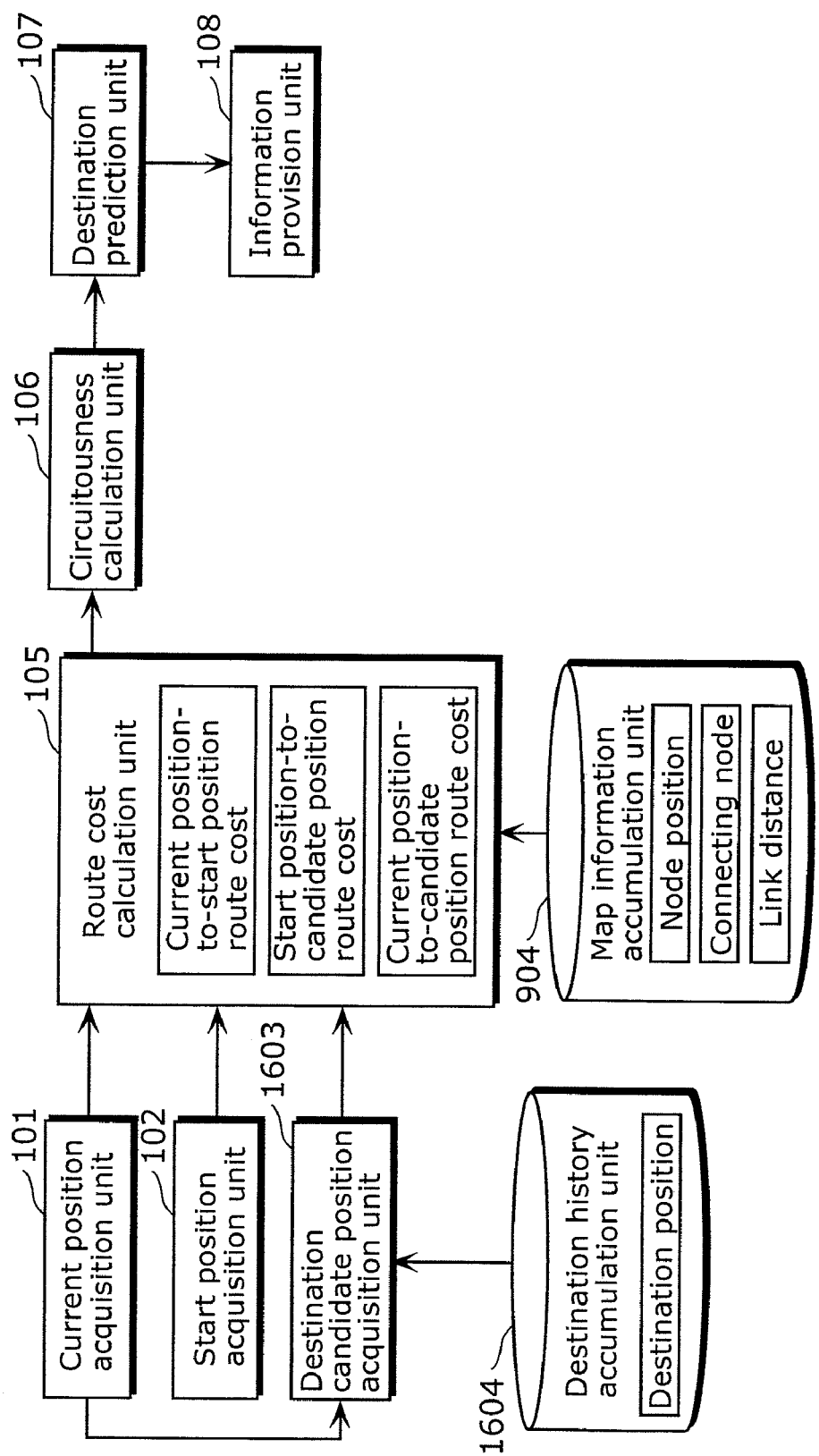
FIG. 31 is a block diagram showing a configuration of a destination prediction device according to a third embodiment of the present invention.

FIG. 31 is a configuration diagram of a destination prediction device according to the present embodiment. Components presented in the first embodiment described above are assigned like reference numerals and descriptions thereof will be omitted. Hereinafter, each component will be described first with reference to the drawings, followed by a description on operations of the present device.

The destination prediction device in the present embodiment corresponds to the "destination prediction device that further includes a movement history accumulation unit which accumulates a history of positions previously visited by the mobile body, wherein the destination candidate position acquisition unit acquires positions of the destination candidates by using the positions accumulated by the movement history accumulation unit as the destination candidates, and the destination prediction unit predicts, as the destination, a destination candidate whose circuitousness is the smallest among the positions accumulated by the movement history accumulation unit". Here, a destination history accumulation unit 1604 corresponds to the "movement history accumulation unit"; a destination candidate position acquisition unit 1603 corresponds to "destination candidate position acquisition unit"; and the destination prediction unit 107 corresponds to the "destination prediction unit".

The destination history accumulation unit 1604 acquires positions that had previously been destinations of the mobile body via a GPS antenna, an IC tag, base station communication, image recognition or the like, and accumulates history. For example, when the mobile body is a vehicle, a destination is where the engine had been turned off. Moreover, a location at which the duration of stoppage is equal to or greater than a predetermined value may be accumulated as a destination. As for a destination history, for example, as shown in FIG. 32, at least the position information of a destination is accumulated. In the case of FIG. 32, for example, for ID "005", the position of a destination name "Center E" is longitude "134.7.26.9" east and latitude "34.4.49.2" north.

The destination candidate position acquisition unit 1603 acquires a position of a destination candidate from previous destinations accumulated in the destination history accumulation unit 1604. For example, destinations accumulated in the destination history accumulation unit 1604 which lie in a predetermined range from the current position of the mobile body are to be used as destination candidates.

Figure 33:
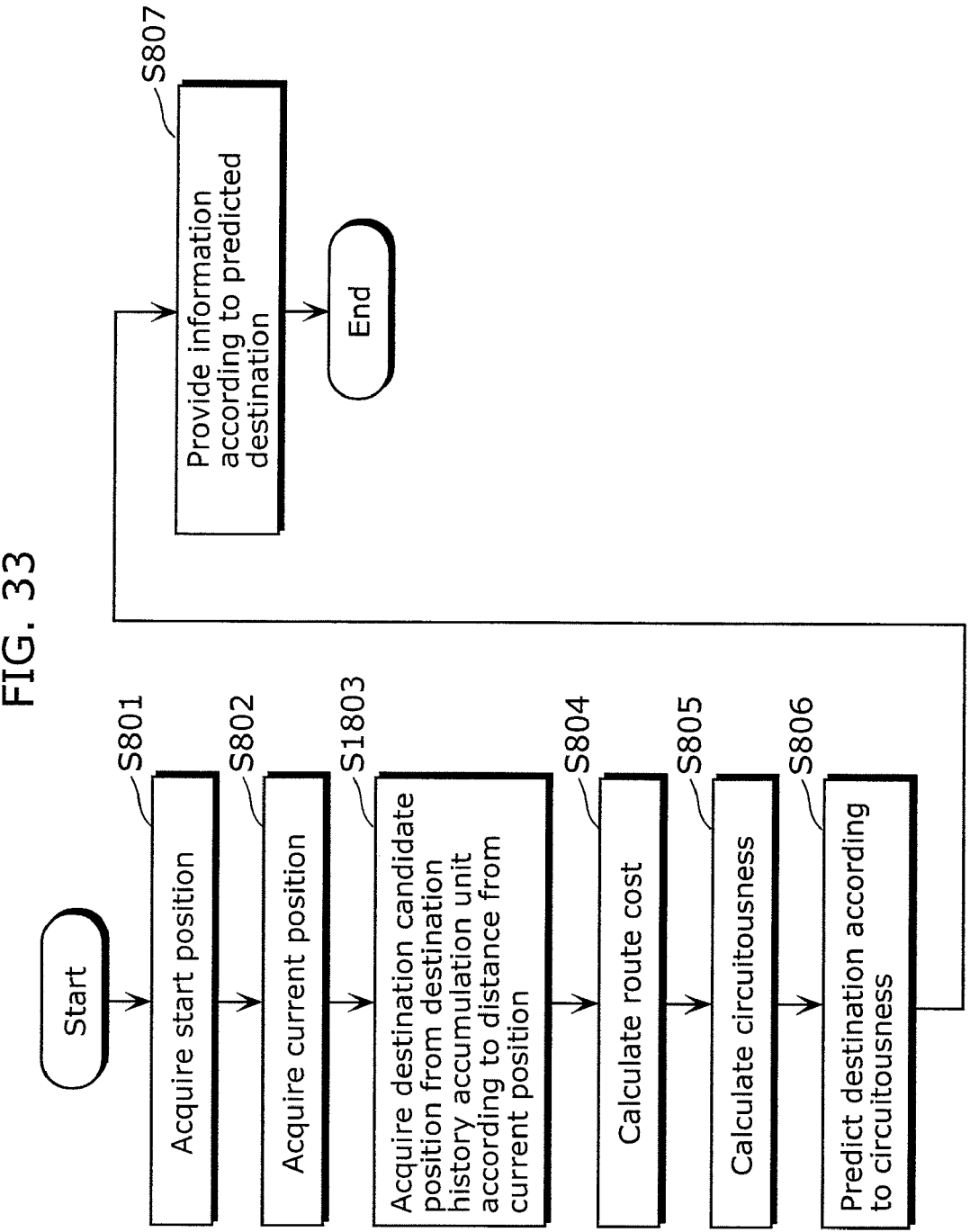
FIG. 33 is a flowchart showing an example of operations of the destination prediction device according to the third embodiment of the present invention.

A flowchart according to the present third embodiment will now be described with reference to FIG. 33. Components presented in the first embodiment described above are assigned like reference numerals and descriptions thereof will be omitted. After acquiring a start position and a current position in the same manner as in the first embodiment, the destination candidate position acquisition unit 1603 acquires, as destination candidates, previous destinations accumulated in the destination history accumulation unit 1604 and which lie in a predetermined range from the current position of the mobile body acquired by the current position acquisition unit 101 (step S1803). Subsequent steps are the same as the first embodiment.

With the present embodiment, as shown in FIG. 32, position coordinates of a destination candidate are determined from the longitude and the latitude of a location among past travel history at which the duration of stoppage was longer than a predetermined period of time. However, with position coordinates, when stopping at a location that includes a large parking lot, there is a risk that the position of a stoppage location is different and the number of destination candidates increases. In consideration thereof, stoppage positions within a predetermined range may be assumed to be the same location, whereby the center position within the predetermined range may be used as a destination candidate for a representative position.

In addition, with the present embodiment, while a stoppage location is to be used as a destination candidate, previously traveled representative intersections may be used as destination candidates. Since there may be a large number of previously traveled intersections, calculating a route cost for each point increases the calculation amount. In consideration thereof, among previous travels, branched intersections or, in other words, intersections from which the mobile body had advanced in a plurality of directions may be assumed as representative intersections to be used as destination candidates.

Fourth Embodiment

Moreover, in the present first embodiment, destination candidates of a mobile body are acquired from landmarks accumulated in map information. However, a destination candidate of a mobile body may also be a destination of the mobile body which has been preset to the destination prediction device by the user or a destination of the mobile body predicted by the device or the like. In the case of a destination prediction device on a mobile body such as a car navigation system, a user may often personally preset a destination before movement. However, for example, when setting one's own home as the destination, there are cases where, instead of heading straight home that is the designated destination, a user heads home that is the destination after stopping at a book store or a gas station on a different route. Even though a destination is set, a via point only briefly visited is not necessarily set. However, there are cases where the existence of a via point changes an optimum route towards a destination.

In the present fourth embodiment, the device judges whether the mobile body is heading straight towards the destination set according to circuitousness. In other words, a judgment is made on whether a via point exists through which the mobile body intends to pass before heading towards the destination, and at the same time, a via point prediction is performed. Consequently, information not only on the set destination but also on a via point can be provided, such as information on a route from the current position to the via point and information on a route from the via point to the destination.

A method of the present embodiment will now be described.

Figure 34:
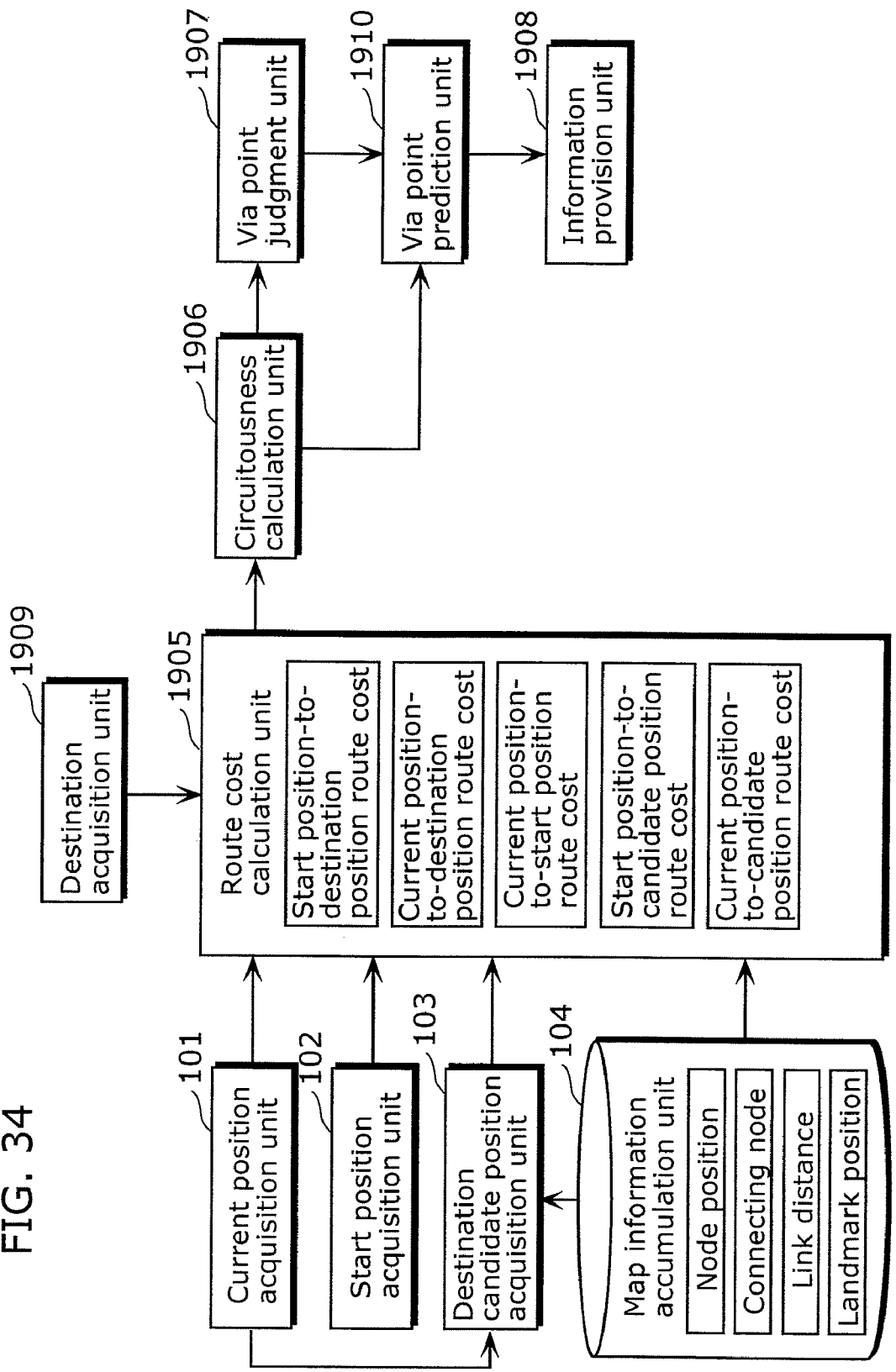
FIG. 34 is a block diagram showing a configuration of a destination prediction device according to a fourth embodiment of the present invention.

FIG. 34 is a configuration diagram of a destination prediction device according to the present embodiment. Components presented in the first embodiment described above are assigned like reference numerals and descriptions thereof will be omitted. Hereinafter, each component will be described first with reference to the drawings, followed by a description on operations of the present device.

The destination prediction device in the present embodiment corresponds to the "destination prediction device that further includes: a destination acquisition unit which acquires a destination of a mobile body from a user; and a via point judgment unit which judges that a via point exists through which the mobile body intends to pass before heading towards the destination, when the circuitousness with respect to the destination is equal to or greater than a second threshold, wherein the destination candidate position acquisition unit acquires, when it is judged that the via point exists, a position of a destination candidate that lies in a predetermined range from the current position of the mobile body and which may potentially become the via point, and the destination prediction unit predicts, as the via point, a destination candidate whose circuitousness is the smallest among the destination candidates". Here, a destination acquisition unit 1909 corresponds to the "destination acquisition unit"; a via point judgment unit 1907 corresponds to the "via point judgment unit"; the destination candidate position acquisition unit 103 corresponds to the "destination candidate position acquisition unit"; and a via point prediction unit 1910 corresponds to the "destination prediction unit".

The destination acquisition unit 1909 acquires a position of a destination preset to the device by the user or the like. For example, a position of the destination of longitude "134.7.26.9" east and latitude "34.4.49.2" north is acquired. Moreover, a destination position predicted or set by the device or another destination prediction device may be acquired.

The route cost calculation unit 1905 calculates a route cost using road information accumulated in the map information accumulation unit such as node positions, connecting nodes, and link distances. Calculated are: a route cost between a current position acquired by the current position acquisition unit 101 and a start position acquired by the start position acquisition unit 102; a route cost between the current position acquired by the current position acquisition unit 101 and a destination acquired by the destination acquisition unit 1909; a route cost between the start position acquired by the start position acquisition unit 102 and the destination acquired by the destination acquisition unit 1909; a route cost between the current position acquired by the current position acquisition unit 101 and a destination candidate position acquired by the destination candidate position acquisition unit 103; and a route cost between the start position acquired by the start position acquisition unit 102 and the destination candidate position acquired by the destination candidate position acquisition unit 103.

The circuitousness calculation unit 1906 calculates a circuitousness from a route cost calculated by the route cost calculation unit 1905. Circuitousness is respectively calculated for the destination and destination candidates. Circuitousness is the difference of the cost of the route currently traveled by the mobile body with respect to the cost of a route having minimum cost from the start position to the destination or a destination candidate. More specifically, a route cost obtained by subtracting the start position-to-destination route cost from the sum of the current position-to-start position route cost and the current position-to-destination route cost is the circuitousness with respect to the destination. A route cost obtained by subtracting the start position-to-destination candidate position route cost from the sum of the current position-to-start position route cost and the current position-to-destination candidate position route cost is to be the circuitousness with respect to the destination candidate.

The via point judgment unit 1907 judges the existence of a via point of the mobile body from the circuitousness calculated by the circuitousness calculation unit 1906. In other words, a judgment is made on whether a destination to which the mobile body is next headed is the set destination or a via point different from the set destination. When heading towards a destination, a mobile body tends to move so as to reduce the route cost required for movement. Therefore, the circuitousness that is a cost difference with respect to a minimum cost is also reduced. As such, circuitousness is low when heading straight towards a destination. Conversely, when circuitousness is high, the mobile body is not heading straight towards the destination and instead is heading towards a different via point. Accordingly, the via point judgment unit judges that a via point exists when the circuitousness with respect to the destination is greater than a predetermined value (second threshold). More specifically, the predetermined value is to be an allowable detour distance preset to the device which indicates a range in which the user allows the movement distance of a detour route to be extended with respect to a minimum route when searching for such a detour route in the case a traffic jam exists. This is because an increase in circuitousness does not necessarily mean that the mobile body is heading towards a via point and the mobile body is possibly traveling on a detour route in order to avoid a traffic jam. When the circuitousness is greater than the preset allowable detour distance, the possibility that a detour route is taken no longer exists and a judgment can be made that the mobile body is headed towards a via point other than the destination.

Figure 35:
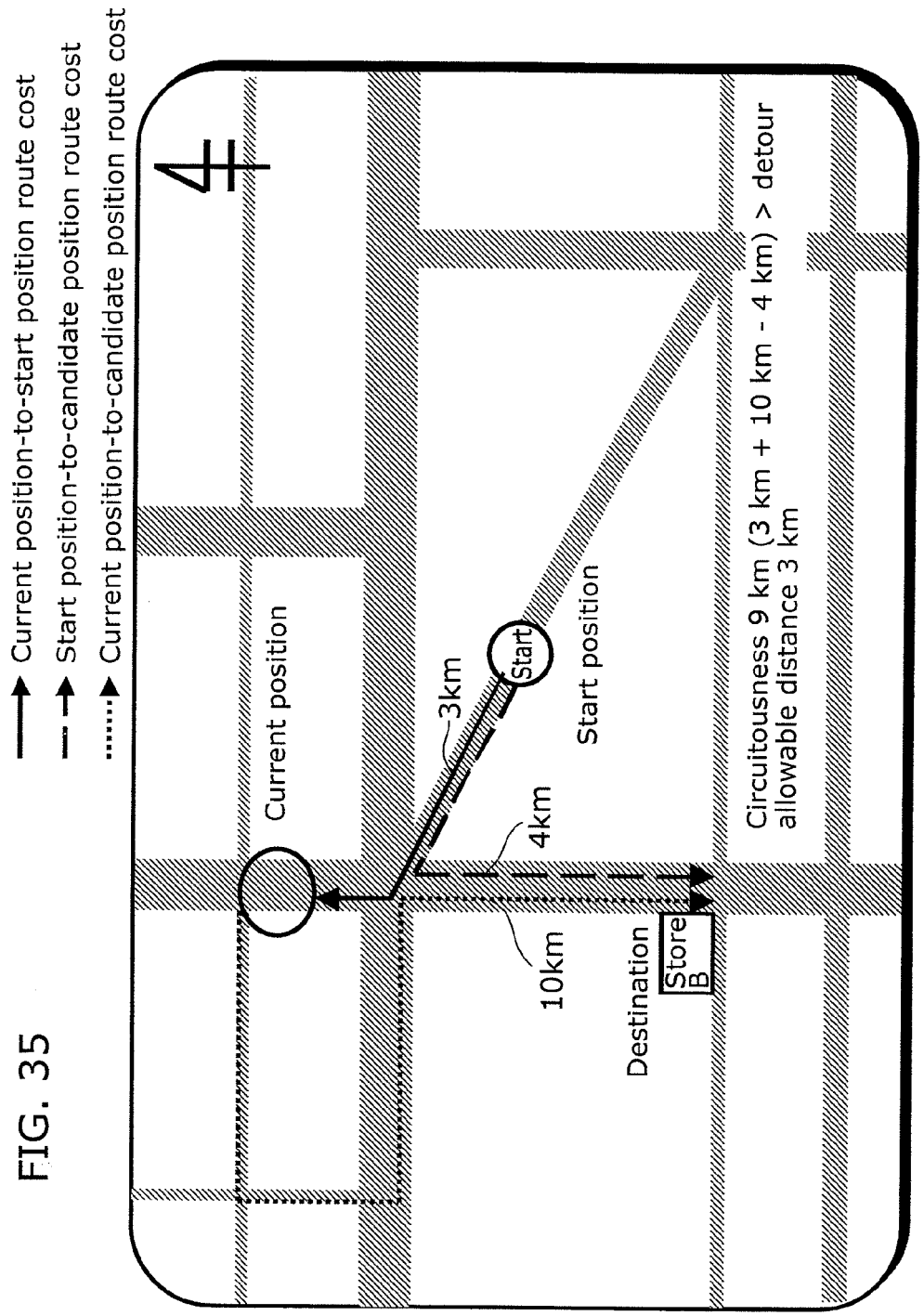
FIG. 35 is a diagram showing an example of a set destination and a circuitousness.

For instance, in the case of FIG. 35, the circuitousness with respect to the set destination "Store B" is 9 km as shown in FIG. 36. When a circuitousness boundary value (second threshold) to be used for via point judgment or, in other words, the allowable detour distance is assumed to be, for example, 3 km, since the circuitousness 9 km is greater than 3 km, a via point is judged to exist.

When the via point judgment unit 1907 judges that a via point exists, the via point prediction unit 1910 also predicts the position of the via point using the circuitousness with respect to the destination candidate acquired by the destination candidate position acquisition unit 103 and calculated by the circuitousness calculation unit 1906.

Figure 37:
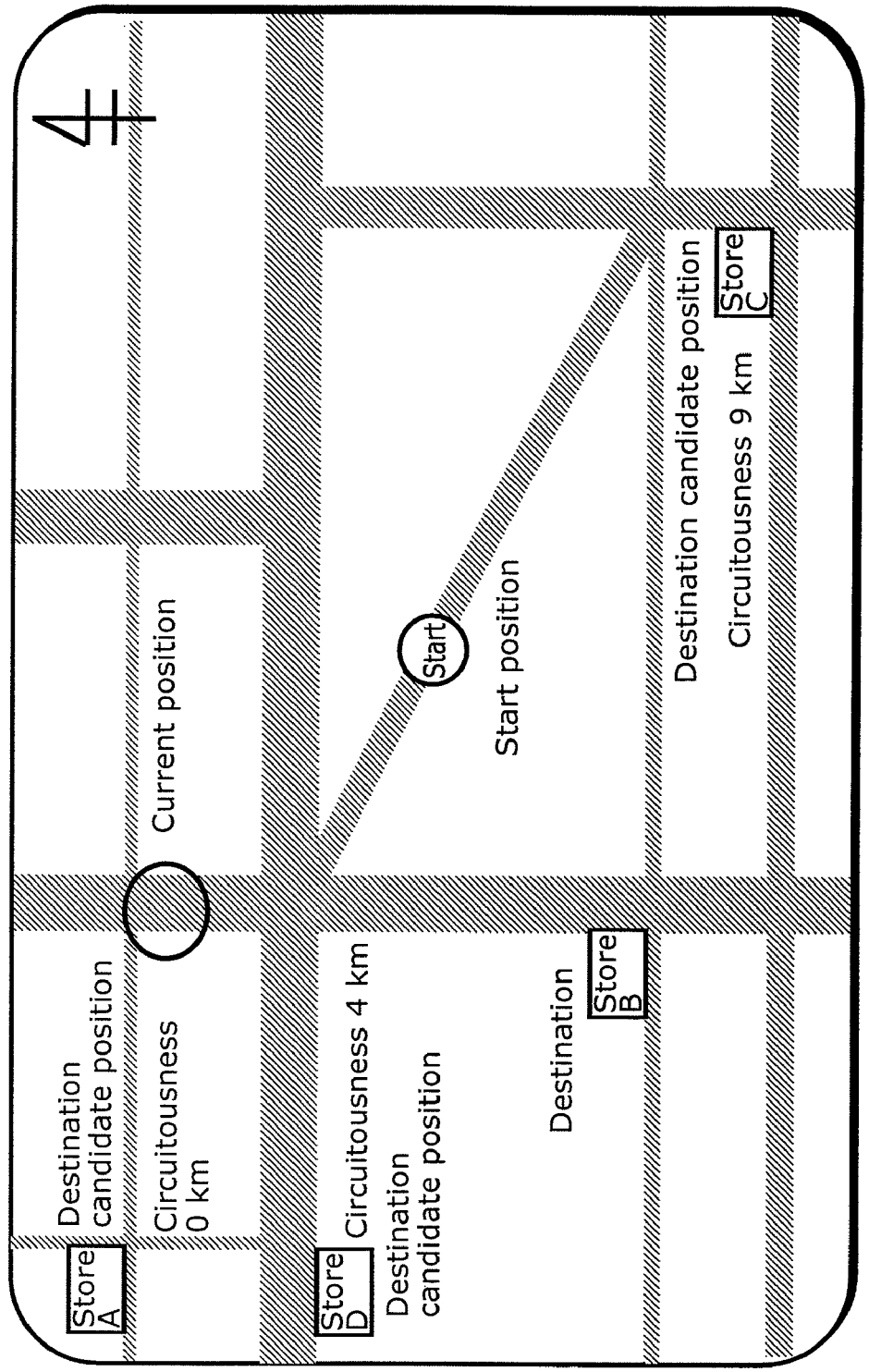
FIG. 37 is a diagram showing an example of a current position and destination candidate positions.

For example, in the case of FIG. 35, when a via point is judged to exist by the via point judgment unit 1907, let us assume that the destination candidates acquired by the destination candidate acquisition unit are "Store A", "Store C", and "Store D" shown in FIG. 37, and circuitousnesses are "0 km", "9 km", and "4 km" respectively, as shown in FIG. 36. At this point, "Store A" whose circuitousness is lowest among the destination candidates is predicted as the via point.

Figure 38:
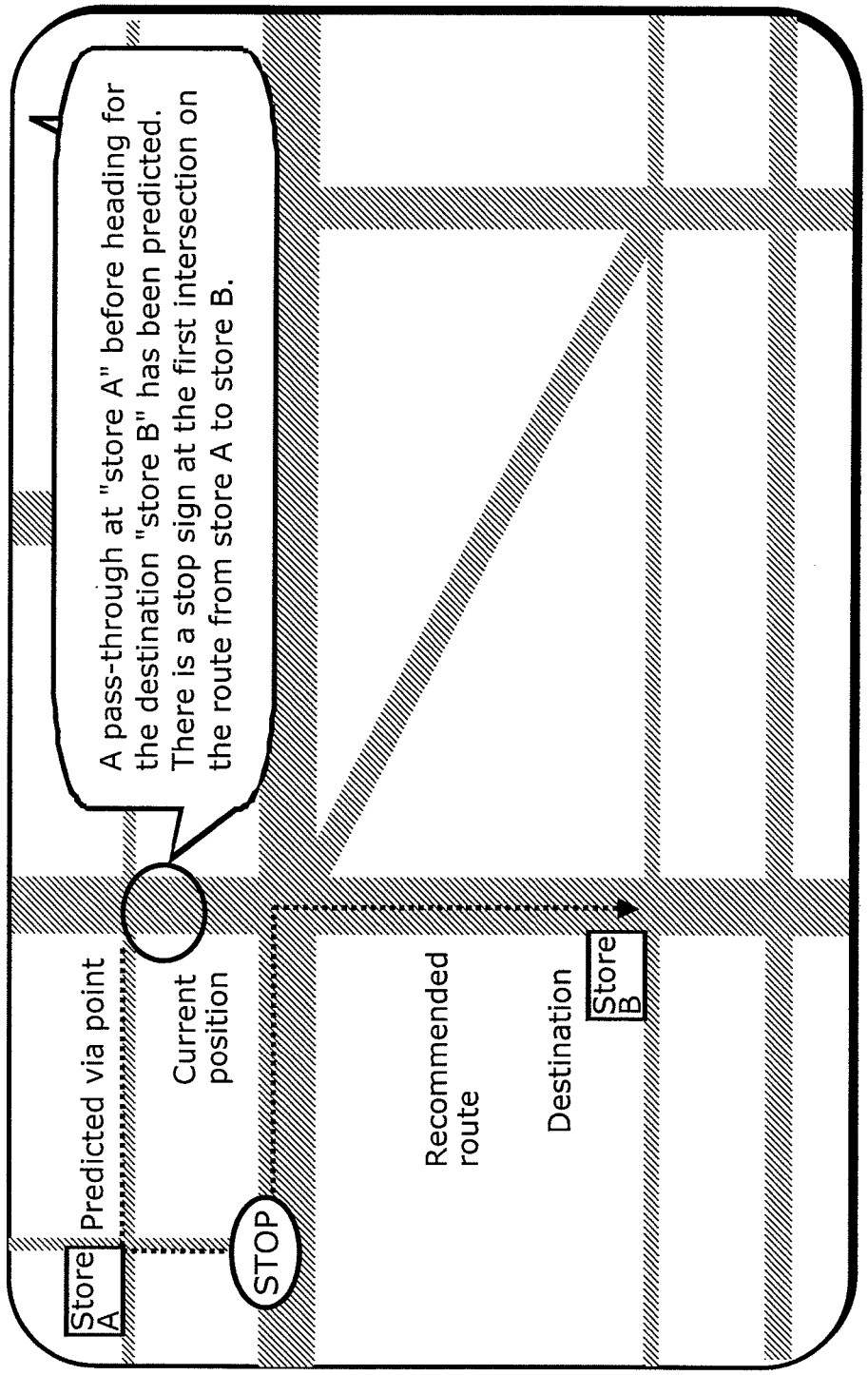
FIG. 38 is a diagram showing an example in which an information provision unit provides information related to a predicted via point.

The information provision unit 1908 provides information to a user through a screen of the destination prediction device or through audio in accordance with a destination acquired by the destination acquisition unit 1909 and a via point predicted by the via point prediction unit. For example, as shown in FIG. 38, when the destination of the mobile body is "Store B" and "Store A" is predicted to be a via point, traffic information on a route via "Store A" to "Store B" or on a recommended route, and sale information of "Store A" can be provided. Conversely, when it is judged that a via point does not exist, traffic information on the route to the destination or information on the destination is provided.

Figure 39:
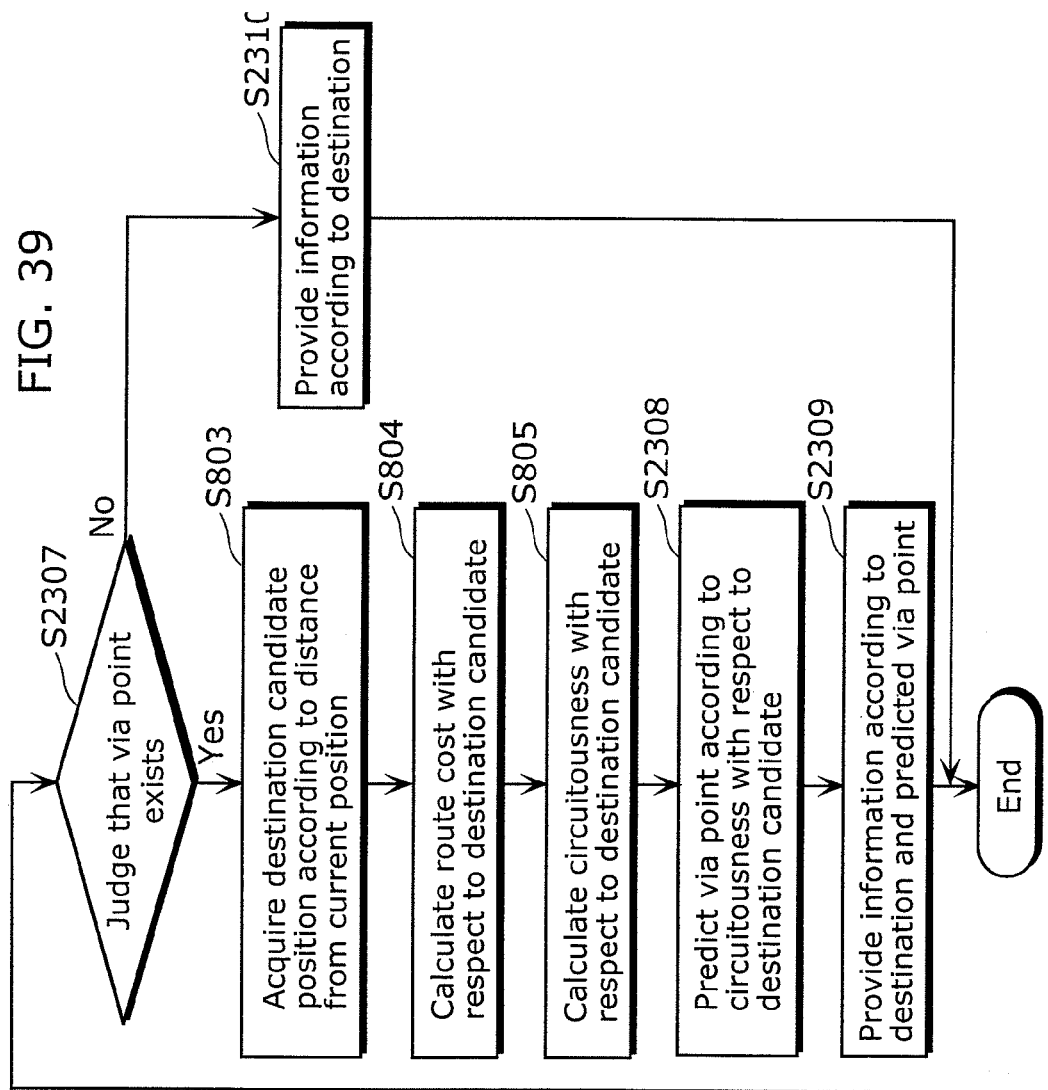
FIG. 39 is a flowchart showing an example of operations of the destination prediction device according to the fourth embodiment of the present invention.

A flowchart according to the present fourth embodiment will now be described with reference to FIG. 39. Components presented in the first embodiment described above are assigned like reference numerals and descriptions thereof will be omitted. In the same manner as in the first embodiment, after acquiring a start position and a current position, the destination acquisition unit 1909 acquires a position of a destination set to the device (step S2303). Using road information accumulated in the map information accumulation unit 104, the route cost calculation unit 1905 calculates a route cost between the current position and the start position, a route cost between the current position and the destination, and a route cost between the start position and the destination (step S2304). The circuitousness calculation unit 1906 calculates the circuitousness with respect to the destination from route costs calculated by the route cost calculation unit 1905 (step S2305). The via point judgment unit 1907 judges whether a via point exists from the circuitousness with respect to the destination (step S2306). A judgment of whether a via point exists is performed (step S2307), and when it is judged that a via point exists (Yes in step S2307), the sequence proceeds to step S803. When it is judged that a via point does not exist (No in step S2307), the sequence proceeds to step S2310. When it is judged that a via point exists, the destination candidate position acquisition unit 103 acquires landmark positions within a predetermined range from the current position from the map information accumulation unit 104 (step S803). Using road information accumulated in the map information accumulation unit 104, the route cost calculation unit 105 calculates a route cost between the current position and the start position, a route cost between the current position and the destination candidate position, and a route cost between the start position and the destination candidate position (step S804). The circuitousness calculation unit 106 calculates the circuitousness with respect to the destination candidate from route costs calculated by the route cost calculation unit 1905 (step S805). The via point prediction unit 1910 predicts a via point from the circuitousness with respect to the destination candidate calculated by the circuitousness calculation unit 1906 (step S2308). The information provision unit 1908 provides information to the user in accordance with the destination acquired by the destination acquisition unit 1909 and the via point predicted by the via point prediction unit 1910 (step S2309). When it is judged that a via point does not exist, the information provision unit 1908 provides information to the user in accordance with the destination acquired by the destination acquisition unit 1909 (step S2310).

First Modification of Fourth Embodiment

Moreover, in the present fourth embodiment, a via point is predicted based on the circuitousness with respect to a destination candidate of a mobile body. However, information on a preset destination may be used when predicting a via point. More specifically, a route cost from the current point to the destination when passing through the via point is used. Normally, a user tends to select, as a via point, a location that does not present a significant detour even when traveling through the via point. For example, even in the case where the user's own home is the destination and when desiring to stop by a book store, when a plurality of book stores exist, there is a tendency to select a book store that presents the smallest distance to home when stopping by the book store. From the above, a route cost from the current point to the destination when traveling through the via point is used.

The destination prediction device in the present embodiment corresponds to the "destination prediction device wherein the destination prediction unit further predicts, as the via point, a destination candidate for which the route cost from the current position to the destination when passing through the destination candidate is the smallest among the destination candidates whose circuitousness is the smallest. In this destination prediction device, the via point prediction unit 1907 corresponds to the "destination prediction device".

More specifically, the via point prediction unit 1907 predicts, as a via point, a destination candidate having the smallest route cost to the destination when traveling through the destination candidate among destination candidates whose circuitousnesses are equal to or less than a predetermined value.

Second Modification of Fourth Embodiment

Moreover, in the fourth embodiment, a via point is predicted based on the circuitousness with respect to a destination candidate of a mobile body. However, when predicting a via point in the case where movement history is sufficiently collected, a location that is easy to stop by before heading for the set destination may be predicted as a via point using information on the preset destination and destination history. More specifically, a history of destinations is accumulated, and a location whose circuitousness is lowest among locations that had become destinations immediately before the set destination is to be used as the destination. Consequently, a via point better suited to the user is predicted.

A method of the present embodiment will now be described.

Figure 40:
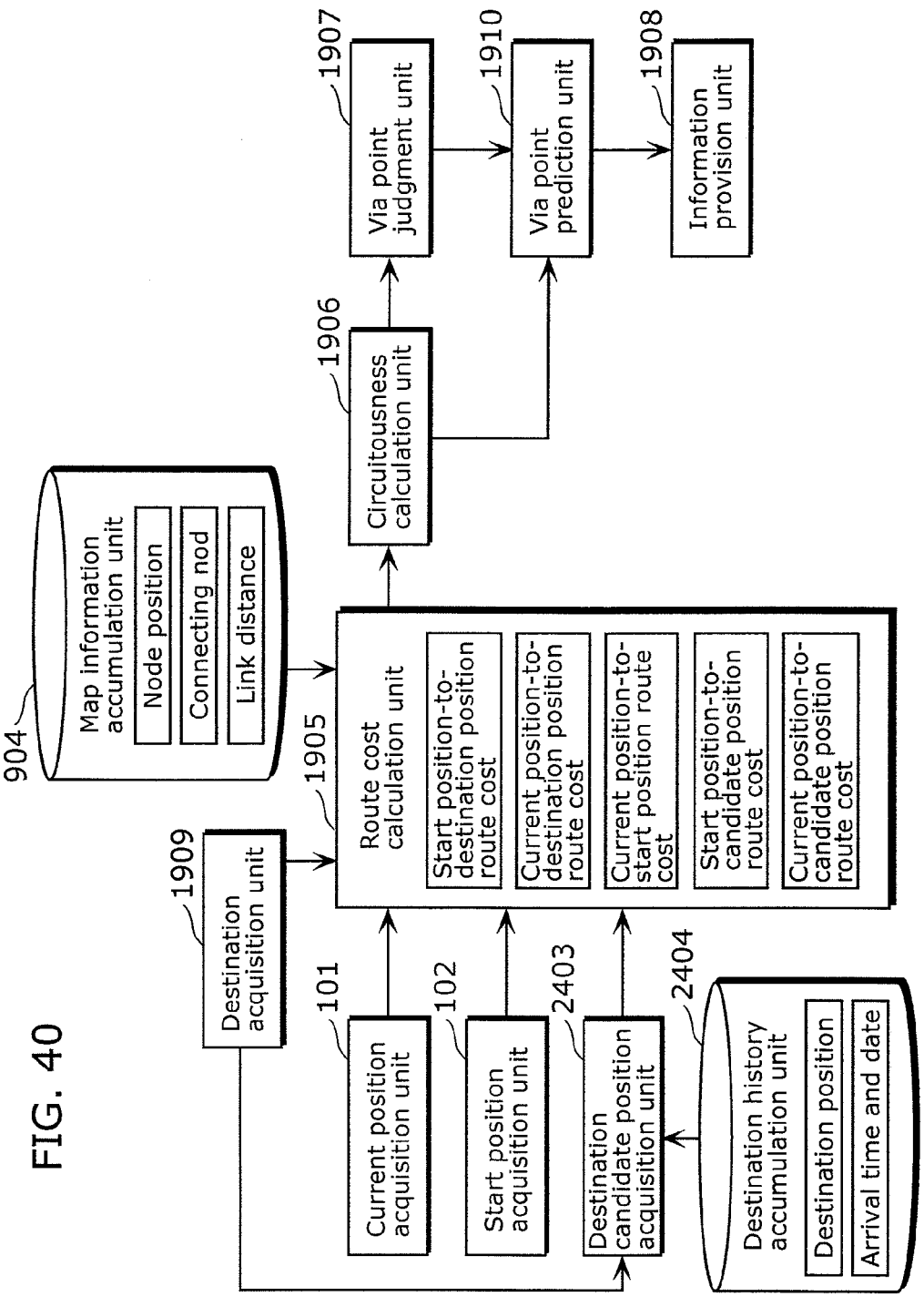
FIG. 40 is a block diagram showing a configuration of a destination prediction device according to a second modification of the fourth embodiment of the present invention.

FIG. 40 is a configuration diagram of a destination prediction device according to the present embodiment. Components presented in the first and second embodiments described above are assigned like reference numerals and descriptions thereof will be omitted. Hereinafter, each component will be described first with reference to the drawings, followed by a description on operations of the present device.

The destination prediction device in the present embodiment corresponds to the "destination prediction device that further includes: a destination history accumulation unit which accumulates a history of destinations acquired by the destination acquisition unit, in association with respective arrival times and dates at the destinations, wherein the destination prediction unit predicts, as the via point, a destination that was reached immediately before a currently acquired destination among the destinations accumulated in the destination history accumulation unit". Here, a destination history accumulation unit 2404 corresponds to the "destination history accumulation unit"; and the via point prediction unit 1910 corresponds to the "destination prediction unit".

The destination history accumulation unit 2404 accumulates locations that have previously been destinations of the mobile body and a history of the times of day of arrival at the destination. For example, when the mobile body is a vehicle, a destination is where the engine had been turned off. Moreover, a location at which the duration of stoppage is equal to or greater than a predetermined value may be accumulated as a destination. As for a destination history, for example, in the case of FIG. 41, at ID "005", the position of the destination whose name is "Company E" is longitude "134.7.26.9" east and latitude "34.4.49.2" north, and the date and time of arrival is "9:00 on September 21".

The destination candidate position acquisition unit 2403 acquires a destination candidate from the destination history accumulated by the destination history accumulation unit 2404 using the destination acquired by the destination acquisition unit 1909. More specifically, when an acquired destination is accumulated, a location from the history that had become a destination immediately before the acquired destination is to be used as a destination candidate. For example, let us assume that the acquired destination is "Company E", longitude "134.7.26.9" east and latitude "34.4.49.2" north. In this case, when destinations are accumulated as shown in FIG. 41, destination "Company E" is accumulated at IDs "005" (date and time of arrival: 9:00 on September 21) and "009" (date and time of arrival: 8:55 on September 22). By studying destinations accumulated as shown in FIG. 42 in order of the date and time of arrival, it is revealed that the destinations accumulated immediately before the destination "Company E" is "Restaurant D" (date and time of arrival: 8:40 on September 21) whose ID is "004" and "Store G" (date and time of arrival: 8:40 on September 22) whose ID is "008". "Restaurant D" and "Store G" become destination candidates or, in other words, via point candidates.

Figure 43:
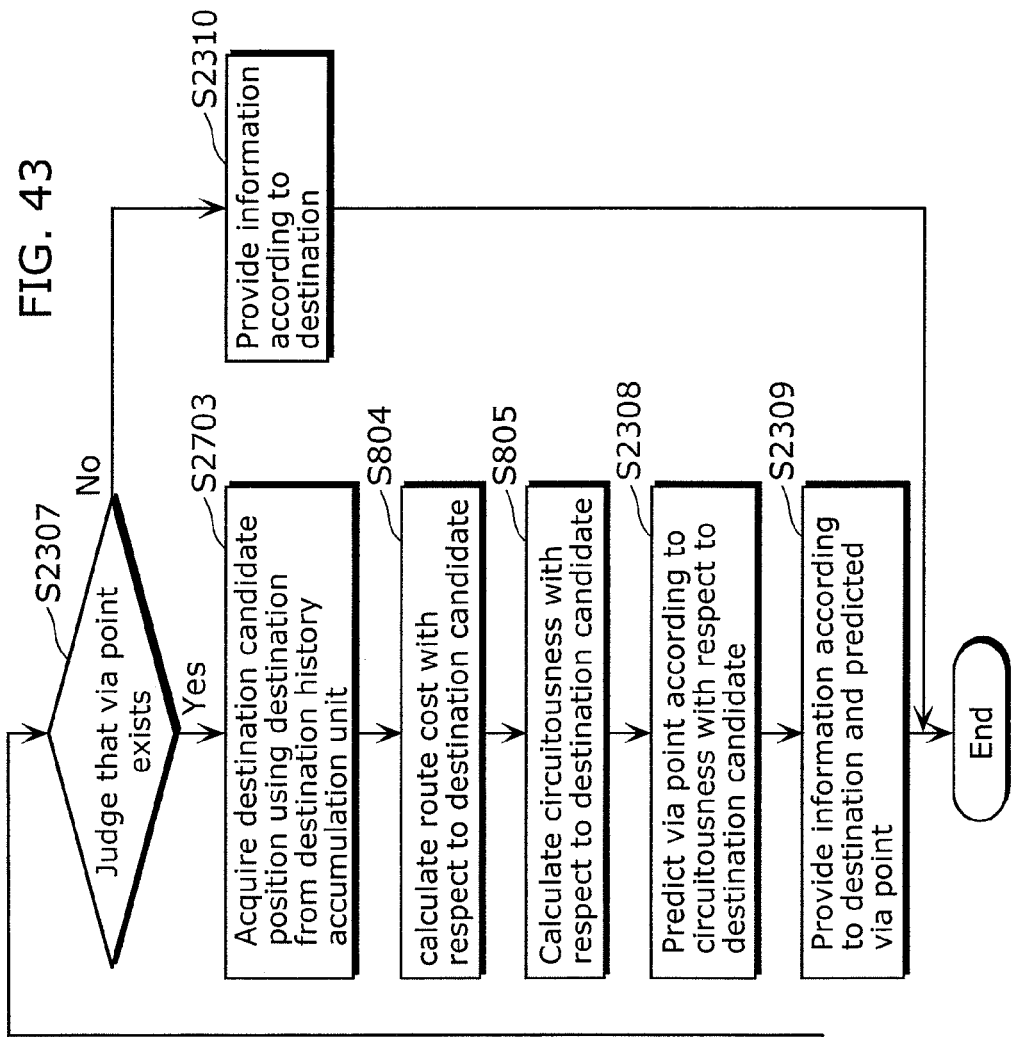
FIG. 43 is a flowchart showing an example of operations of the destination prediction device according to the second modification of the fourth embodiment of the present invention.

A flowchart according to the second modification of the present fourth embodiment will now be described with reference to FIG. 43. Components presented in the first and fourth embodiments described above are assigned like reference numerals and descriptions thereof will be omitted. After judging the existence of a via point in the same manner as in the fourth embodiment, when a via point exists, a destination candidate is acquired using the destination acquired by the destination acquisition unit 1909 from the destination history accumulated by the destination history accumulation unit 2404 (step S2703). Subsequent steps are the same as the fourth embodiment.

Third Modification of Fourth Embodiment

Moreover, with the fourth embodiment, the threshold of circuitousness used by the via point judgment unit 1907 to judge the existence of a via point is constant. However, in the vicinity of the destination, the mobile body is likely to become lost or to be in a situation where a detour is necessary due to road widths and the like. For this reason, when the distance from the destination to the current position is equal to or less than a predetermined value, the threshold used when judging the existence of a via point may be increased.

Fourth Modification of Fourth Embodiment

Moreover, with the fourth embodiment, the threshold of circuitousness used by the via point judgment unit 1907 to judge the existence of a via point is constant. However, as the distance from the start position increases, the possibility of the mobile body stops at a via point to take a rest also increases. For this reason, when the distance from the start position to the current position is equal to or greater than a predetermined value, the threshold used when judging the existence of a via point may be reduced.

Fifth Modification of Fourth Embodiment

Moreover, with the fourth embodiment, the existence of a via point was judged based on circuitousness. However, in the case where the mobile body is a vehicle, even when a via point does not exist, there is a possibility that the circuitousness increases as a result of the mobile body deviating from the minimum cost route to the destination in order to avoid a traffic jam. In particular, circuitousness further increases when route cost increases as a result of entering a bypass in order to avoid a traffic jam, only to end up spending more time than on the original road. In consideration thereof, by predicting a junction of a minimum cost route from the start position to the destination set by the user and a movement route currently predicted when the mobile body heads towards the destination without passing through the via point, and by judging the existence of traffic jams between the branch from the minimum cost route and the predicted junction, a judgment can now be made on whether the increase in circuitousness is caused by an attempt to avoid a traffic jam or by a stopover at a via point.

A method of the present embodiment will now be described.

Figure 44:
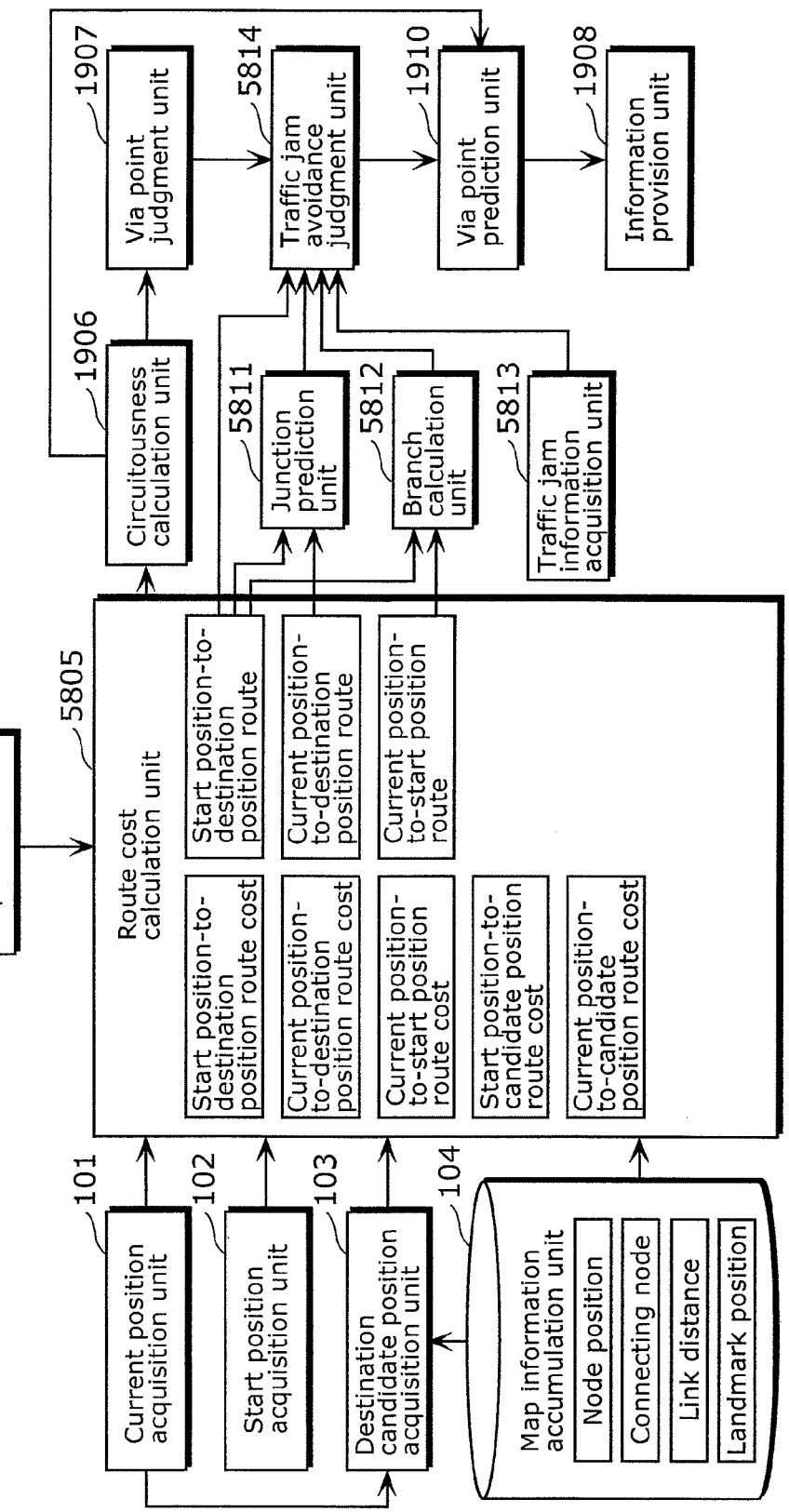
FIG. 44 is a block diagram showing a configuration of a destination prediction device according to a fifth modification of the fourth embodiment of the present invention.

FIG. 44 is a configuration diagram of a destination prediction device according to the present embodiment. Components presented in the fourth embodiment described above are assigned like reference numerals and descriptions thereof will be omitted. Hereinafter, each component will be described first with reference to the drawings, followed by a description on operations of the present device.

The destination prediction device in the present embodiment corresponds to the "destination prediction device that further includes: a branch calculation unit which calculates a position of a branch of a route connecting the start position and the destination and a route connecting the start position and the current position; a junction prediction unit which predicts a position of a junction of a route connecting the start position and the destination and a route connecting the current position and the destination; a traffic jam information acquisition unit which acquires traffic jam information of the periphery of a route connecting the start position and the destination; and a traffic jam avoidance judgment unit which judges whether a traffic jam exists between the branch position and the junction position among the route connecting the start position and the destination, wherein the destination prediction unit predicts that a via point exists when the circuitousness with respect to the destination is equal to or greater than the second threshold and the traffic jam avoidance judgment unit judges that a traffic jam does not exist". Here, a branch calculation unit 5812 corresponds to the "branch calculation unit"; a junction prediction unit 5811 corresponds to the "junction prediction unit", a traffic jam information acquisition unit 5813 corresponds to the "traffic jam information acquisition unit"; a traffic jam avoidance judgment unit 5814 corresponds to the "traffic jam avoidance judgment unit" and the via point prediction unit 1910 corresponds to the "destination prediction unit".

In the same manner as in the fourth embodiment, a route cost calculation unit 5805 calculates a route cost using road information accumulated in the map information accumulation unit such as node positions, connecting nodes, and link distances. Calculated are: a route cost of a movement route between a current position acquired by the current position acquisition unit 101 and a start position acquired by the start position acquisition unit 102; a route cost between the current position acquired by the current position acquisition unit 101 and a destination acquired by the destination acquisition unit 1909; and a route cost of a movement route between the start position acquired by the start position acquisition unit 102 and the destination acquired by the destination acquisition unit 1909. In addition, information on routes themselves which possess calculated route costs is also outputted. In other words, information on a movement route of the mobile body from the start position to the current position, a route from the start position to the destination position whose route cost is minimum, and a route from the current position to the destination position whose route cost is minimum is outputted. Furthermore, in the same manner as in the fourth embodiment, calculated are: a route cost between the current position acquired by the current position acquisition unit 101 and a destination candidate position acquired by the destination candidate position acquisition unit 103; and a route cost between the start position acquired by the start position acquisition unit 102 and the destination candidate position acquired by the destination candidate position acquisition unit 103.

The junction prediction unit 5811 calculates a position of a junction between a minimum route from the start position to the destination position calculated by the route cost calculation unit 5805 and a route from the current position to the destination position. More specifically, among the intersecting points of a start position-to-destination position route and a current position-to-destination position route, the position of an intersecting point proximal to the current position is to be used as the position of the junction. When there are no intersecting points, a junction is not calculated.

The branch calculation unit 5812 calculates a position of a branch of a minimum route from the start position to the destination position calculated by the route cost calculation unit 5805 and a route from the start position to the current position. More specifically, among the intersecting points of a start position-to-destination position route and a current position-to-start position route, the position of an intersecting point proximal to the current position is to be used as the position of the branch. When there are no intersecting points, a branch is not calculated.

The traffic jam information acquisition unit 5813 acquires traffic jam information by acquiring VICS information or the like via FM radio waves or from a beacon. More specifically, a start point, an end point and a direction of a traffic jam are acquired.

Figure 45:
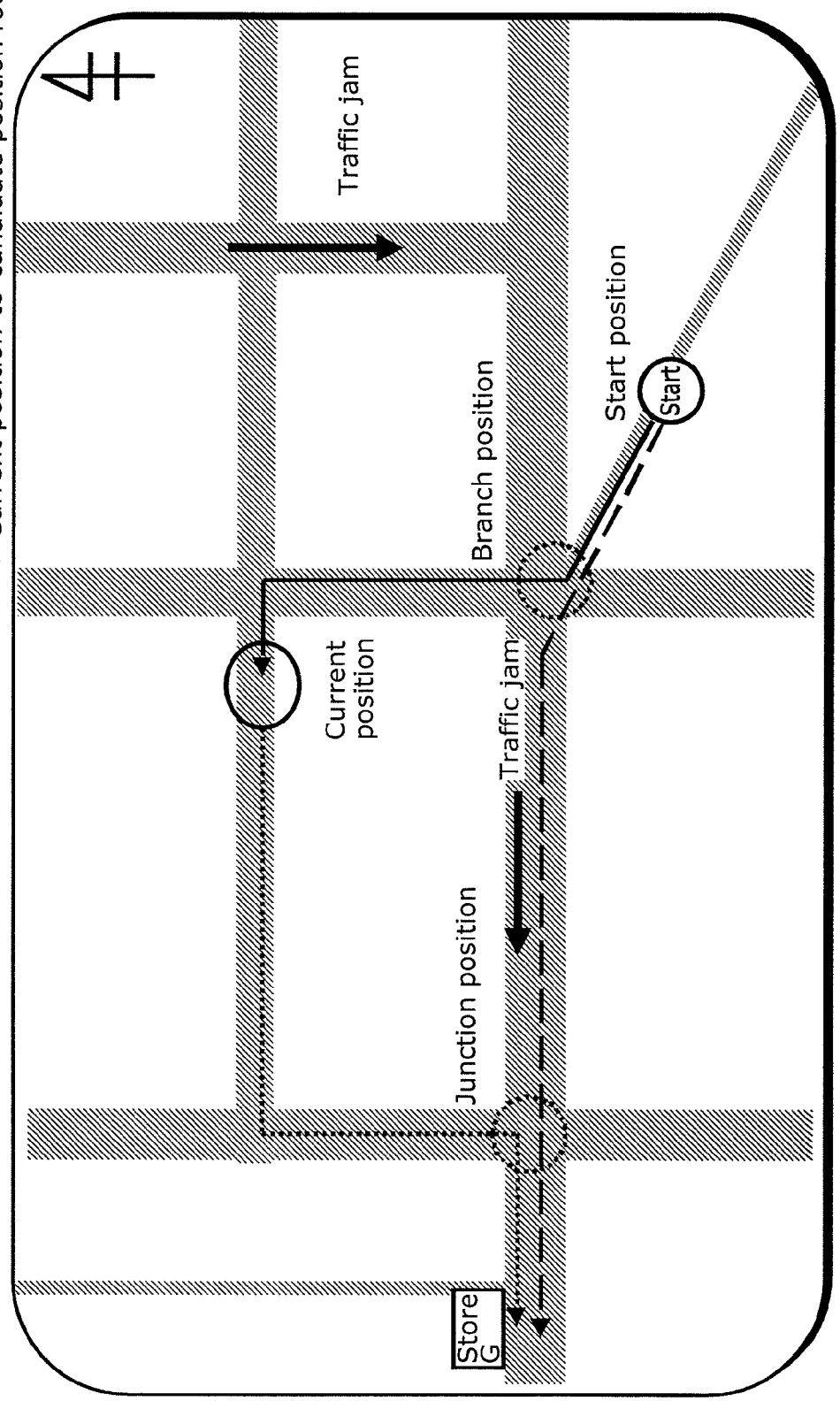
FIG. 45 is a diagram showing an example in which a traffic jam avoidance judgment unit judges an existence of a traffic jam.

When the via point judgment unit judges that a via point exists, the junction prediction unit 5811 calculates a junction, and the branch calculation unit 5812 calculates a branch, the traffic jam avoidance judgment unit 5814 judges the existence of a traffic jam between the branch and the junction on the start position-to-destination route calculated by the route cost calculation unit 5805 using traffic jam information acquired by the traffic jam information acquisition unit 5813, and when a traffic jam exists, let us assume that a detour has been made in order to avoid the traffic jam and corrects the via point judgment so that a via point does not exist. More specifically, a route between a branch and a junction on a start point-to-destination route calculated by the route cost calculation unit 5805 is calculated, and when a traffic jam exists on the route in a direction from the branch towards the junction, the via point judgment is corrected so that a via point does not exist. For example, in the case of FIG. 45, let us assume that, since a detour is made with respect to the destination, circuitousness increases and the via point judgment unit 1907 predicts the existence of a via point. However, since a traffic jam exists between the branch position and the junction position on the start position-to-destination route in the direction from the branch towards the junction, it is judged that a detour was made in order to avoid the traffic jam and the via point judgment is corrected so that a via point does not exist.

Figure 46:
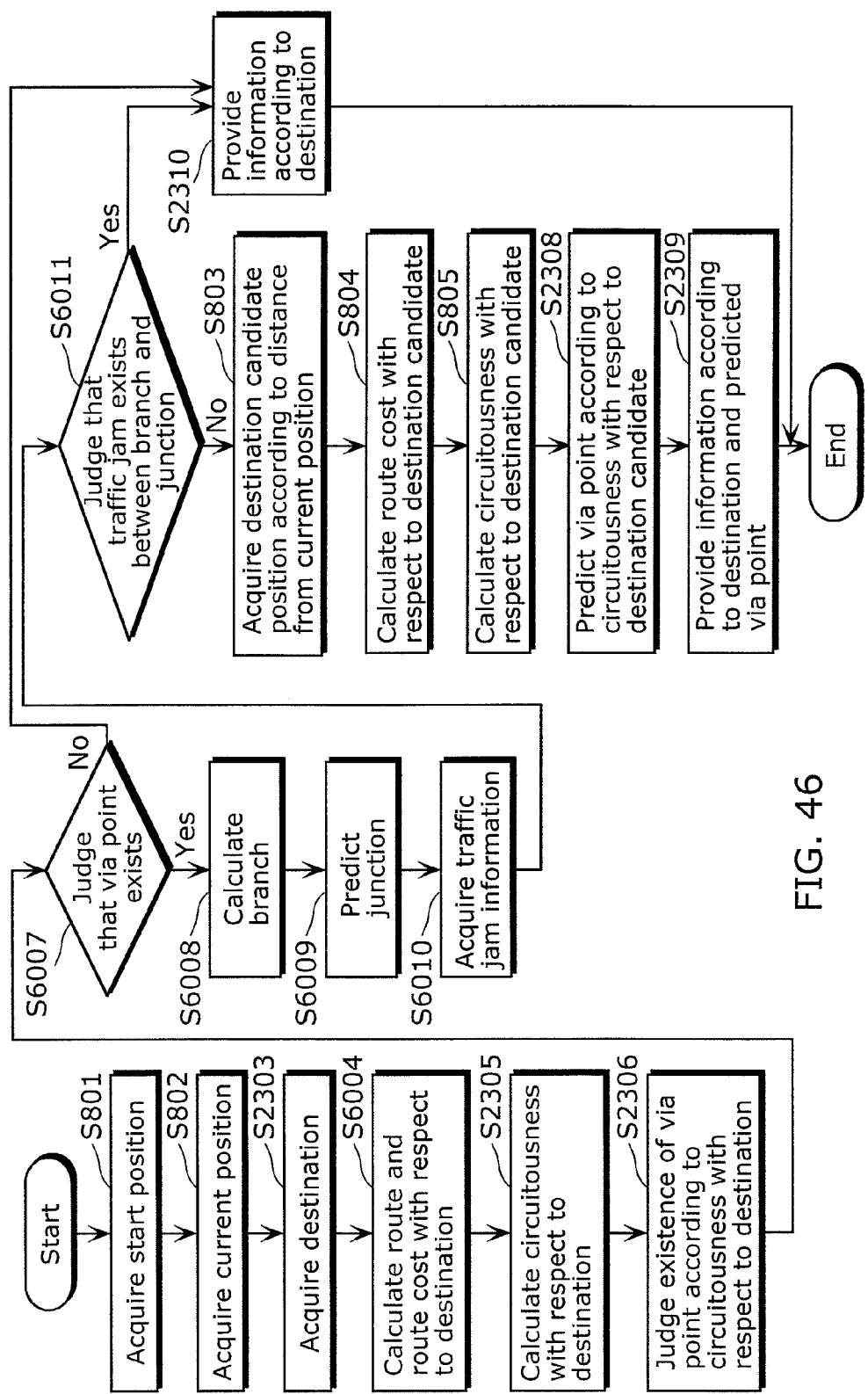
FIG. 46 is a flowchart showing an example of operations of the destination prediction device according to the second modification of the fourth embodiment of the present invention.

A flowchart according to the fifth modification of the present fourth embodiment will now be described with reference to FIG. 46. Components presented in the fourth embodiment described above are assigned like reference numerals and descriptions thereof will be omitted. In the same manner as in the fourth embodiment, after acquiring a start position, a current position and a destination, the route cost calculation unit 5805 calculates a movement route and a route cost between the current position and the start position, a movement route and a route cost between the current position and the destination, and a movement route and a route cost between the start position and the destination using road information accumulated in the map information accumulation unit 104 (step S6004).

The circuitousness calculation unit 1906 calculates a circuitousness with respect to the destination from route costs calculated by the route cost calculation unit 5805 (step S2305). The via point judgment unit 1907 judges whether a via point exists from the circuitousness with respect to the destination (step S2306). A judgment of whether a via point exists is performed (step S6007), and when it is judged that a via point exists (Yes in step S6007), the sequence proceeds to step S6008. When it is judged that a via point does not exist (No in step S6007), the sequence proceeds to step S2310. When it is judged that a via point exists, the branch calculation unit 5812 calculates a branch position from the start position-to-destination position route and the current position-to-start position route calculated by the route cost calculation unit 5805 (step S6008). The junction prediction unit 5811 predicts a junction position from the start position-to-destination position route and the current position-to-destination position route calculated by the route cost calculation unit 5805 (step S6009). The traffic jam information acquisition unit 5813 acquires traffic jam information from VICS or the like (step S6010). The traffic jam avoidance judgment unit 5814 judges whether a via point exists when the traffic jam acquired by the traffic jam information acquisition unit 5813 exists between the branch calculated by the branch calculation unit 5812 and the junction calculated by the junction prediction unit on the start position-to-destination position route calculated by the route cost calculation unit 5805 (step S6011). When it is judged that a traffic jam exists (Yes in step S6011), the sequence proceeds to step S2310. When it is judged that a traffic jam does not exist (No in step S6011), the sequence proceeds to step S803. When it is judged that a traffic jam does not exist, the destination candidate position acquisition unit 103 acquires landmark positions within a predetermined range from the current position from the map information accumulation unit 104 (step S803). Using road information accumulated in the map information accumulation unit 104, the route cost calculation unit 5805 calculates a route cost between the current position and the start position, a route cost between the current position and the destination candidate position, and a route cost between the start position and the destination candidate position (step S804). The circuitousness calculation unit 106 calculates the circuitousness with respect to the destination candidate from route costs calculated by the route cost calculation unit 1905 (step S805). The via point prediction unit 1910 predicts a via point from the circuitousness with respect to the destination candidate calculated by the circuitousness calculation unit 1906 (step S2308). The information provision unit 1908 provides information to the user in accordance with the destination acquired by the destination acquisition unit 1909 and the via point predicted by the via point prediction unit 1910 (step S2309). When it is judged that a via point does not exist or that a traffic jam exists, the information provision unit 1908 provides information to the user in accordance with the destination acquired by the destination acquisition unit 1909 (step S2310).

Fifth Embodiment

Moreover, in the present fourth embodiment, the existence of a via point was predicted on the premise that the destination set to the device is not erroneous. However, it is possible that the set destination is erroneous. For example, in the case of a car navigation system, when a user unfamiliar with a car navigation system sets a destination, there is a possibility that the set destination itself is erroneous as a result of an operational error or the like. In addition, there are cases where the user changes his/her mind during movement and a location that differs from the initially set destination becomes a destination. Accordingly, a destination setting error may be detected whereby the fact that the destination is an setting error may be conveyed to the user, or the destination setting may be automatically canceled whereby filtering may be performed in regards to displaying a recommended route calculated from the set destination or providing guidance information. As a result, it is now possible to prevent information unwanted by the user from being repetitively provided due to erroneous destination guidance, such as when the device repetitively instructs the user to make a U turn.

Figure 47:
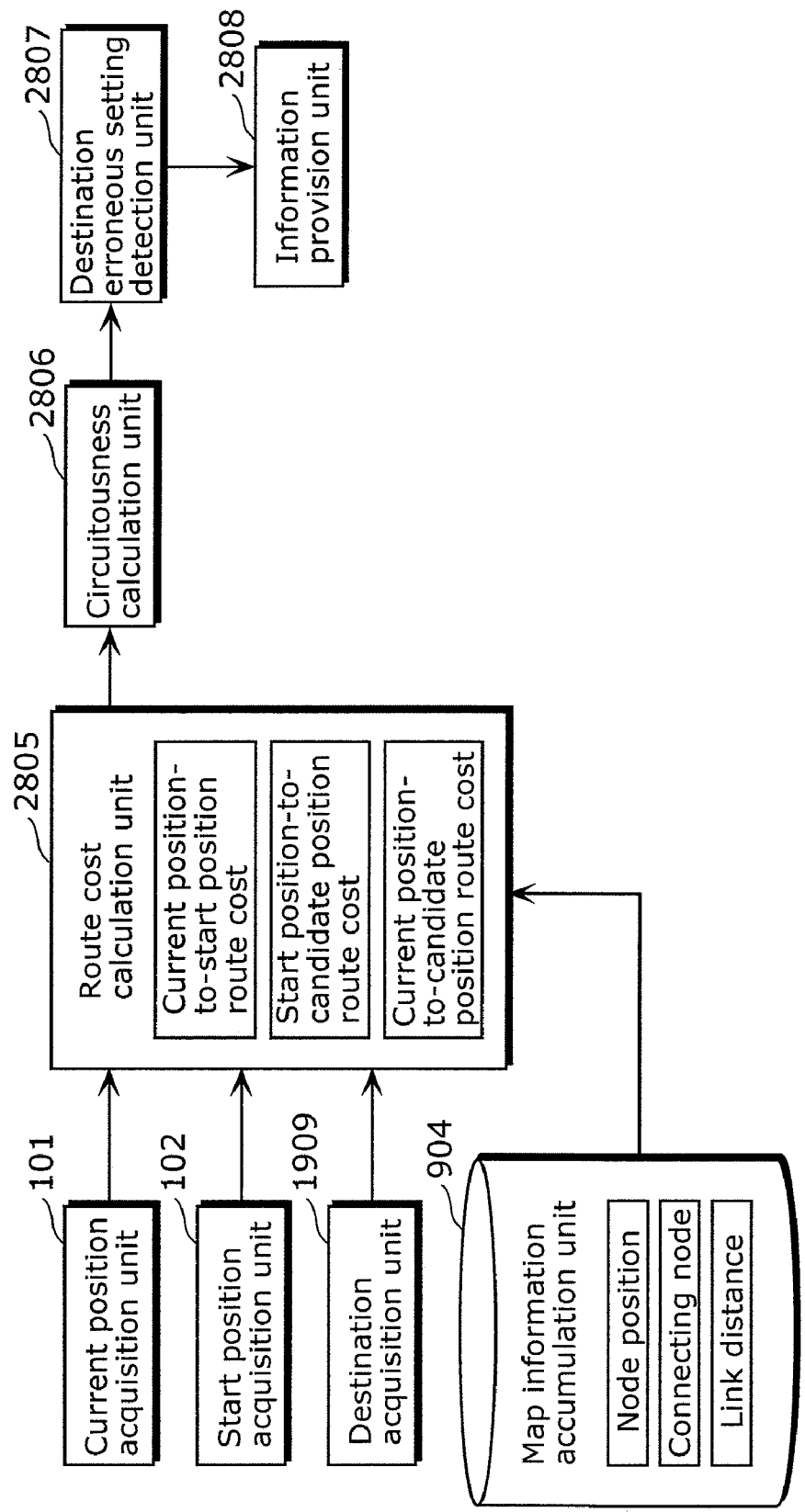
FIG. 47 is a block diagram showing a configuration of a destination prediction device according to a fifth embodiment of the present invention.

FIG. 47 is a configuration diagram of a destination prediction device according to the present embodiment. Components presented in the first, second and fourth embodiments described above are assigned like reference numerals and descriptions thereof will be omitted. Hereinafter, each component will be described first with reference to the drawings, followed by a description on operations of the present device.

The route cost calculation unit 2805 calculates a route cost using road information accumulated in the map information accumulation unit 904 such as node positions, connecting nodes, and link distances. Calculated are: a route cost between a current position acquired by the current position acquisition unit 101 and a start position acquired by the start position acquisition unit 102; a route cost between the current position acquired by the current position acquisition unit 101 and a destination acquired by the destination acquisition unit 1909; and a route cost between the start position acquired by the start position acquisition unit 102 and the destination acquired by the destination acquisition unit 1909.

The destination prediction device in the present embodiment corresponds to the "destination prediction device that further includes: an information provision unit which provides at least information regarding the destination and routes to the destination, wherein the information provision unit provides, when the destination erroneous setting detection unit judges that the acquired destination is erroneous, information related to the destination in a form that is increasingly simplified as the circuitousness with respect to the destination increases". Here, an information provision unit 2808 corresponds to the "information provision unit".

The circuitousness calculation unit 2806 calculates the circuitousness with respect to the destination from route costs calculated by the route cost calculation unit 1905. A circuitousness is the difference of the cost of the route currently traveled by the mobile body with respect to the cost of a route having minimum cost from the start position to the destination. More specifically, the circuitousness with respect to the destination is the difference between the sum of the current position-to-start position route cost and the current position-to-destination position route cost, and the start position-to-destination position route cost.

The destination erroneous setting detection unit 2807 judges whether the destination set from the circuitousness calculated by the circuitousness calculation unit 2806 is erroneous or not. When heading towards a destination, a mobile body tends to move so as to reduce the route cost required for movement. Therefore, the circuitousness that is a cost difference with respect to a minimum cost is also reduced. Consequently, the circuitousness with respect to the destination should be low. Conversely, when the circuitousness is high, the destination is likely to be a location other than the set destination. More specifically, the destination is judged to be erroneous when the circuitousness with respect to the destination is greater than a predetermined value (third threshold). For instance, in the case of FIG. 35, the circuitousness with respect to destination "Store B" is 9 km as shown in FIG. 48. Assuming that the boundary value for judging circuitousness (third threshold) is the traffic jam allowable detour distance set to the device such as, for example, 3 km, since the circuitousness with respect to 9 km is greater than 3 km, the destination is judged to be erroneous.

The information provision unit 2808 provides information to a user through a screen of the destination prediction device or through audio in accordance with a destination acquired by the destination acquisition unit 1909 and a judgment result of the destination erroneous setting detection unit. More specifically, while information regarding the destination such as a recommended route is presented as long as the destination is judged to be correct, when the destination is judged to be erroneous, the destination set to the device is canceled and information regarding the destination is not presented.

Moreover, filtering may be performed such as, for example, while route traffic information or the like regarding the destination is presented through audio and screen display when the destination is judged to be correct, audio guidance of the destination is not performed and only screen display is presented when the destination is judged to be erroneous.

Moreover, when the destination is judged to be erroneous, information to the effect that the destination is erroneous may be provided to the user.

Figure 49:
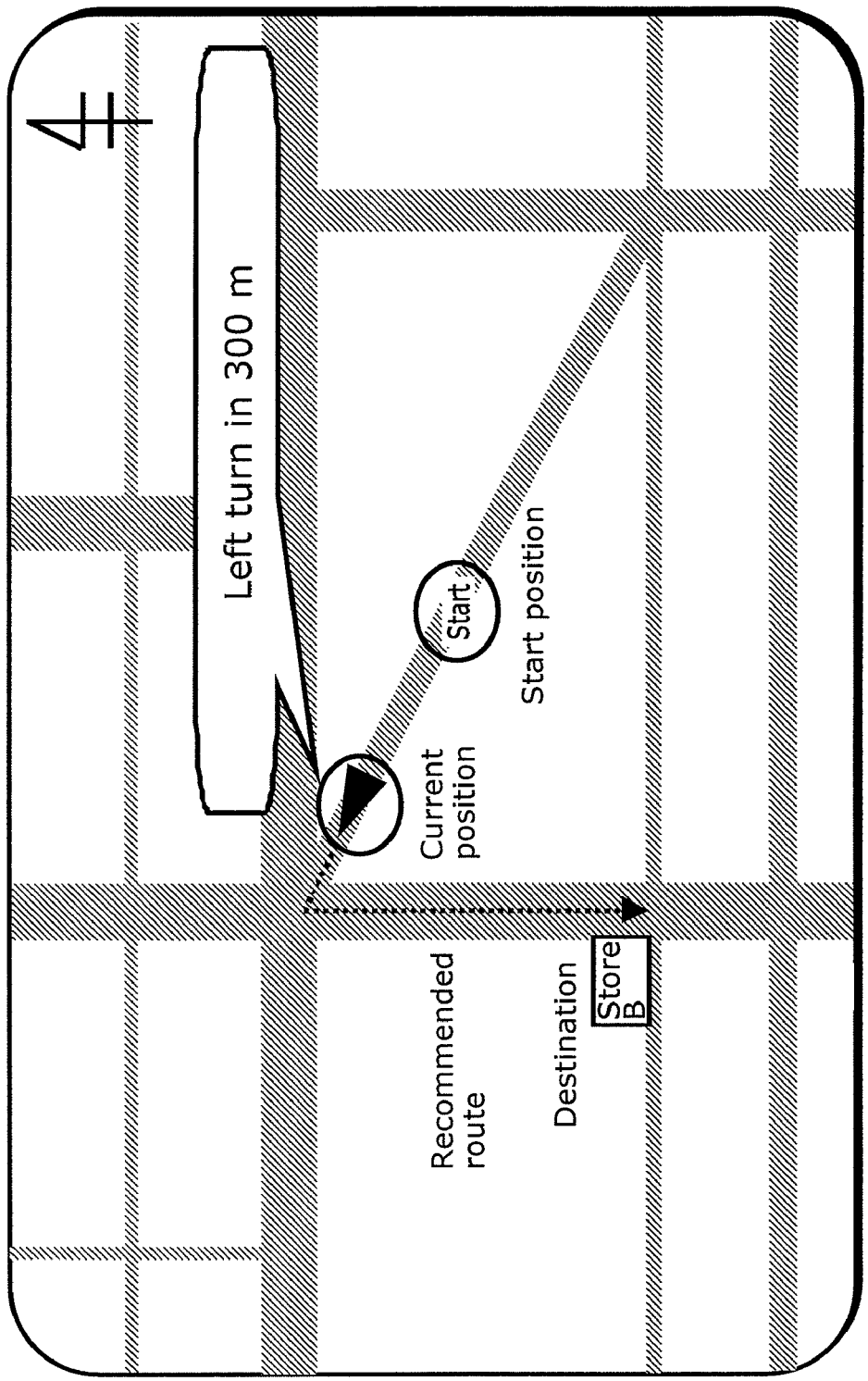
FIG. 49 is a diagram showing an example in which an information provision unit provides information related to a set destination.
Figure 50:
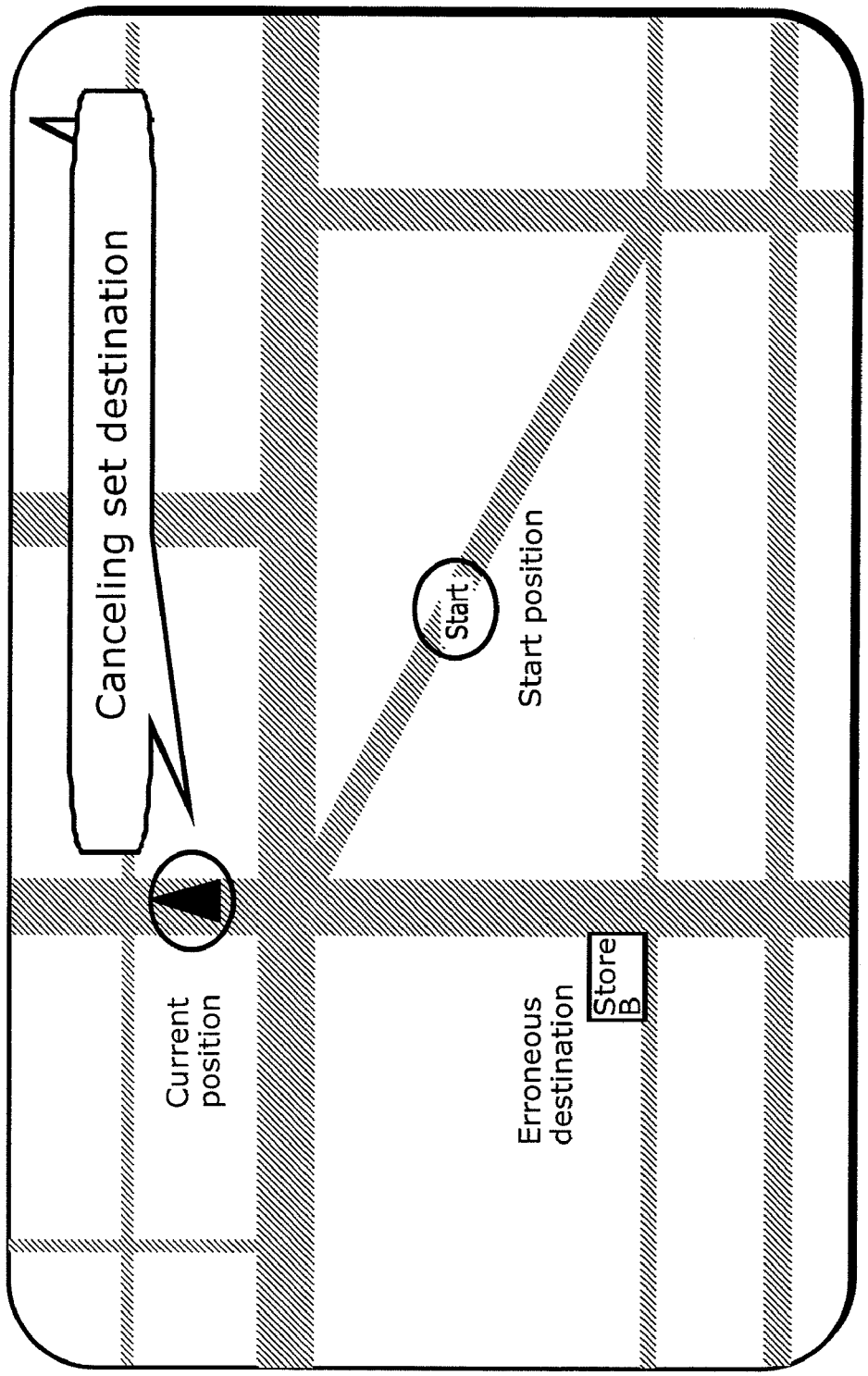
FIG. 50 is a diagram showing an example in which a destination setting is canceled.

For example, as shown in FIG. 49, when the destination of the mobile body is "Store B", guidance of a recommended route is provided as long as the destination is judged to be correct. However, when the destination is judged to be erroneous, the destination setting is canceled as shown in FIG. 50 and a guidance of a recommended route is not provided.

Figure 51:
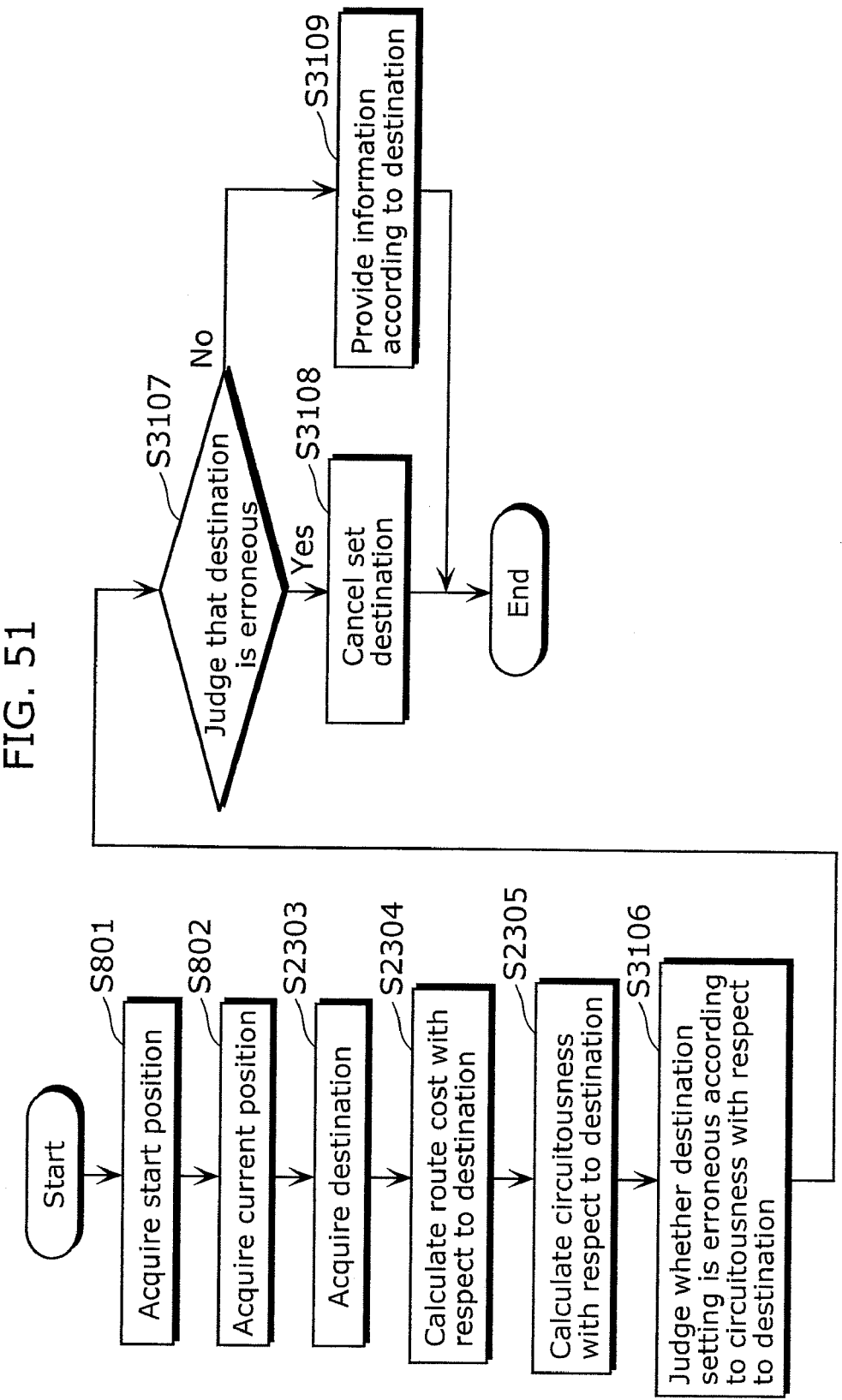
FIG. 51 is a flowchart showing an example of operations of the destination prediction device according to the fifth embodiment of the present invention.

A flowchart according to the present fifth embodiment will now be described with reference to FIG. 51. Components presented in the first and fourth embodiments described above are assigned like reference numerals and descriptions thereof will be omitted. In the same manner as in the fourth embodiment, after calculating circuitousness with respect to the destination, the destination erroneous setting detection unit 2807 judges whether a destination set according to the circuitousness with respect to the destination is erroneous (step S3106). When it is judged that the destination is erroneous (Yes in step S3107), the information provision unit 2808 cancels the set destination and filters information provision regarding the destination. When it is judged that the destination is correct (No in step S3107), the information provision unit 2808 provides information regarding the destination to the user (step S3109).

Moreover, when the circuitousness is high, there is a possibility that a via point newly exists instead of a destination setting error as was the case with the fourth embodiment. Therefore, by setting two thresholds with respect to circuitousness, a detection may be performed on whether the next destination is a set destination, whether the next destination is a via point, and whether the destination setting is erroneous. More specifically, the user presets a threshold with respect to circuitousness which is used for judging the existence of a via point, a threshold used for judging a traffic jam allowance distance and a destination erroneous setting, and a detour allowable distance. A detour allowable distance is a route distance maximum value allowable by the user and which increases when stopping by at a via point with respect to a route that enables movement to the destination by minimum distance. A detour allowable distance increases with respect to a traffic jam allowable distance. For example, let us assume that the traffic jam allowable distance is 3 km and the detour allowable distance is 6 km. In this case, when the circuitousness with respect to the set destination is equal to or less than 3 km, the destination setting is not erroneous and a judgment is made that a via point does not exist, whereby information on the set destination is provided. When the circuitousness with respect to the set destination is greater than 3 km and equal to or less than 6 km, the destination setting is not erroneous and a judgment is made that a via point exists, whereby a via point is predicted and information is provided on a route that travels through the via point and heads to the destination. When the circuitousness with respect to the set destination is equal to or greater than 6 km, the destination setting is judged to be erroneous, the destination set to the device is canceled, and information on the destination is not provided.

Moreover, in a similar manner as the fifth modification of the fourth embodiment, when a traffic jam exists between a branch and a junction on a start position-to-destination position route, it may be assumed that the circuitousness has increased in order to avoid the traffic jam and that the destination setting is not erroneous.

First Modification of Fifth Embodiment

Moreover, in the present fifth embodiment, processing performed when detecting an erroneous set destination is constant regardless of the size of the circuitousness. However, processing may be changed according to circuitousness size. In other words, the degree in which information regarding the destination is filtered is changed according to circuitousness size. More specifically, the smaller the circuitousness with respect to the set destination, the greater the volume of information provided on the set destination or a route with respect to the set destination. The greater the circuitousness, the more the volume of information provided with respect to the set destination is reduced or, in other words, the information is filtered. When the circuitousness with respect to the set destination is small, it is likely that the set destination is not erroneous. Accordingly, since information regarding the set destination is useful, a large volume of information is acceptable. However, as the circuitousness with respect to the set destination increases, the possibility that the set destination is erroneous also increases. Alternatively, even if not erroneous, the possibility increases that a new via point or the like which must be visited before the set destination exists and that information regarding the destination is not required. Providing information that is not required is undesirable to a user. In particular, when the mobile unit is a vehicle, this may interfere with the user's driving. Therefore, it is useful to limit the volume of information provided regarding the set destination in accordance with the size of circuitousness or, in other words, in accordance with the possibility that the set destination is erroneous. In particular, in the case where the set destination is erroneous when providing guidance information on a recommended route from the current point to the destination, a deviation from the recommended route often occurs, resulting in frequent recalculation of the recommended route which significantly increases the volume of provided information. However, when the set destination is erroneous, the user's driving is impeded since the user does not require information up to the set destination. By filtering information according to circuitousness in stages, filtering can be performed on guidance information of a recommended route even in a state where the circuitousness is not large enough to ensure that the destination is erroneous.

In addition, by filtering information in stages as described above, it is now possible to prevent adverse effects on the user due to judgmental errors on whether the destination is erroneous, such as preventing route information to the destination which is desired by the user from disappearing suddenly.

As for a method of filtering provided information regarding the set destination according to circuitousness, to be specific, filtering is performed by ranking types of provided information according to circuitousness, whereby the information provision unit 2808 provides information corresponding to ranks derived from circuitousness.

For example, ranks of circuitousness are arranged as shown in FIG. 52. In the case of FIG. 52, it is shown that provided information for rank "1" is "recommended route display, audio guidance of route, road traffic information of route, road traffic information around destination, and destination information", and that the circuitousness is less than 2 km. In this manner, a circuitousness rank and the types of provided information are determined so that the greater the circuitousness, the more limited the volume of information to be provided. Road traffic information is traffic jam information, road construction information or the like, while destination information is information on the destination itself such as, for example, menu information, information on business hours, and vacancy information in the case where the destination is a restaurant.

A specific example will now be described. In the case where circuitousness is 5 km, since the circuitousness rank corresponding to a circuitousness of 5 km is 3, the information provision unit 2808 provides road traffic information of the route to the destination, road traffic information in the periphery of the destination, and destination information to the user.

Second Modification of Fifth Embodiment

Moreover, in the present fifth embodiment, when the set destination is erroneous, either the destination setting is canceled or filtering is performed on provided information. However, a correct destination may also be newly predicted. For example, as in the case with the third embodiment, a destination is predicted using a destination history and circuitousness. Consequently, information regarding a correct destination can be provided without having the user reset a destination from the beginning.

Third Modification of Fifth Embodiment

Moreover, in the present embodiment, an error in the destination setting is detected using circuitousness. Furthermore, the destination may be corrected based on the method which the user had used to set the destination. Generally, when setting a destination in a car navigation system, a destination may either be set using a name of a landmark or by inputting a point on a map. When setting a destination by a name of a landmark, a landmark is retrieved or information of a registration point already set by the user is called up and the name is selected to set a destination. In this case, there is a high possibility that a setting error or the like occurs due to similar names. For example, there may be a case where, when attempting to set a location named "守口市駅 (moriguchishieki; Moriguchi City Station)" as a destination, "守口駅 (moriguchieki; Moriguchi Station)", which is a different location, is set instead. In addition, there may be a case where, when attempting to set "セブンイレブン守口店 (sefenelefenmoriguchiten; Sefen-Elefen Moriguchi Branch)", "セブンイレブン門真店 (sefenelefenkadomaten; Sefen-Elefen Kadoma Branch)" is inadvertently set instead. Furthermore, there may be a case where, when attempting to set "日本橋 (Nipponbashi)" in Osaka, "日本橋 (Nihonbashi)" in Tokyo is inadvertently set instead. In consideration thereof, when circuitousness is calculated and a judgment is made that the destination setting by the user is erroneous, there may be cases where a correct destination can be detected by searching for information on another location having the same or similar name and calculating circuitousness with respect to that location. Furthermore, when setting a destination by inputting a point on a map, there may be cases where a correct destination can be detected by searching for locations where similar place-names exist on the map on which a destination is to be set. Moreover, when a destination is set using a telephone number or a map code, there may be cases where a correct destination can be detected by performing a search using a similar telephone number. As described, it is possible to automatically modify the destination by searching for a correct destination based on the method used to set the destination.

Figure 53:
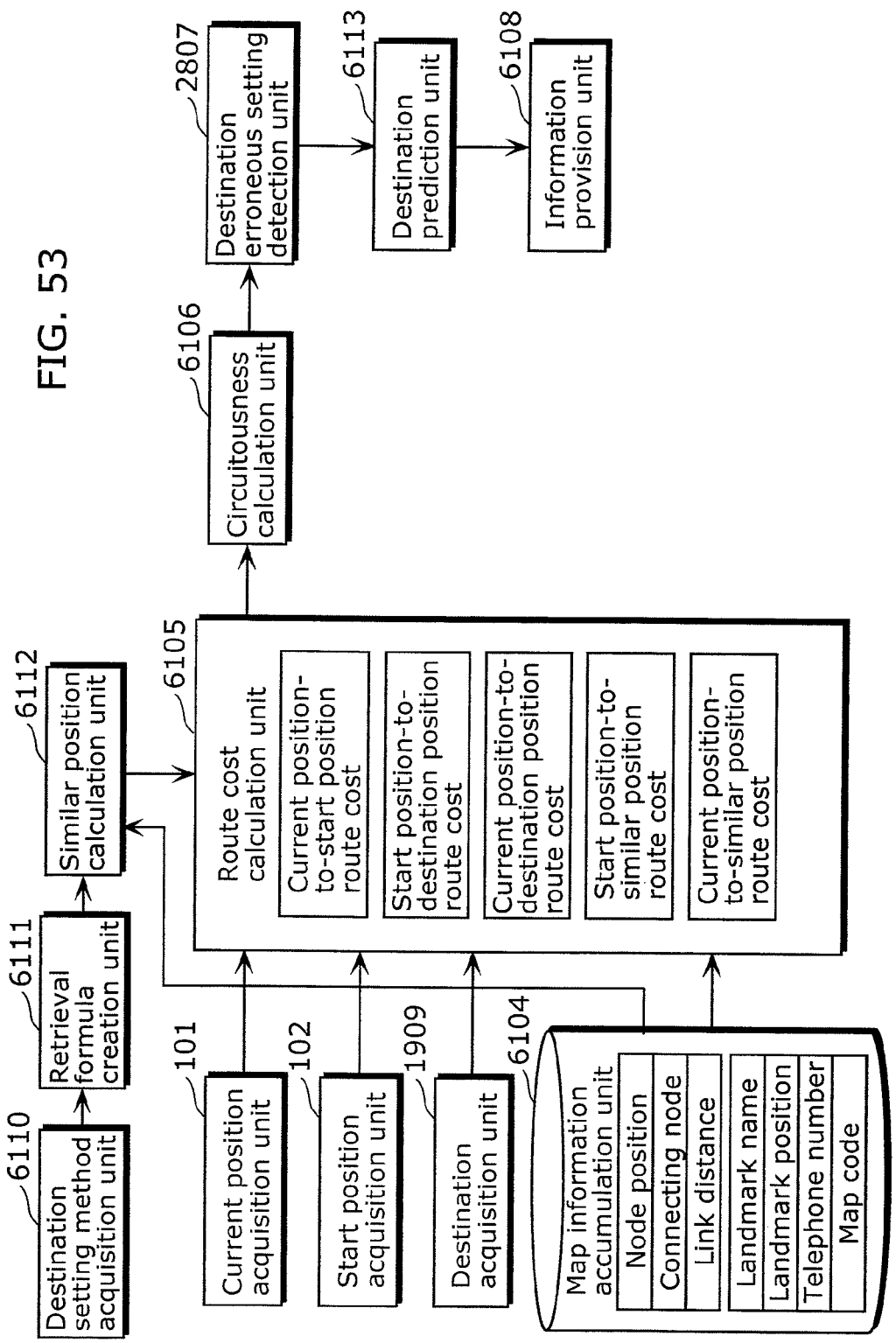
FIG. 53 is a block diagram showing a configuration of a destination prediction device according to a third modification of the fifth embodiment of the present invention.

FIG. 53 is a configuration diagram of a destination prediction device according to the present embodiment. Components presented in the fifth embodiment described above are assigned like reference numerals and descriptions thereof will be omitted. Hereinafter, each component will be described first with reference to the drawings, followed by a description on operations of the present device.

The destination prediction device in the present embodiment corresponds to the destination prediction device that further includes: a destination acquisition unit which acquires a destination of a mobile body from a user; and a destination erroneous setting detection unit which judges that the acquired destination is erroneous when the circuitousness with respect to the destination is equal to or greater than a third threshold, wherein the destination candidate position acquisition unit acquires, when it is judged that the acquired destination is erroneous, a position of a destination candidate by using, as the destination, a similar position that lies in a predetermined range from the current position of the mobile body and which is confusable with the destination, and the destination prediction unit predicts, as a correct destination, a destination candidate whose circuitousness is the smallest among the destination candidates. Here, the destination acquisition unit 1909 corresponds to the "destination acquisition unit"; the destination erroneous setting detection unit 2807 corresponds to the "destination erroneous setting detection unit"; a similar position calculation unit 6112 corresponds to the "destination candidate position acquisition unit"; and a destination prediction unit 6113 corresponds to the "destination prediction unit".

The map information accumulation unit 6104 accumulates road information such as positions and link distances. For example, as shown in FIG. 3, node positions, connecting nodes, and distances of links connecting the nodes are accumulated. Node ID "001" shown in FIG. 3 has a node position of longitude "134.3.0.9" and latitude "34.6.3.6", and is connected to node IDs "002", "003", "004", and "005". In addition, link ID "001" is a link connecting the start point node ID "001" and the end point node ID "002", and is shown to have a link distance of "1 km". Furthermore, as shown in FIG. 56, also accumulated is landmark information such as names of landmarks that may potentially become a destination such as a place-name, a store, a place of interest, a station and the like, as well as a furigana notation of the names, telephone numbers, map codes, positions and the like. The "name", the "furigana notation", the "telephone number", the "map code" and the "position" of a landmark are referred to as categories of the landmark.

The route cost calculation unit 6105 calculates a route cost using road information accumulated in the map information accumulation unit 6104 such as node positions, connecting nodes, and link distances. Calculated are: a route cost between a current position acquired by the current position acquisition unit 101 and a start position acquired by the start position acquisition unit 102; a route cost between the current position acquired by the current position acquisition unit 101 and a destination acquired by the destination acquisition unit 1909; a route cost between the start position acquired by the start position acquisition unit 102 and the destination acquired by the destination acquisition unit 1909; a route cost between the current position acquired by the current position acquisition unit 101 and a similar position acquired by the similar position calculation unit 6112; and a route cost between the start position acquired by the start position acquisition unit 102 and the similar position acquired by the similar position calculation unit 6112.

The circuitousness calculation unit 6106 calculates a circuitousness from route costs calculated by the route cost calculation unit 6105. Circuitousnesses are respectively calculated for the destination and the similar position acquired by the similar position calculation unit 6112. A circuitousness is the difference of the cost of the route currently traveled by the mobile body with respect to the cost of a route having minimum cost from the start position to the destination or to a destination candidate. More specifically, the circuitousness with respect to the destination is the difference between the sum of the current position-to-start position route cost and the current position-to-destination position route cost, and the start position-to-destination position route cost. The difference between the sum of the current position-to-start position route cost and the current position-to-similar position route cost, and the start position-to-similar position route cost is to be used as the circuitousness with respect to the similar position.

Figure 54:
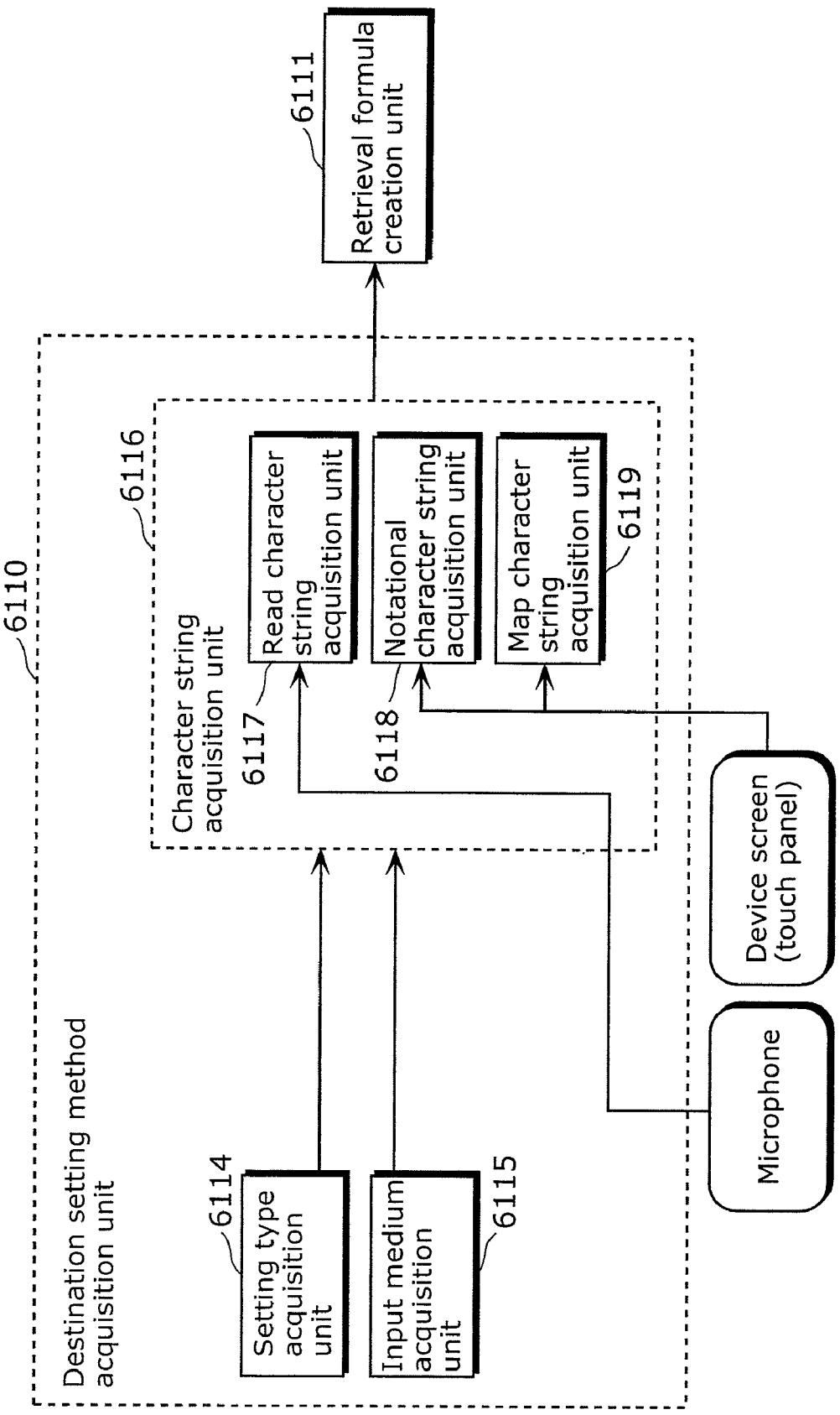
FIG. 54 is a block diagram showing a configuration of a destination setting method acquisition unit.

The destination setting method acquisition unit 6110 acquires the type of destination setting method used by the user when setting the destination to a destination prediction device such as a car navigation system, a medium, and a character string related to the destination that was actually inputted, displayed and selected. The type of the destination setting method is stored in a memory, not shown, of a destination prediction device such as a car navigation system when the user sets a destination. More specifically, when the user sets a destination, several types of destination setting methods are presented on a menu screen of a destination prediction device such as a car navigation system. Examples include destination setting by audio input, destination setting via input from a touch panel displaying a map, and destination setting by inputting a character string of the name of a landmark. The user selects a desired setting method from the presented setting methods, and sets a destination using the selected setting method. At this point, the destination prediction method such as a car navigation system stores the selected destination setting method in a memory. FIG. 54 shows an internal structure of the destination setting method acquisition unit.

Furthermore, the destination prediction device in the present embodiment corresponds to the "destination prediction device, wherein the map information accumulation unit accumulates landmark information in which points are represented by at least one of a landmark name, a landmark position, a telephone number, and a map code, the destination prediction device further includes: a destination setting method acquisition unit which acquires a type of landmark information representing the destination acquired by the destination acquisition unit and a character string related to the destination; a retrieval formula creation unit which creates a retrieval formula including the landmark information type and the character string which is used for retrieving the similar position according to the landmark information type of the destination and the character string; and a similar position calculation unit which retrieves the similar position from the landmark information according to the retrieval formula, and the destination prediction unit predicts, as the correct destination, a destination candidate whose circuitousness is the smallest among the similar positions. Here, the map information accumulation unit 6104 corresponds to the "map information accumulation unit", a setting type acquisition unit 6114, an input medium acquisition unit 6115, and a character string acquisition unit 6116 correspond to the "destination setting method acquisition unit, a retrieval formula creation unit 6111 corresponds to the "retrieval formula creation unit 6111"; the similar position calculation unit 6112 corresponds to the "similar position calculation unit", and the destination prediction unit 6113 corresponds to the "destination prediction unit".

The setting type acquisition unit 6114 acquires a destination setting method type. Types of destination setting methods include "name input" in which the name of a landmark, such as "守口市駅" is either selected from a screen-displayed list or directly inputted using a remote controller or the like, "telephone number input" in which a number such as a telephone number is inputted, "map code input", "latitude and longitude input", and "map screen input" in which a map screen is displayed and the position of the destination is directly specified. For example, when the user sets the destination by enunciating "モリグチシエキ (moriguchishieki; Moriguchi City Station)" into a microphone, a setting method type of "name input" is acquired. In addition, when the user sets the destination by directly inputting a telephone number, "0600000000", a setting method type of "telephone number input" is acquired. For example, when directly setting the position of the destination on a map screen, a type of "map screen input" is acquired.

The input medium acquisition unit 6115 detects whether input was performed through audio upon setting the destination. Input media include "selection input" in which the user selects and inputs a character or a position using a remote controller or a touch panel, and "audio input" in which input is performed when the user verbally enunciates into a microphone. For example, when the user sets a destination by selecting "守口市駅" from a list of destinations displayed on the screen, the "selection input" medium is acquired. In addition, when the user sets the destination by enunciating "モリグチシエキ" into a microphone, the "audio input" medium is acquired. For example, when the user sets the destination by directly inputting a telephone number, "0600000000", the "selection input" medium is acquired. For example, when directly setting the position of the destination on a map screen, the "selection input" medium is acquired.

The character string acquisition unit 6116 acquires a character string regarding the set destination. The character string acquisition unit 6116 includes: a read character string acquisition unit 6117 that performs character string acquisition when the destination has been set by "audio input"; a map character string acquisition unit 6119 that performs character string acquisition when the destination has been set by "map screen input"; and a notational character string acquisition unit 6118 that performs character string acquisition when the destination has been set by a method other than the above.

When the medium acquired by the input medium acquisition unit 6115 is "audio input", the read character string acquisition unit 6117 acquires a verbally inputted word as a read character string. For example, when the user sets the destination by enunciating "モリグチシエキ" into a microphone, a character string of "モリグチシエキ" is acquired.

When the medium acquired by the input medium acquisition unit 6115 is "selection input" and the setting type acquired by the setting type acquisition unit 6114 is a type other than "map screen input", the notational character string acquisition unit 6118 acquires a character string displayed on the navigation screen which has been selected and inputted by the user. For example, when the user sets a destination by selecting a field displayed as "守口市駅" from a list of destinations displayed on the screen, the character string "守口市駅" is acquired. In addition, when the user sets the destination by directly inputting a telephone number, "0600000000", the character string "0600000000" displayed on the screen upon input is acquired.

Figure 55:
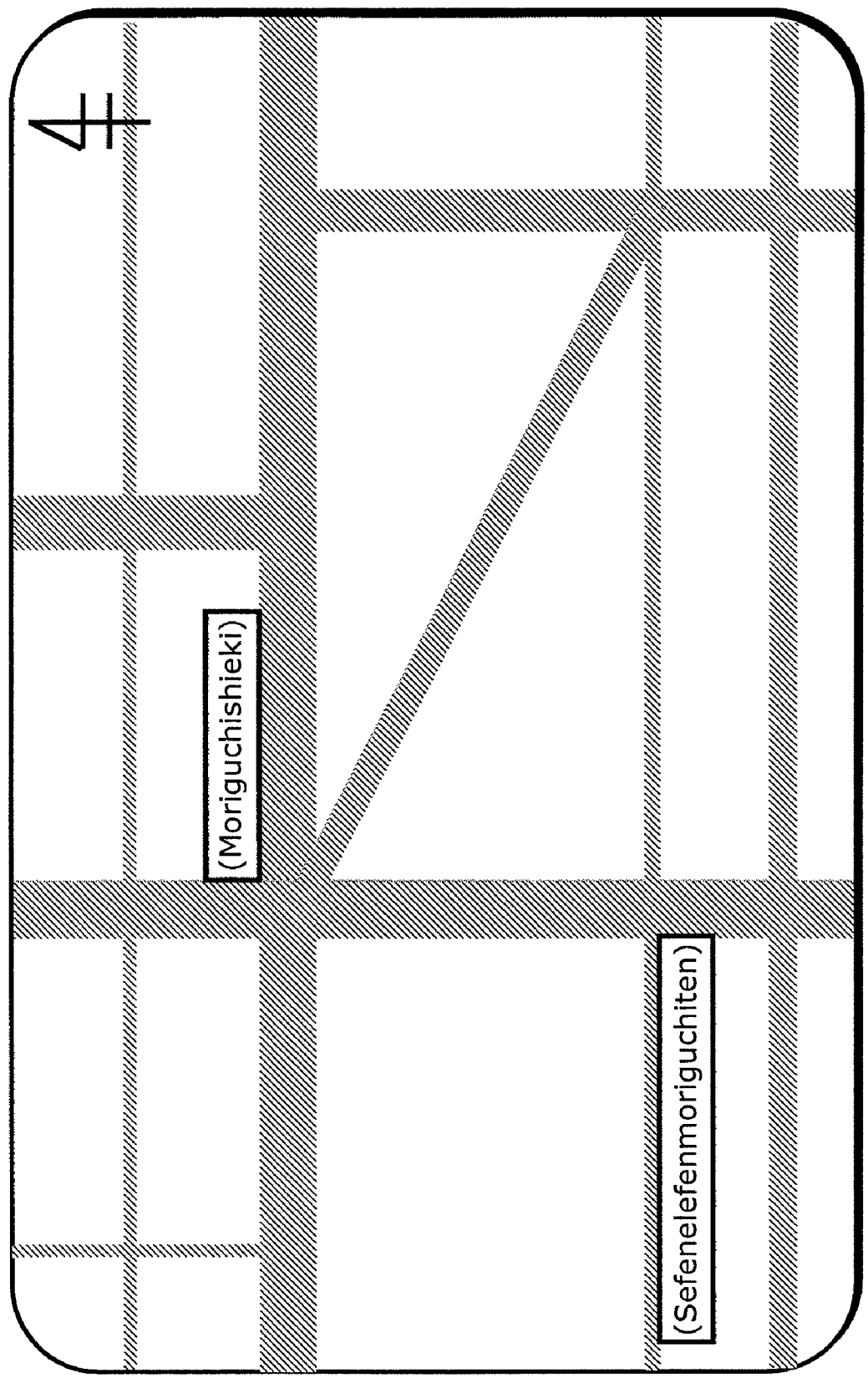
FIG. 55 is a diagram showing an example in which a map character string acquisition unit acquires a map character string.

When the setting type acquired by the setting type acquisition unit 6114 is "map screen input", the map character string acquisition unit 6119 acquires all notational character strings of landmark names displayed on the map screen on the destination prediction device when the destination had been set. For example, as shown in FIG. 55, when the position of the destination is directly set on a map screen on which landmark names of "守口市駅" and "セブンイレブン守口店" are displayed, the character strings of "守口市駅" and "セブンイレブン守口店" are acquired.

The retrieval formula creation unit 6111 calculates a retrieval formula used when retrieving a similar position to the set destination based on a type of destination setting method acquired by the destination setting method acquisition unit 6110, a medium, and a character string related to the destination. A retrieval formula includes landmark information categories such as a name of a landmark and a furigana notation thereof, a telephone number, a map code and a position, and a retrieval character string.

More specifically, when a landmark has been set by "name input" and "selection input", a retrieval formula is created by replacing a portion of the inputted character string with a wild card (*) that substitutes any zero or more characters. For example, when "守口市駅 (moriguchishieki)" has been inputted, "*口市駅 (*guchishiekii)", "守*市駅 (mori*shieki)", "守口*駅 (moriguchi*eki)" and "守口市 (moriguchishi*)" are to be used as retrieval character strings for a retrieval in the "name" category of landmarks. In addition, when a landmark has been set by "name input" and "audio input", a retrieval character string is created by replacing a portion of the inputted character string (furigana notation) with a wild card (*) that substitutes any zero or more characters. For example, when "モリグチシ (moriguchishieki)" has been inputted, "*リグチシエキ (*riguchishieki)", "モ*グチシエキ (mo*guchishieki)", "モリ*チシエキ (mori*chishieki)", "モリグ*シエキ (morigu*shieki)", "モリグチ*エキ (moriguchi*eki)", "モリグチシ*キ (moriguchishi*ki)" and "モリグチシエ* (moriguchishie*)" are to be used as retrieval formulas for a retrieval in the "name (furigana notation)" category of landmarks. Furthermore, when input has been performed by "telephone number input", "map code input" and "latitude and longitude input", retrieval formulas are created by replacing a portion of the inputted numerical character string with a wild card (*) that substitutes any zero or more characters. The retrieval category is "telephone number" in the case of "telephone number input", "map code" in the case of "map code input", and "latitude" and "longitude" in the case of "latitude and longitude input". For example, when "0669081121" has been inputted by telephone number input, "*669081121", "0*69081121", "06*9081121", "066*081121", "0669*81121", "06690*1121", "066908*121", "0669081*21", "06690811*1" and "066908112*" are to be used as retrieval character strings for a retrieval in the "telephone number" category. Moreover, in the case of map screen input, retrieval character strings are created by replacing a portion of all character strings acquired by the map character string acquisition unit 6119 with a wild card (*) that substitutes any zero or more characters. For example, when "守口市駅" and "セブンイレブン守口店" were acquired as map character strings, retrieval character strings are respectively created by replacing a portion of the names with a wild card (*) that substitutes any zero or more characters. The retrieval category is to be the landmark "name". The similar position calculation unit 6112 uses the retrieval formula calculated by the retrieval formula creation unit 6111 to calculate a similar position that is similar to the set destination from landmark information accumulated in the map information accumulation unit 6104. More specifically, positions of all landmarks retrieved using the calculated retrieval formula are to be used as similar positions. For example, in the case where the retrieval formula includes the retrieval category "name" and the retrieval character strings "*口市駅","守*市駅","守口*駅" and "守口市*", a retrieval is performed using the calculated retrieval character string with respect to the "names" of landmarks accumulated in the map information accumulation unit. For example, in the case of FIG. 56, "守口駅" is retrieved in addition to the set destination "守口市駅" and longitude "134.5.59.", latitude "34.6.4.6" is calculated as the similar position.

When the destination erroneous setting detection unit 2807 detects that the destination setting is erroneous, the destination prediction unit 6113 predicts the position of a correct destination using the circuitousness with respect to a similar position calculated by the circuitousness calculation unit 6106 and acquired by the similar position calculation unit 6112. More specifically, a similar position having the smallest circuitousness among the calculated similar positions is predicted as the destination.

When it is detected that the destination is not erroneous, the information provision unit 6108 provides information to the user in accordance with the destination acquired by the destination acquisition unit 1909. When it is detected that the destination is erroneous, the information provision unit 6108 provides information to the user in accordance with the destination predicted by the destination prediction unit 6113. Traffic information on the destination or the route to the destination, or information on recommended routes is provided to the user through a screen of the destination prediction device or through audio.

Figure 57:
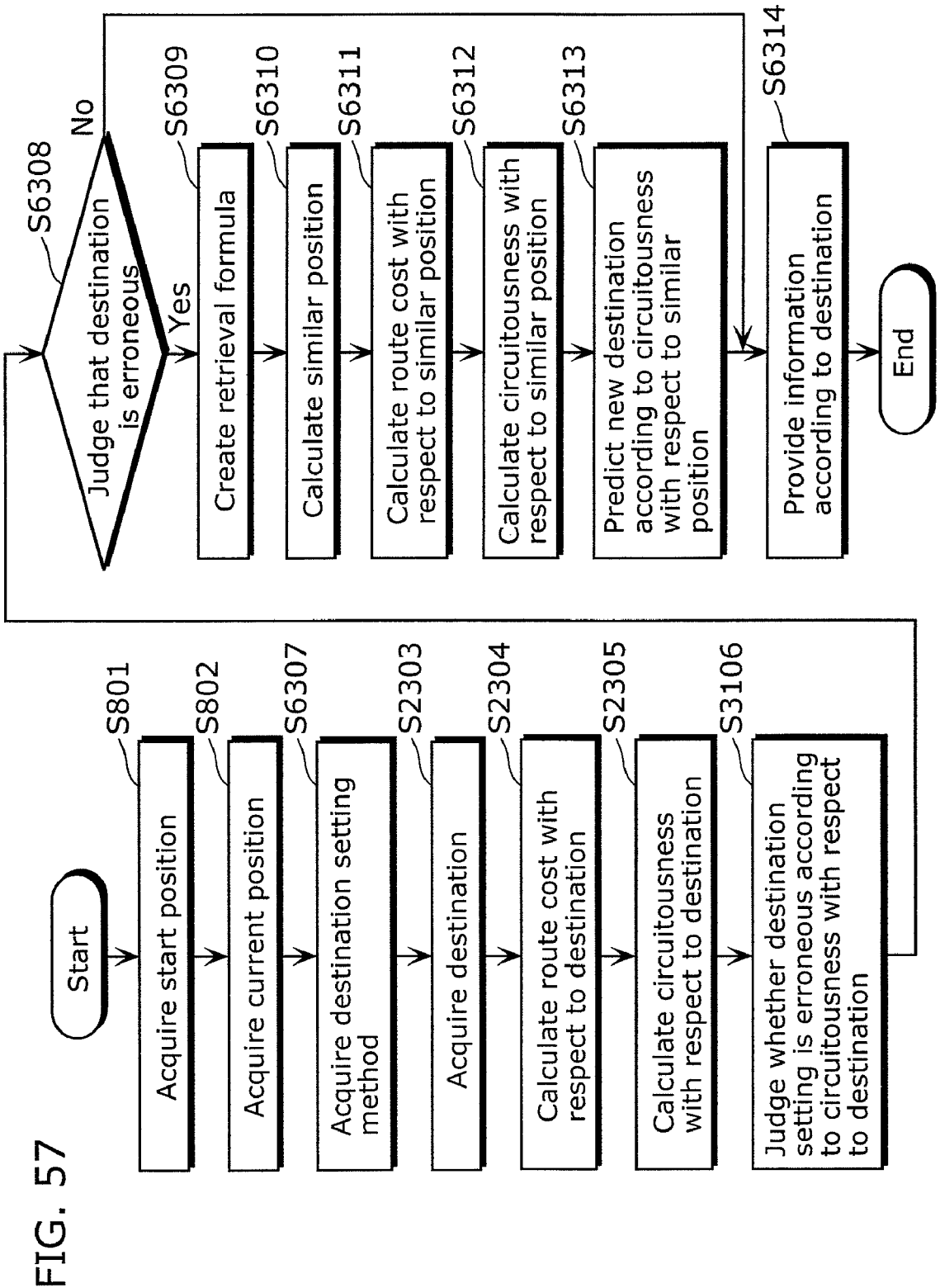
FIG. 57 is a flowchart showing an example of operations of the destination prediction device according to the third modification of the fifth embodiment of the present invention.

A flowchart according to the third modification of the present fifth embodiment will now be described with reference to FIG. 57. Components presented in the fifth embodiment described above are assigned like reference numerals and descriptions thereof will be omitted. In the same manner as in the fifth embodiment, after acquiring a start position and a current position, the destination setting method acquisition unit 6110 acquires a destination setting method and a character string related to the destination (step S6307). The destination acquisition unit 1909 acquires the destination set to the device and a position thereof (step S2303). Using road information accumulated in the map information accumulation unit 104, the route cost calculation unit 6105 calculates a route cost between the current position and the start position, a route cost between the current position and the destination, and a route cost between the start position and the destination (step S2304). The circuitousness calculation unit 6106 calculates the circuitousness with respect to the destination from route costs calculated by the route cost calculation unit 6105 (step S2305). The destination erroneous setting detection unit 2807 judges whether the set destination is erroneous or not based on the circuitousness with respect to the destination (step S3106). When it is judged that the destination is erroneous (Yes in step S6308), the sequence proceeds to step S6309. When it is judged that the destination is not erroneous (No in step S6308), the sequence proceeds to step S6314. When it is judged that the destination is erroneous, the retrieval formula creation unit 6111 creates a retrieval formula from the destination setting method acquired by the destination setting method acquisition unit 6110 and the character string related to the destination (step S6309). The similar position calculation unit 6112 calculates a position of a similar landmark to the set destination from the retrieval formula calculated by the retrieval formula creation unit 6111 and the landmark information accumulated in the map information accumulation unit 6104 (step S6310). Using road information accumulated in the map information accumulation unit 104, the route cost calculation unit 6105 calculates a route cost between the current position and the start position, a route cost between the current position and the similar position, and a route cost between the start position and the similar position (step S6311). The circuitousness calculation unit 6106 calculates the circuitousness with respect to the similar position from route costs calculated by the route cost calculation unit 6105 (step S6312). The destination prediction unit 6113 predicts a similar position to become the destination from the circuitousness with respect to the similar position (step S6313). The information provision unit 6108 provides information to the user according to the set destination when the set destination is correct and according to the predicted destination when the set destination is erroneous.

INDUSTRIAL APPLICABILITY

As described above, the destination prediction device according to the present invention enables the provision of information related to the destination of a mobile body and to abnormal behavior of the mobile body based on circuitousness and, for example, is useful in a device that acquires and provides positional information on the mobile body such as a car navigation device, a mobile phone, a GPS mounted security system and the like.

The invention claimed is:

1. A destination prediction device that predicts a destination, comprising:
    a map information accumulation unit configured to accumulate map information including positions of a plurality of predetermined points and road information between the plurality of positions;
    a start position acquisition unit configured to acquire a start position of a mobile body;
    a current position acquisition unit configured to acquire a current position of the mobile body;
    a destination candidate position acquisition unit configured to acquire, based on the acquired start position and the current position, positions of a plurality of destination candidates that may potentially become destinations of the mobile body from said map information accumulation unit;
    a circuitousness calculation unit configured to calculate a circuitousness that is a deviation in route cost between (1) a route from the start position to the position of the destination candidate which passes through the current position and (2) a route capable of arriving at the position of the destination candidate from the start position at a minimum route cost; and
    a destination prediction unit configured to predict, as the destination, a destination candidate whose calculated circuitousness is the smallest among the destination candidates.

2. The destination prediction device according to claim 1, wherein said destination prediction unit is configured to predict as the destination, in addition to the destination candidate whose circuitousness is the smallest, a destination candidate whose circuitousness is equal to or less than a first threshold among the destination candidates.

3. The destination prediction device according to claim 1, further comprising:
    a current position-to-candidate position route cost calculation unit configured to identify a route between the current position and the position of the destination candidate by using the map information, and to calculate a current position-to-candidate position route cost that is the route cost with respect to the identified route;
    a start position-to-current position route cost calculation unit configured to identify a route between the start position and the current position by using the map information, and to calculate a start position-to-current position route cost that is the route cost with respect to the identified route; and
    a start position-to-candidate position route cost calculation unit configured to identify a route between the start position and the position of the destination candidate by using the map information, and to calculate a start position-to-candidate position route cost that is the route cost with respect to the identified route,
    wherein said destination candidate position acquisition unit is configured to acquire a position of a destination candidate that lies within a predetermined range from the current position of the mobile body,
    said current position-to-candidate position route cost calculation unit, said start position-to-current position route cost calculation unit, and said start position-to-candidate position route cost calculation unit are configured to respectively calculate the current position-to-candidate position route cost, the start position-tocurrent position route cost, and the start position-to-candidate position route cost using any one of a distance of a route between a start point and an end point and an amount of time required for movement between the start point and the end point, and said circuitousness calculation unit is configured to calculate the circuitousness by subtracting the start position-to-candidate position route cost from the sum of the current position-to-candidate position route cost and the start position-to-current position route cost.

4. The destination prediction device according to claim 3, wherein said circuitousness calculation unit is configured to calculate, as the circuitousness, a value which is proportional to a value obtained by subtracting the start position-to-candidate position route cost from the sum of the current position-to-candidate position route cost and the start position-to-current position route cost and which is inversely proportional to the start position-to-candidate position route cost.

5. The destination prediction device according to claim 3, further comprising:
a road width acquisition unit configured to acquire a road width at the current position of the mobile body;
an event occurrence detection unit configured to detect a position at which the road width has decreased compared to the acquired road width as an event occurrence position; and
a distance limiting unit configured to remove, from destination candidates subsequent to the event occurrence position, a destination candidate that does not lie within an area which is surrounded by roads whose road widths are greater than the event occurrence position and which includes the event occurrence position,
wherein said destination prediction unit is configured to predict the destination from destination candidates that lie in the area surrounded by roads whose road widths are greater than the event occurrence position.

6. The destination prediction device according to claim 5, wherein said destination candidate position acquisition unit is configured to acquire a position of the destination candidate by using a traffic volume detection point that is a point where a traffic information provider detects a traffic volume of mobile bodies as the destination candidate, said destination prediction device further comprises:
a traffic volume acquisition unit configured to acquire a traffic volume of each movement direction at each of the traffic volume detection points from the traffic information provider, said current position-to-candidate position route cost calculation unit is configured to calculate the current position-to-candidate position route cost according to the current movement direction of the mobile body for each direction in which the mobile body passes through each of the traffic volume detection points;

said start position-to-candidate position route cost calculation unit is configured to calculate the start position-to-candidate position route cost for each direction in which the mobile body passes through each of the traffic volume detection points; and said destination prediction unit is configured to predict, as the destination, the traffic volume detection point whose circuitousness is the smallest and for which the acquired traffic volume is the largest.

7. The destination prediction device according to claim 5, further comprising
a movement history accumulation unit configured to accumulate a history of positions previously visited by the mobile body,
wherein said destination candidate position acquisition unit is configured to acquire positions of the destination candidates by using the positions accumulated by said movement history accumulation unit as the destination candidates, and
said destination prediction unit is configured to predict, as the destination, a destination candidate whose circuitousness is the smallest among the positions accumulated by said movement history accumulation unit.

8. The destination prediction device according to claim 1, further comprising:
a destination acquisition unit configured to acquire a destination of a mobile body from a user; and
a via point judgment unit configured to judge that a via point exists through which the mobile body intends to pass before heading towards the destination, when the circuitousness with respect to the destination is equal to or greater than a second threshold,
wherein said destination candidate position acquisition unit is configured to acquire, when it is judged that the via point exists, a position of a destination candidate that lies in a predetermined range from the current position of the mobile body and which may potentially become the via point, and
said destination prediction unit is configured to predict, as the via point, a destination candidate whose circuitousness is the smallest among the destination candidates.

9. The destination prediction device according to claim 8, wherein said destination prediction unit is further configured to predict, as the via point, a destination candidate for which the route cost from the current position to the destination when passing through the destination candidate is the smallest among the destination candidates whose circuitousness is the smallest.

10. destination prediction device according to claim 9, further comprising:
a branch calculation unit configured to calculate a position of a branch of a route connecting the start position and the destination and a route connecting the start position and the current position;
a junction prediction unit configured to predict a position of a junction of a route connecting the start position and the destination and a route connecting the current position and the destination;
a traffic jam information acquisition unit configured to acquire traffic jam information of the periphery of a route connecting the start position and the destination; and
a traffic jam avoidance judgment unit configured to judge whether a traffic jam exists between the branch position and the junction position among the route connecting the start position and the destination,
wherein said destination prediction unit is configured to predict that a via point exists when the circuitousness with respect to the destination is equal to or greater than the second threshold and said traffic jam avoidance judgment unit judges that a traffic jam does not exist.

11. destination prediction device according to claim 8, further comprising:
a destination history accumulation unit configured to accumulate a history of destinations acquired by said destination acquisition unit, in association with respective arrival times and dates at the destinations, wherein said destination prediction unit is configured to predict, as the via point, a destination that was reached immediately before a currently acquired destination among the destinations accumulated in said destination history accumulation unit.

12. destination prediction device according to claim 1, further comprising:

a destination acquisition unit configured to acquire a destination of a mobile body from a user; and a destination erroneous setting detection unit configured to judge that the acquired destination is erroneous when the circuitousness with respect to the destination is equal to or greater than a third threshold, wherein said destination candidate position acquisition unit is configured to acquire, when it is judged that the acquired destination is erroneous, a position of a destination candidate by using, as the destination, a similar position that lies in a predetermined range from the current position of the mobile body and which is confusable with the destination, and said destination prediction unit is configured to predict, as a correct destination, a destination candidate whose circuitousness is the smallest among the destination candidates.

13. destination prediction device according to claim 12, further comprising:

an information provision unit configured to provide at least information regarding the destination and routes to the destination, wherein said information provision unit is configured to provide, when said destination erroneous setting detection unit judges that the acquired destination is erroneous, information related to the destination in a form that is increasingly simplified as the circuitousness with respect to the destination increases.

14. destination prediction device according to claim 12, wherein said map information accumulation unit is configured to accumulate landmark information in which points are represented by at least one of a landmark name, a landmark position, a telephone number, and a map code, said destination prediction device further comprises:

a destination setting method acquisition unit configured to acquire a type of landmark information representing the destination acquired by said destination acquisition unit and a character string related to the destination;

a retrieval formula creation unit configured to create a retrieval formula including the landmark information type and the character string which is used for retrieving the similar position according to the landmark information type of the destination and the character string; and a similar position calculation unit configured to retrieve the similar position from the landmark information according to the retrieval formula, and said destination prediction unit is configured to predict, as the correct destination, a destination candidate whose circuitousness is the smallest among the similar positions.

15. A destination prediction method for a destination prediction device that includes a map information accumulation unit and predicts a destination, the map information accumulation unit accumulating map information including positions of a plurality of predetermined points and road information between the plurality of positions, said destination prediction method comprising:

acquiring a start position of a mobile body, performed by a start position acquisition unit;

acquiring a current position of the mobile body, performed by a current position acquisition unit;

acquiring positions of a plurality of destination candidates that may potentially become destinations of the mobile body from the map information accumulation unit, based on the acquired start position and the current position and performed by a destination candidate position acquisition unit;

calculating a circuitousness that is a deviation in route cost between (1) a route from the start position to the position of the destination candidate which passes through the current position and (2) a route capable of arriving at the position of the destination candidate from the start position at a minimum route cost, said calculating being performed by a circuitousness calculation unit; and predicting a destination candidate whose calculated circuitousness is the smallest among the destination candidates as the destination, performed by a destination prediction unit.

16. A program for a destination prediction device that includes a map information accumulation unit and predicts a destination, the map information accumulation unit accumulating map information including positions of a plurality of predetermined points and road information between the plurality of positions, said program causing a computer to execute:

acquiring a start position of a mobile body, performed by a start position acquisition unit;

acquiring a current position of the mobile body, performed by a current position acquisition unit;

acquiring positions of a plurality of destination candidates that may potentially become destinations of the mobile body from the map information accumulation unit, based on the acquired start position and the current position and performed by a destination candidate position acquisition unit;

calculating a circuitousness that is a deviation in route cost between (1) a route from the start position to the position of the destination candidate which passes through the current position and (2) a route capable of arriving at the position of the destination candidate from the start position at a minimum route cost, said calculating being performed by a circuitousness calculation unit; and predicting a destination candidate whose calculated circuitousness is the smallest among the destination candidates as the destination, performed by a destination prediction unit.

* * * * *

UNITED STATES PATENT AND TRADEMARK OFFICE
CERTIFICATE OF CORRECTION

PATENT NO. : 7,630,828 B2 Page 1 of 1
APPLICATION NO. : 12/159693
DATED : December 8, 2009
INVENTOR(S) : Takashi Tajima et al.

It is certified that error appears in the above-identified patent and that said Letters Patent is hereby corrected as shown below:

In column 42, claim 10, line 41, "destination" should read --The destination--.

In column 42, claim 11, line 64, "destination" should read --The destination--.

In column 43, claim 12, line 8, "destination" should read --The destination--.

In column 43, claim 13, line 27, "destination" should read --The destination--.

In column 43, claim 14, line 38, "destination" should read --The destination--.

Signed and Sealed this

Eighth Day of June, 2010

David J. Kappos
*Director of the United States Patent and Trademark Office*